US011470659B2

(12) United States Patent
Smets et al.

(10) Patent No.: US 11,470,659 B2
(45) Date of Patent: Oct. 11, 2022

(54) CONTACTLESS COMMUNICATION SESSION INITIATION BETWEEN DEVICES

(71) Applicant: MASTERCARD INTERNATIONAL INCORPORATED, Purchase, NY (US)

(72) Inventors: Patrik Smets, Nijlen (BE); Eddy Van De Velde, Leuven (BE); David Anthony Roberts, Warrington (GB); Jonathan James Main, Hook (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 42 days.

(21) Appl. No.: 17/078,983

(22) Filed: Oct. 23, 2020

(65) Prior Publication Data
US 2021/0127436 A1 Apr. 29, 2021

(30) Foreign Application Priority Data
Oct. 24, 2019 (EP) ..................................... 19204982

(51) Int. Cl.
*H04W 76/11* (2018.01)
*H04W 76/12* (2018.01)
(Continued)

(52) U.S. Cl.
CPC ............ *H04W 76/11* (2018.02); *G06Q 20/20* (2013.01); *H04L 65/1104* (2022.05);
(Continued)

(58) Field of Classification Search
CPC ................. H04W 76/11; H04W 76/12; H04W 12/00504; H04W 36/14; H04L 65/1006; H04L 9/28; H04L 9/32
See application file for complete search history.

(56) References Cited

U.S. PATENT DOCUMENTS

2013/0097080 A1 4/2013 Smets et al.
2014/0019367 A1 1/2014 Khan et al.
(Continued)

OTHER PUBLICATIONS

Coppenhagen, Uri, "International Search Report and Written Opinion of the International Searching Authority", International Application No. PCT/US2020/057097, dated Mar. 11, 2021, 23 pages.
(Continued)

*Primary Examiner* — Anez C Ebrahim

(57) ABSTRACT

Examples provide a system and method for initiating contactless communication sessions between computing devices using a variety of modalities. A user pre-registers a selected modality for triggering session initiation. A session initiation device generates trigger data based on a detected occurrence of a predetermined event corresponding to a user selected modality, such as, but not limited to, biometric data, a unique user identifier (ID), a vehicle identifier, or any other type of modality. The trigger data is mapped to a mobile device ID. The mobile device ID can be requested from a connection server. The communication session is established between the first computing device and the mobile user device using the mobile device identifier. The computing device transmits data to the mobile user device via the established communication session when the computing device is brought into proximity to the mobile user device.

20 Claims, 46 Drawing Sheets

(51) Int. Cl.
  *H04W 12/63* (2021.01)
  *H04W 12/65* (2021.01)
  *G06Q 20/20* (2012.01)
  *H04L 65/1104* (2022.01)

(52) U.S. Cl.
  CPC .......... *H04W 12/63* (2021.01); *H04W 12/65* (2021.01); *H04W 76/12* (2018.02)

(56) References Cited

U.S. PATENT DOCUMENTS

| | | | |
|---|---|---|---|
| 2014/0219453 A1* | 8/2014 | Neafsey | H04W 12/04 380/270 |
| 2014/0344149 A1 | 11/2014 | Campos | |
| 2015/0032626 A1* | 1/2015 | Dill | G06Q 20/40 705/44 |
| 2015/0302413 A1 | 10/2015 | Dua | |
| 2015/0347114 A1 | 12/2015 | Yoon | |
| 2015/0371215 A1* | 12/2015 | Zhou | G06Q 20/384 705/71 |
| 2016/0127581 A1 | 5/2016 | Suzuki | |
| 2018/0034511 A1 | 2/2018 | Smets et al. | |
| 2018/0075446 A1 | 3/2018 | Yin et al. | |
| 2018/0253805 A1 | 9/2018 | Kelly et al. | |
| 2019/0236585 A1 | 8/2019 | Jeong et al. | |

OTHER PUBLICATIONS

Galli, Paolo, "European Search Report", European Application No. EP19204982, dated Feb. 28, 2020, 8 pages.
Unknown, "Contactless EMV®" EMVCo, https://www.emvco.com/emv-technologies/contactless, downloaded Oct. 13, 2020, 5 pages.
Unknown, "Mobile EMV®", EMVCo., https://www.emvco.com/emv-technologies/mobile/, downloaded Oct. 13, 2020; 8 pages.
Unknown, "Specification Releases" NFC FORUM, https://nfc-forum.org/our-work/specifications-and-application-documents/specifications/specification-releases/, downloaded Oct. 13, 2020, 4 pages.
Unknown, "Proximity and cross device communication" Nearby, https://developers.google.com/nearby/, downloaded Oct. 13, 2020, 2 pages.
Unknown, "Amazon Go" Amazon, https://www.amazon.com/go, downloaded Oct. 13, 2020, 6 pages.
Unknown, "Wi-Fi CERTIFIED Vantage™" Wi-Fi Alliance, https://www.wi-fi.org/, downloaded Oct. 13, 2020, 2 pages.
Unknown, "Have you heard? LC3 is here", Bluetooth, https://www.bluetooth.com, downloaded Oct. 13, 2020, 4 pages.

* cited by examiner

SELECT Response Message Data Field (FCI) of the PPSE

| '6F' | FCI Template | | | | M |
|---|---|---|---|---|---|
| | '84' | DF Name ('2PAY.SYS.DDF01') | | | O[5] |
| | 'A5' | FCI Proprietary Template | | | M |
| | | 'BF0C' | FCI Issuer Discretionary Data | | M |
| | | | '61' | Directory Entry | M |
| | | | | '4F' ADF Name | M |
| | | | | '50' Application Label | O |
| | | | | '87' Application Priority Indicator (see table (3-3)) | C[7] |
| | | | | '9F2A' Kernel Identifier (see Table 3-4 and Table 3-5) | C[8] |
| | | | | '9F29' Extended Selection (see Table A-1 on page 45) | C[9] |
| | | | | '9F0A' Application Selection Registered Proprietary Data (ASRPD, see requirement 3.3.1.2) | O |
| | | | '61' | Directory Entry | O |
| | | | | '4F' ADF Name | M[10] |
| | | | | '50' Application Label | O[10] |
| | | | | '87' Application Priority Indicator | C[7,10] |
| | | | | '9F2A' Kernel Identifier | C[8,10] |
| | | | | '9F29' Extended Selection | C[9,10] |
| | | | | '9F0A' Application Selection Registered Proprietary Data (ASRPD, see requirement 3.3.1.2) | O |
| | | | '61' | Directory Entry | O |
| | | | | '4F' ADF Name | M[10] |
| | | | | '50' Application Label | O[10] |
| | | | | '87' Application Priority Indicator | C[7,10] |

FIG. 5

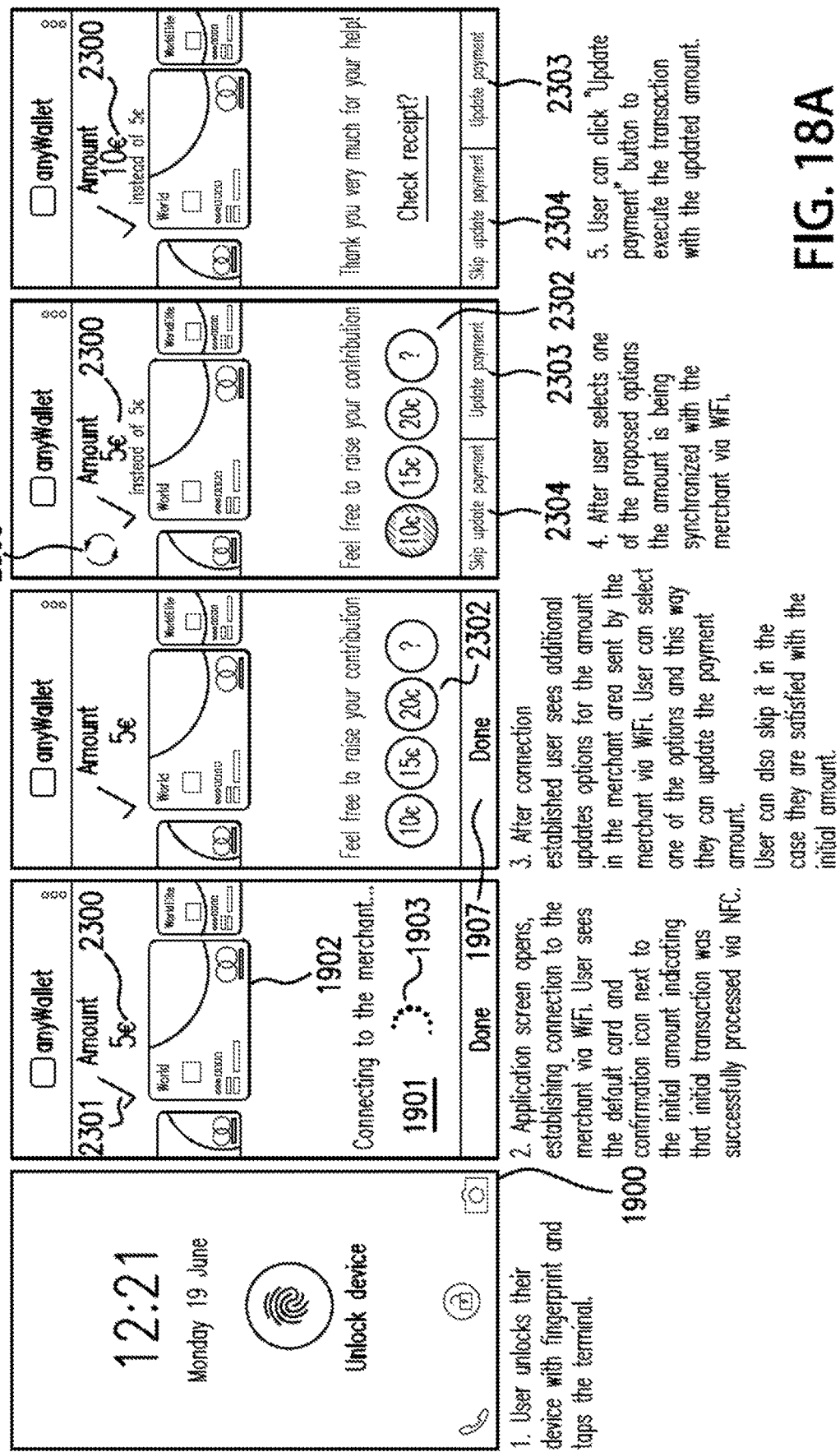

6. Transaction is successfully completed, user sees the cofirmation screen where they can consult the receipt or go to the wallet application Home screen.
User can see the farewell message from the merchant sent via WiFi.

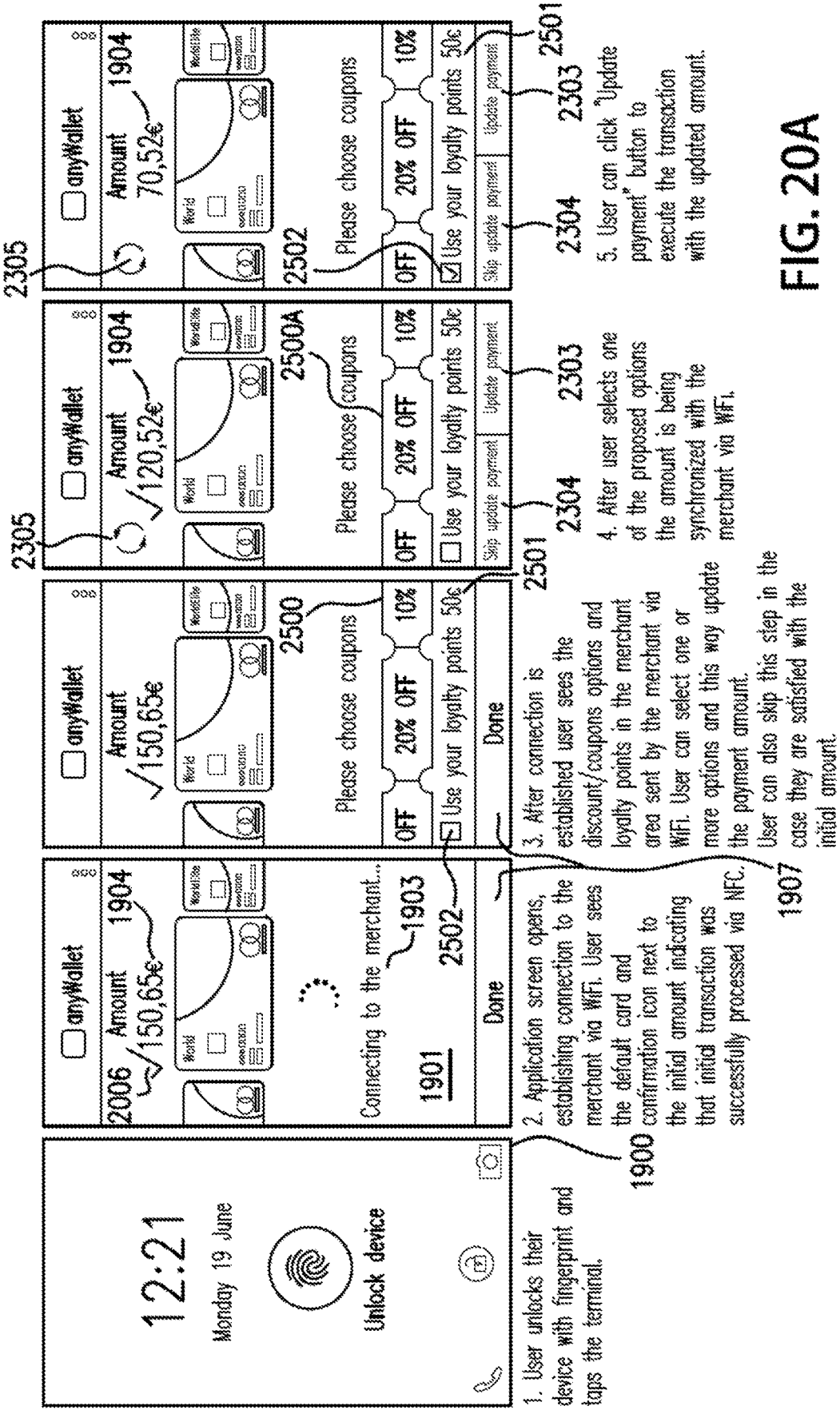

CONTACTLESS COMMUNICATION SESSION INITIATION BETWEEN DEVICES

CROSS REFERENCE TO RELATED APPLICATION

This application claims the benefit of priority of European Patent Application No. 19204982.3, filed Oct. 24, 2019, entitled "Data Processing Apparatuses and Methods", the entirety of which is incorporated herein by reference.

BACKGROUND

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Modern electronic communications devices (such as mobile phones, tablet computers and the like) can transmit data to and receive data from other electronic devices using a number of different types of communication technology. Such technology includes short-range electromagnetic induction-type technologies (such as Near Field Communication (NFC)) which allow data to be transmitted between one device and another when those devices are brought within sufficiently close proximity to each other (typically of the order a few centimetres) as well as longer-range wireless-type technologies such as Bluetooth®, Wireless Local Area Network (WLAN) interfaces such as Wi-Fi® and mobile telecommunications interfaces such as Long Term Evolution (LTE) which allow data to be transmitted over longer distances (ranging from the order of few metres in the case of Bluetooth® to several kilometres in the case of mobile telecommunications interfaces) over a computer network.

A plurality of different communication technologies may be implemented within a single device. Furthermore, the technologies can be used together to provide improved functionality of a device. For example, credentials necessary for one device to establish a wireless network connection (via Wi-Fi®, for example) with another device may be transmitted between the devices using NFC (thus allowing a user to 'tap' one device on another in order to establish the wireless network connection). This provides an easy and convenient way for a user to establish a wireless network connection between two devices.

However, given that the communication technologies operate very differently, according to different established standards and the like, it can be challenging to use different communication technologies together in an efficient manner. Furthermore, some communication technologies (such as Wi-Fi®) may not always be available. Relying on them to work together with one or more other communication technologies (such as NFC) to, for example, deliver a service may thus degrade the user experience when they are not available.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for contactless initiation of communication sessions between devices using multiple modalities. A session initiation device is configured to generate trigger data in accordance with a user-selected modality in a set of modalities responsive to occurrence of a predetermined event corresponding to the selected modality. A computing device includes first communication circuitry configured to transmit data to a mobile user device or receive data from the mobile user device using electromagnetic induction when the first computing device is brought into proximity to the mobile user device; second communication circuitry configured to transmit or receive data via a radio signal; at least one processor; and at least one memory comprising computer program code that, when executed by the at least one processor, is operable to: request a mobile device identifier from a second computing device responsive to receiving the trigger data from the session initiation device, the trigger data comprising at least one unique user-registered identifier, the unique user-registered identifier mapped to the requested mobile device identifier; establish a communication session between the first computing device and the mobile user device using the mobile device identifier; and control the first communication circuitry to transmit first data to the mobile user device via the established communication session when the first computing device is brought into proximity to the mobile user device; and on condition the second communication circuitry is enabled to transmit second data such that data based on the transmitted second data is receivable by the mobile user device or to receive second data based on data transmitted by the mobile user device, control the second communication circuitry to transmit second data via the communication session such that data based on the transmitted second data is receivable by mobile user device or to receive the second data based on data transmitted by the mobile user device.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is an exemplary block diagram illustrating an extract from EMV® Entry Point, in particular, a Select Response Message Data Field (FCI) of the PPSE, according to an embodiment.

FIGS. 18A and 18B is an exemplary block diagram illustrating an eighth use scenario of the present technique, according to an embodiment.

FIGS. 20A and 20B is an exemplary block diagram illustrating a tenth use scenario of the present technique, according to an embodiment.

DESCRIPTION OF THE EMBODIMENTS

Figure 1:
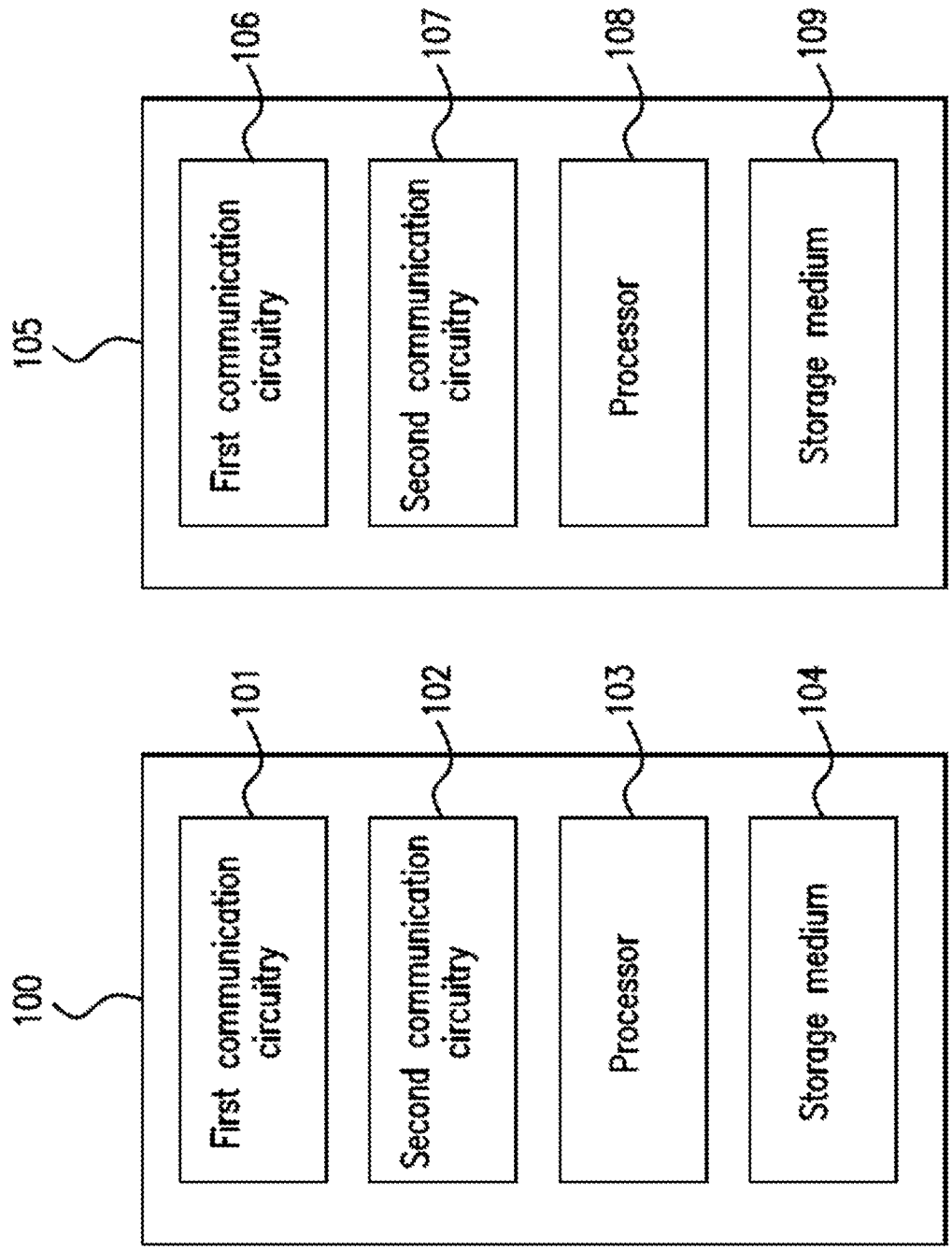
FIG. 1 is an exemplary block diagram illustrating a first data processing apparatus and second data processing apparatus according to embodiments of the present technique.

Referring now to the drawings, wherein like reference numerals designate identical or corresponding parts throughout the several views.

Aspects of the disclosure provide for different communication technologies implemented within a single device to be used together in an efficient manner so as to provide improved functionality of that device. Further aspects of the disclosure provide a need to identify when a communication technology is to be used and what should be done in the case that such a communication technology is not available.

One area in which this is particularly relevant is the use of electronic communication devices (such as mobile phones, tablet computers and the like) for completing electronic payments.

Nowadays, it is possible to pay for goods and services using an electronic communications device such as a mobile phone. For example, such payments may be payment card payments (such as credit or debit card payments) which can be executed using a mobile phone equipped with Near Field Communication (NFC) technology or another electromagnetic induction technology which allows data to be transmitted between a communications device and point-of-sale (POS) device when the communication device is brought into proximity to the POS device (for example, when NFC is used, when the NFC controller of the communication device is brought within a distance of less than approximately 4 cm of an NFC controller of the POS device). In this case, the communication device stores data associated with a payment card of the user. Data is then exchanged with a POS device when a user purchases goods or services in order to allow the payment card payment to be made. This increases convenience for the user since they are able to pay using their communication device (such as a mobile phone) which is always carried with them and do not need to carry separate cash or payment cards. The technology behind payment card payments using communication devices such as mobile phones includes Contactless and Mobile EMV®. Contactless EMV® may be referred to simply as "contactless".

The high data processing capability of modern communication devices such as mobile phones has led to various payment experience-enhancing features to be envisaged. For example, as well as a user being able to complete a payment transaction at a POS device using their mobile phone, it has been envisaged that other data could also be exchanged with the POS device in order to enhance the user's experience. For example, the user may be able to apply electronic discount coupons, collect loyalty points, add a tip, or collect an electronic receipt when completing a transaction using their mobile phone. Such additional data may be transmitted via the same channel as the standard payment data (such as NFC). A problem with this, however, is that the transmission of such additional data often requires a 'tap&hold' process (in which a user holds their device in proximity to a reader of a POS device for a longer time than usual) or a multi-tap process (in which a user holds their device in proximity to a reader of a POS device repeatedly). This is cumbersome to the user.

Alternatively, such additional data may therefore be transmitted via a different channel such as via a wireless network interface. Such wireless network interfaces include Bluetooth® Wireless Local Area Network (WLAN) interfaces such as Wi-Fi® and mobile telecommunications interfaces such as Long-Term Evolution (LTE). Additional data may be transmitted between a communication device and POS device using a wireless network interface. Mobile payments may be enhanced by combining them with a secure wireless connection. This wireless connection can then be used for couponing, consumer device cardholder verification or the like.

Such additional functionality may not currently be implemented in existing communication devices and POS devices with low impact on existing payment infrastructure and existing mobile applications.

In some examples, the system receives trigger data associated with a user-selected modality in a set of modalities from a session initiation device. The trigger data is used to automatically initiate establishment of a communications session between a user's computing device and a merchant's computing device. This reduces physical contact between users and physical devices within a store or other public area. It further improves user efficiency via a user interface by reducing human interactions with the system and simplifying session establishment.

In other examples, the system provides multiple modalities for triggering establishment of the communications sessions. This provides users with improved choice, enabling more narrowly tailored to each user for improved user satisfaction. The various modalities further enable users to automatically be provided with authentication and approval options for transactions, orders, and other value-added services for improved security and reduced error in transactions.

Contactless communications sessions further eliminate the need for human-to-human physical contact/physical interaction during transactions. This provides increased safety, respecting social distancing and reducing physical contact (number of touches) associated with high traffic areas and publicly accessed devices by initiating and completing transactions and other services in a contactless manner.

In yet other examples, a merchant may provide some info about the channels to establish the session to the server which is setting up the channel and/or mediating the channel. This enables improved creation and management of sessions. For example, if a merchant supports ultra-wide band, the merchant may pass some information to the connection (T&C) server to indicate methods or parameters of establishing the connection. This allows a level of future proofing, to select the right technology.

The system further provides automatic establishment and mediation of the communications sessions between mobile user devices and merchant computing devices. This enables reduced network bandwidth usage and improved resource allocation.

FIG. 1 shows a communication device 100 and a point-of-sale (POS) device 105 according to embodiments of the present technique. Both the communication device 100 and POS device 105 are examples of data processing apparatuses. The communication device 100, in some non-limiting examples, is a computing device, such as, but not limited to, the mobile user device 2406 and/or the computing device 2404 in FIG. 24.

The communication device 100 (which may be, for example, a mobile phone, in particular, a smart phone running the iOS® or Android® operating system) comprises first communication circuitry 101, second communication circuitry 102, processor circuitry 103 and a storage medium 104. The processor circuitry 103 controls the first communication circuitry 101, second communication circuitry 102 and storage medium 104.

The first communication circuitry is configured to transmit data to the POS device 105 or receive data from the POS device using electromagnetic induction when the communication device is brought into proximity to the POS device (that is, sufficiently close proximity for data transmission by electromagnetic induction, for example, within the order of a few centimetres (cm) distance from the POS device). For example, the first communication circuitry may be configured to transmit data to or receive data from the POS device using NFC (in particular, according to one of the NFC Technical Specification Releases 2012, 2014 or 2017 as described at https://nfc-forum.org/our-work/specifications-and-application-documents/specifications/specification-releases/). In some examples where NFC is used, the communication device 100 is brought to within a distance of approximately 4 cm of the POS device 105.

More particularly, the first communication circuitry 106 may be configured to transmit data to or receive data from the communication device 100 using a suitable Contactless and Mobile EMV® technology such as, but not limited to, that described at https://www.emvco.com/emv-technologies/contactless and https://www.emvco.com/emv-technologies/mobile/.

A user bringing the communication device 100 into sufficiently close proximity to the POS device 105 such that data may be transmitted to or received from the POS device 105 using the first communication circuitry may be referred to as a 'tap' (since, from a user's perspective, they are "tapping" the communication device 100 on the POS device 105 in order to allow this data transmission).

The second communication circuitry 102 is configured to transmit data to the POS device or receive data from the POS device via a wireless network (implemented by transmission of data via radio signals). For example, the second communication circuitry may be configured to transmit data to or receive data from the POS device over a Bluetooth® interface, a Wireless Local Area Network (WLAN) interface (such as Wi-Fi®) or a mobile telecommunications interface (such as Long Term Evolution (LTE)). More generally, the second communication circuitry 102 is configured to transmit data to or receive data from the POS device 105 over a wireless network comprising at least the communication device 100 and POS device 105. A wireless network should be understood to refer to two or more data processing devices which are connected such that data can be transmitted between those devices without requiring those devices to be in sufficiently close proximity for data to be transmitted between those devices using electromagnetic induction (for example, within a distance of the order of a few centimetres or, more particularly, approximately 4 cm for NFC). At least two of the data processing devices of the wireless network are configured to transmit data to and/or receive data from each other wirelessly (using radio signals).

The processor circuitry 103 is configured to control the first communication circuitry 101 to transmit to the POS device 105 first data for initiating an electronic payment from a user of the communication device 100 to a user of the POS device 105 when the communication device 100 is brought into proximity to the POS device 105. The processor circuitry 103 is configured to determine whether it is possible for the second communication circuitry 102 to transmit second data to the POS device or to receive second data from the POS device, the second data being associated with the electronic payment initiated by the first data. When it is determined that it is possible for the second communication circuitry 102 to transmit the second data to the POS device or to receive the second data from the POS device, the processor circuitry 103 is configured to control the second communication circuitry 102 to transmit the second data to the POS device or to receive the second data from the POS device.

The POS device 105 comprises first communication circuitry 106, second communication circuitry 107, processor circuitry 108 and a storage medium 109. The processor circuitry 103 controls the first communication circuitry 106, second communication circuitry 107 and storage medium 109.

The first communication circuitry 106 is configured to receive data from the communication device 100 or transmit data to the communication device 100 using electromagnetic induction when the communication device is brought into proximity with the POS device (that is, sufficiently close proximity for data transmission by electromagnetic induction, for example within the order of a few centimetres (cm) distance from the POS device). For example, the first communication circuitry may be configured to transmit data to or receive data from the communication device using NFC (in particular, according to one of the NFC Technical Specification Releases 2012, 2014 or 2017 as described at https://nfc-forum.org/our-work/specifications-and-application-documents/specifications/specification-releases/). In the case that NFC is used, the communication device 100 is brought to within a distance of approximately 4 cm of the POS device 105.

More particularly, the first communication circuitry 106 may be configured to transmit data to or receive data from the communication device 100 using any type of suitable Contactless and Mobile EMV® technology.

The second communication circuitry 107 is configured to receive data from the communication device 100 or transmit data to the communication device 100 via a wireless network (implemented by transmission of data via radio signals). For example, the second communication circuitry may be configured to transmit data to or receive data from the communication device over a Bluetooth® interface, a Wireless Local Area Network (WLAN) interface (such as Wi-Fi®) or a mobile telecommunications interface (such as Long Term Evolution (LTE)). More generally, the second communication circuitry 107 is configured to transmit data to or receive data from the communication device 105 via a wireless network comprising at least the communication device 100 and POS device 105. A wireless network should be understood to refer to two or more data processing devices which are connected such that data can be transmitted between those devices without requiring those devices to be in sufficiently close proximity for data to be transmitted between those devices using electromagnetic induction (for example, within a distance of the order of a few centimetres or, more particularly, approximately 4 cm for NFC). At least two of the data processing devices of the wireless network are configured to transmit data to and/or receive data from each other wirelessly (using radio signals). It will be appreciated that the second communication circuitry 107 may be configured to receive the second data via a wired connection, wherein that second data has previously been transmitted wirelessly by the second communication circuitry 102 of the communication device 100 but received and re-transmitted by another element of the network (such as a mobile telecommunications base station or WLAN base station, for example) using a wired connection to the POS device 105. The second data may also be transmitted to the POS device 106 via one or more intermediary device such as a network-enabled cash register or the like to which the POS device 106 is connected. It will be appreciated that, when transmitting the second data, the second communication circuitry 107 in this case will transmit the second data using a wired connection. The second data will then be received by a suitable element of the network (via a cash register or the like, if applicable) and re-transmitted using a wireless connection for reception of the second data by the communication device 100. The second data is therefore still transmitted between the POS device 105 and the communication device 100 via a radio signal.

The processor circuitry 108 is configured to control the first communication circuitry 106 to receive from the communication device 100 first data for initiating an electronic payment from a user of the communication device 100 to a user of the POS device 105. The processor circuitry 108 is configured to determine whether it is possible for the second communication circuitry 107 to receive second data from the communication device 100 or transmit second data from the communication device 100, the second data being associated with the electronic payment initiated by the first data. when it is determined that it is possible for the second communication circuitry to receive the second data from the communication device 100 or to transmit the second data to the communication device 100, the processor circuitry 108 is configured to control the second communication circuitry 107 to receive the second data from the communication device 100 or to transmit the second data to the communication device 100.

In an embodiment, the POS device 105 is a Windows® based POS that implements an EMV C2 or C3 contactless kernel. The POS device 105 (implementing the kernel and contactless interface) may be a single integral device comprising other elements such as a cash register or the like. Alternatively, the POS device 105 may comprise a separate contactless reader in which the kernel and contactless interface are implemented (such contactless readers can be obtained from Verifone® or Ingenico®, for example) which is connectable to another device comprising cash register functionality or the like.

Such a kernel can be described as a combination of processes that communicate through signals (or events), as described in EMV® Contactless Specifications for Payment Systems-Book C-2 Kernel 2 Specification.

Figure 2A:
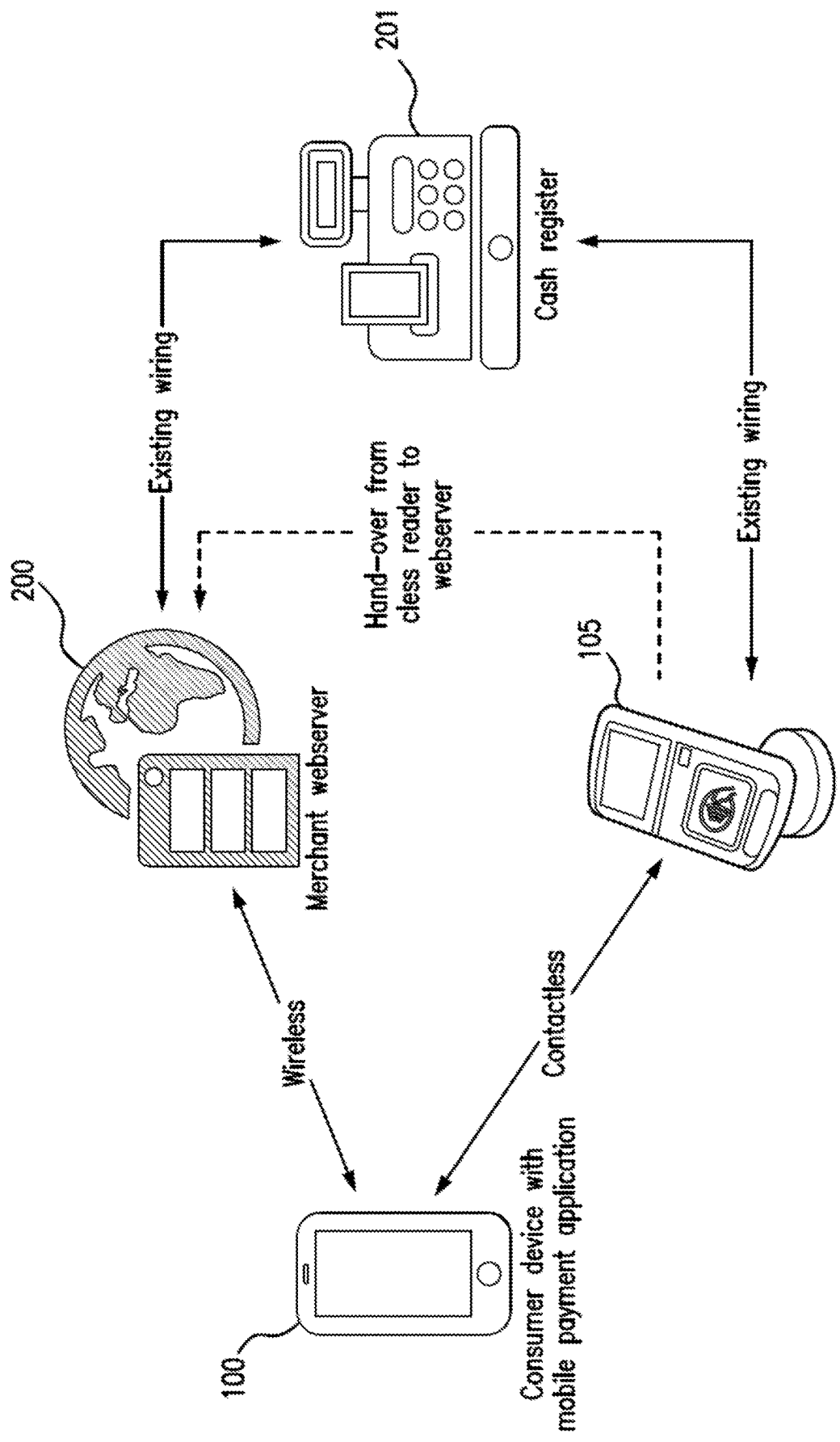
FIGS. 2A and 2B is an exemplary block diagram illustrating example configurations in which different processes and physical devices are used during an electronic transaction.

The initial transmission of first data from the communication device 100 and the POS device 105 for initiating the electronic payment using the first communication circuitry 101 and 106 followed by the transmission or reception of second data between the communication device 100 and POS device 105 using the second communication circuitry 102 and 107 may be referred to as hand-over. Once hand-over is completed, the dialogue between a communication device 100 (for example, a cardholder device) and a POS device 105 (for example, a merchant device) may not only use a different interface (for example, a wireless interface allowing communication between the first communication circuitry 101 and 106 instead of a contactless interface allowing communication between the second circuitry 102 and 107) but may use a different set of processes that are physically located in the same or in a different merchant device. In an example configuration in which different processes and physical devices are used during a transaction initiated by a communication device 100 (in this case, a mobile phone), a POS device 105 (in this case, a contactless reader) passes on processing to a merchant web application implemented at a merchant webserver 200, as is illustrated in FIG. 2A. Both the contactless reader and the merchant webserver are connected to a cash register 201 using existing wiring.

In this case, the second communication circuitry 102 is configured to transmit the second data to the POS device 105/cash register 201 or to receive the second data from the POS device 105/cash register 201 via the merchant web server 200 (or, more generally, any suitable data processing apparatus comprised within a network comprising the communication device 100 and the POS device 105/cash register 201), the merchant webserver 200 being configured to process the second data whilst maintaining information comprised within the second data. For example, if the second data comprises information that a discount should be applied (due to use of an electronic coupon or electronic discount card owned by a user of the communication device 100, for example), then the merchant webserver 200 may use the second data to calculate a discounted price and pass on information indicative of this discounted price as second data to the POS device 105/cash register 201 so as to allow the transaction to be completed with the discount. The second data is thus transmitted from the communication device 100 to the POS device 105/cash register 201 via the merchant webserver 200.

The second data may be altered by the merchant webserver 200. However, certain information comprised within the second data (that is, indicated by the second data) will always be retained. For example, a user may control (via a user interface (not shown) of the communication device 100) the communication device 100 to transmit information indicative of a discount coupon (for example, a coupon number uniquely identifying the coupon and the discount associated with it) as the second data. This second data indicates, as information, that the user has requested a discount. The merchant webserver 200 then uses the information indicative of the discount coupon to determine an updated, discount price, and sends this as an altered version of the second data to the POS device 105/cash register 201. In this case, the altered second data still indicates, as information, that the user has requested a discount. The indication of this information has therefore been maintained in the second data. At the same time, the second data has been altered to add and/or remove additional information. In this example, the second data initially transmitted from the communication device 100 to the merchant webserver 200 comprises, for example, data indicative that (a) a discount is requested, (b) the discount is permitted because of a coupon and (c) the unique identifier of the coupon. The second data then transmitted from the merchant webserver 200 to the POS device 105/cash register 201 comprises, for example, data indicative that (a) a discount is requested and (d) the amount of discount (or the new price). Information (a) has thus been retained within the second data, even though information (b) and information (c) has been removed and information (d) has been added. More generally, it will be appreciated that the transmission of data between the communication device 100 and the POS device 105/cash register 201 (or vice versa) via the second communication circuitry 102 and 107 may occur via a further network node (such as merchant webserver 200). The data transmission therefore occurs via two separate transmissions, these being a first transmission in which data is transmitted from the communication device 100 (or POS device 105/cash register 201) to the further network node and a second transmission in which data is transmitted from the further network node to the POS device 105/cash register 201 (or communication device 100). It is noted that the term "POS device 105/cash register 201" should be understood to mean the combination of the POS device 105 and cash register 201 necessary for completing and recording the transaction. Data described as being received or transmitted by the POS device 105 should be interpreted, where necessary, as data received or transmitted by the POS device 105 and cash register 201.

Thus, second data transmitted by the second communication circuitry 102 of the communication device 100 is transmitted such that data based on the transmitted second data (for example, either the second data itself or data generated at a further network node based on the second data) is receivable by the second communication circuitry 107 of the POS device 105. Similarly, second data received by the second communication circuitry 102 of the communication device 100 is based on data transmitted by the second communication circuitry 107 of the POS device 105 (for example, the second data may be the data transmitted by the second communication circuitry 107 or may be generated at a further network node based on the data transmitted by the second communication circuitry 107).

Figure 2B:
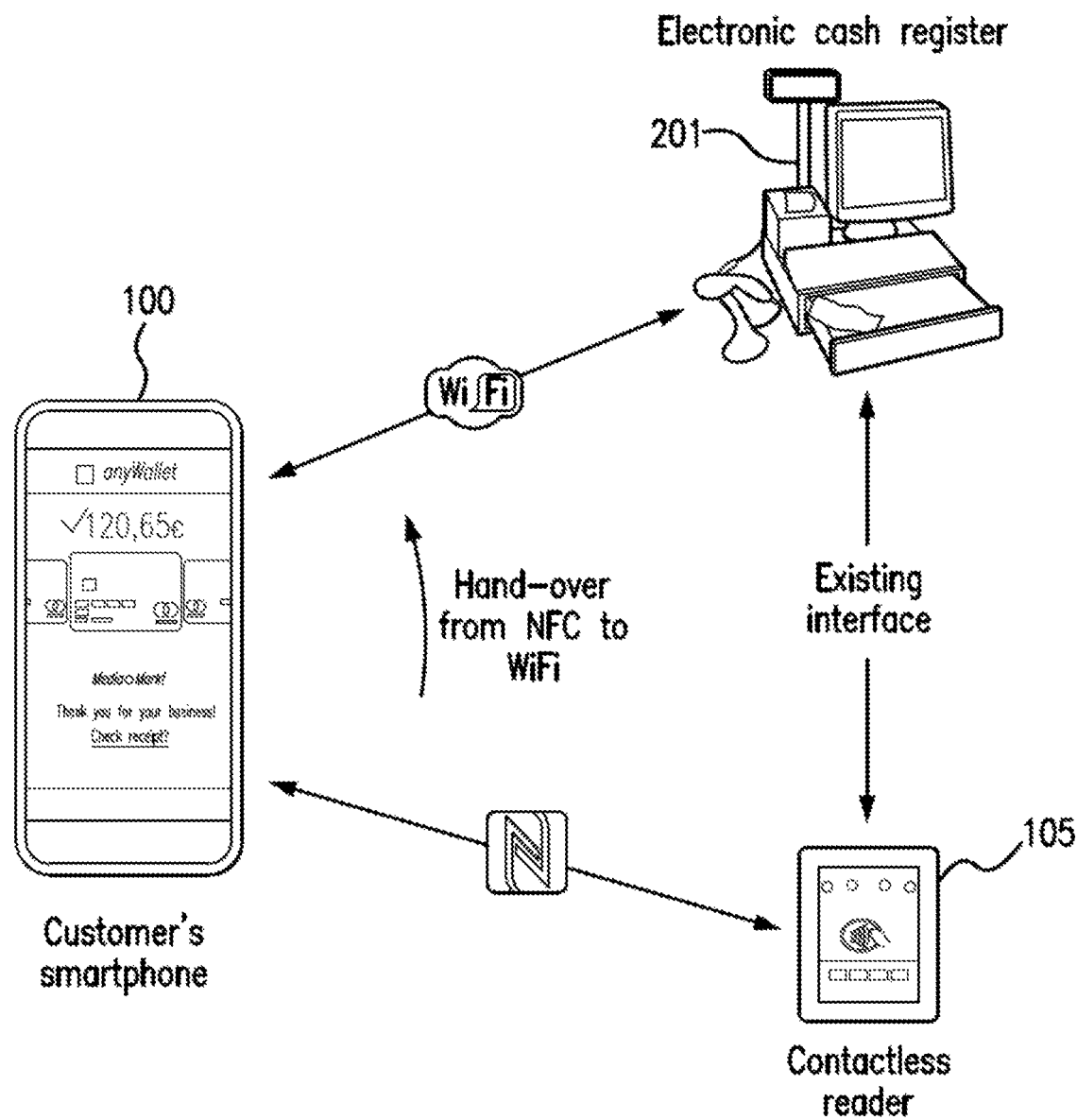

FIG. 2B shows an alternative arrangement to that of FIG. 2A in which a wireless connection is established between the communication device 100 and POS device 105/cash register 201 without any intermediary network element (in particular, without the merchant webserver 200 of FIG. 2A). Data may therefore be transmitted directly between the communication device 100 and POS device 105/cash register 201. In the example of FIG. 2B, the wireless connection between the communication device 100 and POS device 105/cash register 201 is enabled by a Wi-Fi® connection to the cash register 201 (the cash register 201 is connected to the POS device 105 via a conventional interface). In FIG. 2B, it can be seen that the POS device 105 is an EMV® Contactless reader which communicates with the communication device 100 via NFC.

In an embodiment, the described functionality of the communication device 100 is enabled by a mobile software application installed on the communication device 100 (that is, stored on the storage medium 104 of the communication device 10). The mobile software application may be, for example, the Mastercard® Cloud Based Payment application or an application conforming to one or more of the Visa® Cloud-based Payments specifications is taken (running on iOS® or Android®). Such application can be represented as a set of modules communicating through APIs (application programming interfaces) and events.

Figure 3A:
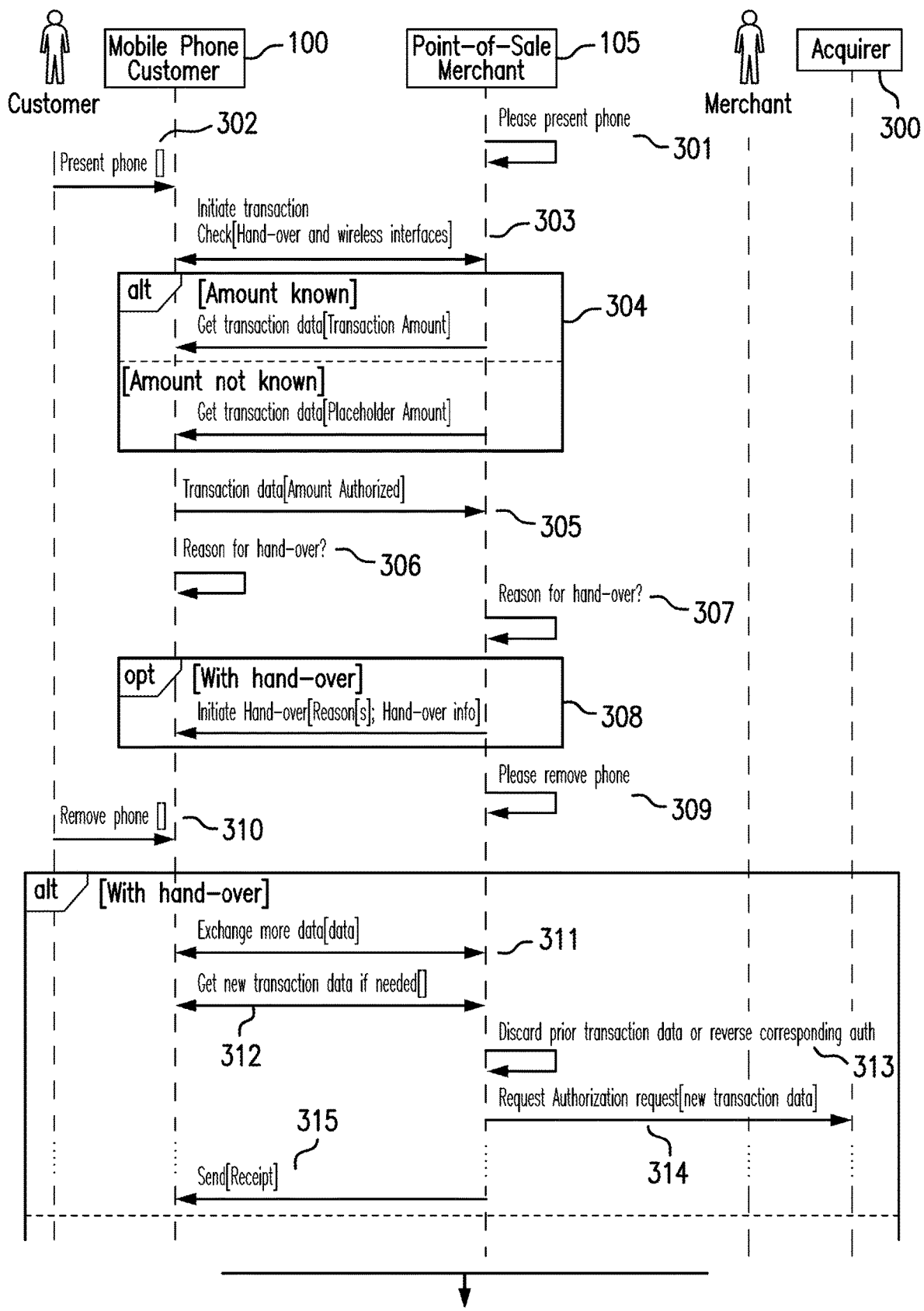
FIGS. 3A and 3B is an exemplary block diagram illustrating an example transaction according to an embodiment.
Figure 3B:
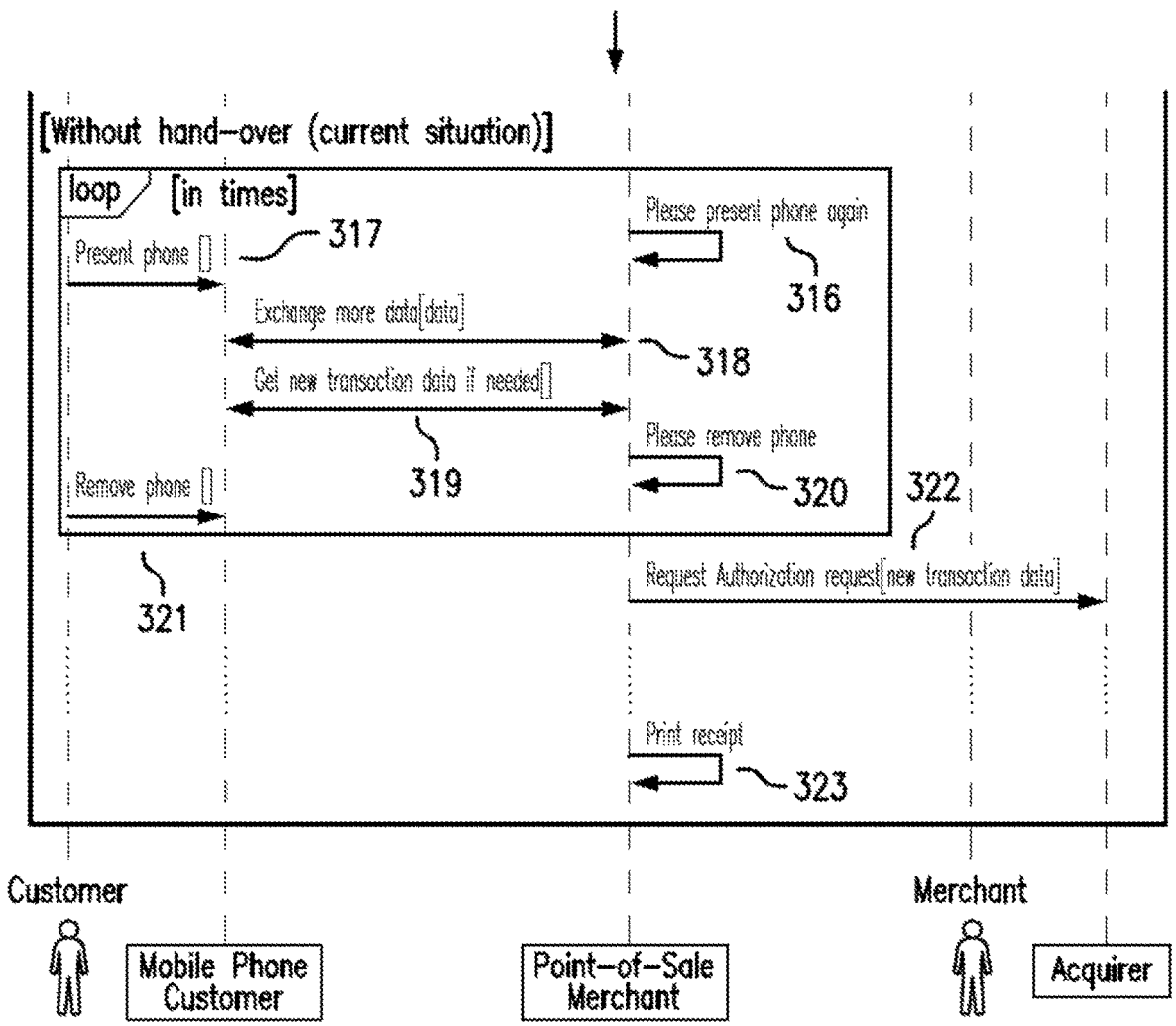

FIG. 3 schematically illustrates an example transaction according to an embodiment.

The transaction is initiated by the user tapping a mobile phone (an example of a communication device 100) on the POS device 105 (for example, on an EMV® contactless reader of the POS device 105). Hand-over to wireless data transmission (as implemented using the second communication circuitry 102 and 107) is an optional feature on both POS devices 105 and communication devices 100. Thus, neither the POS device 105 nor the communication device 100 can rely on the hand-over to be initiated or, when initiated, to be successful. It is furthermore desirable that hand-over does not degrade the current 'tap&go' experience (made possible by EMV® contactless, for example) and that, when hand-over doesn't apply or isn't successful, existing mechanisms may still be used to complete a transaction. It is noted that the 'tap&go' experience refers to the way in which a user only has to briefly bring the communication device 100 into sufficient proximity to a reader of the POS device 105 a single time in order for the transaction to be completed. Typically, the communication device 100 only has to be brought into sufficient proximity to the reader for approximately 1 second or less. This distinguishes the 'tap&go' experience from the 'tap&hold" and 'multi-tap' processes described earlier.

In an embodiment, the electronic payment initiated using the first data is a payment card payment (such as a credit or debit card payment), and the first data comprises information for completing an authorisation request to be transmitted from the POS device 105 to an acquirer device 300 (owned by a payment card acquirer who processes payment card transactions on behalf of the merchant) for processing of the electronic payment. In the example of FIG. 3, the POS device 105 does not know whether hand-over will be successful. The POS device 105 collects, as the first data, necessary data from the communication device 105 to populate DE55 of the authorization request for payment transmitted to the acquirer device 300. This involves the POS device 105 sending a number of SELECT commands, a Get Processing Options command, and a number of Read Record commands. Furthermore, for Mastercard® payments, for example, a Generate AC (GenAC, for M/Chip® cards) or Compute Cryptographic Checksum (CCC, for magnetic stripe cards) is transmitted to the communication device 100. The resulting data (sent in response by the communication device 100 to the POS device 105 is used to populate DE55 or DE35/45 and may be referred to as 'transaction data'.

FIG. 3 shows an example process according to an embodiment. At operation 301, the user of the communication device 100 is asked by the POS device 105 to present the communication device on a reader (for example, an NFC reader) of the POS device. At operation 302, the user presents the communication device, as instructed. At operation 303, information indicative of the availability of handover and the wireless interface(s) available for use for handover is exchanged between the communication device and POS device. At operation 304, if the amount of the transaction is known (for example, if the total amount of goods purchased has already been determined at the checkout of a store), then the transaction amount ("Transaction Amount") is transmitted from the POS device to the communication device as a "Get transaction data" signal. On the other hand, if the total transaction amount is not known (for example, if the communication device is presented to the POS device prior to the scanning of goods at a checkout or the like), then a placeholder amount ("Placeholder Amount") is transmitted from the POS device to the communication device as a "Get transaction data" signal. At operation 305, transaction data is transmitted from the communication device to the POS device. The transaction data includes an "Amount Authorised" signal. At operation 306, the communication device determines whether there is a reason for handover to occur. Furthermore, at operation 307, the POS device determines whether there is a reason for handover to occur. At operation 308, if there is a reason for handover that is supported by both the communication device and the POS device, then handover to a wireless connection is initiated. At operation 309, the user of the communication device is requested to remove the communication device from the reader of the POS device. At operation 310, the user removes the communication device, as instructed.

Depending on whether or not handover has occurred, the data flow between the communication device, POS device and acquirer device 300 is different. In the case that handover occurs, more data is transmitted between the communication device and POS device. New transaction data is transmitted between the communication device and POS device at operation 312 (if new transaction data is necessary). At operation 313, the previous transaction data is discarded, or the authorisation associated with the previous transaction data is reversed. At operation 314, an authorisation request is transmitted from the POS device to the acquirer device 300 based on the new transaction data. At operation 315, a receipt is then sent electronically from the POS device to the communication device. The data transmitted at operations 311, 312 and 315 are examples of "second data". Alternatively, in a case that there is no handover (for example, if the communication device and POS device have no reason for handover which are in common), then operations 311 to 315 are skipped and the process proceeds to operation 316. In this case, if there is additional data to be transmitted between the communication device and POS device, this is done through the user of a communication device presenting the communication device at a reader of the POS device one or more further times so as to enable such information to be transmitted between the communication device and POS device. At operation 316, the user of the communication device is again requested to present the communication device at the reader of the POS device. At operation 317, the user of the communication device presents the communication device, as instructed. At operation 318, data is exchanged between the communication device and POS device. At operation 319, new transaction data is transmitted between the communication device and POS device (if necessary). The data transmitted at operations 318 and 319 are examples of "second data" that cannot be transmitted via a wireless connection because handover was not possible, for example. At operation 320, the user of the communication device is instructed to remove the communication device from the reader of the POS device. At operation 321, the user of the communication device removes the communication device from the reader, as instructed. Operations 316 to 321 may be repeated one or more times (that is, n times, where n is an integer greater than or equal 1) until the necessary data is exchanged between the communication device and POS device. At operation 322, an authorisation request based on the new transaction data is transmitted from the POS device to the acquirer device 300. In this case, a receipt is then printed in hard copy at the POS device (or at a printer connected to the POS device) at operation 323. FIG. 3 thus demonstrates an example in which second data may be transmitted between the communication device 100 and POS device 105 via either a handover to a wireless connection following initialisation of a payment transaction via first data transmitted via NFC or the like or by one or more subsequent "taps" of the communication device on a reader of the POS device (in the case that handover does not occur).

The POS device 105 may also be configured such that for specific transactions or business processes, it does not collect all such data during the (initial) contactless interaction (via the first communication circuitry 101 and 106) but collects it all after handover (via the second communication circuitry 102 and 107), secure in the knowledge that, because of its specific business processes, payment can still be made in a convenient manner if hand-over fails, for instance, by tapping again later (thus allowing the data that was not transmitted to be transmitted via a contactless interaction via the first communication circuitry 101 and 106). Thus, the first data transmitted from the communication device 100 to the POS device 105 via the first communication circuitry 101 and 106 when the communication device 100 is initially brought into proximity to the POS device 105 need only be sufficient to initiate the electronic payment process. It does not necessarily have to include all the data to be transmitted as part of the authorisation request to the acquirer.

Depending on when the contactless transaction is initiated (for instance, prior to rang up of goods), the Amount Authorized (sent by the POS device 105 to the communication device 100) may be the actual transaction amount or it can be a placeholder amount (as allowed by MasterCard® M/Chip Fast or by Visa® Quick Chip, for example).

In existing M/Chip Fast and Quick Chip (that is, without hand-over), if the placeholder amount is sent to the communication device 100, then the Amount Authorized included in the transaction data (transmitted from the communication device 100 to the POS device 105) is the placeholder amount and the cryptogram included in the transaction data is calculated over this value. The final transaction amount is set in DE4 of the authorization request (transmitted from the POS device 105 to the acquirer device 300) and may be different from the Amount Authorized in DE55.

In an embodiment, when hand-over is performed, the above-mentioned approach (in which the placeholder amount is sent to the communication device) can be maintained. In this case, hand-over is used to collect user input, exchange additional data (that is, second data such as coupons or the like) and adjust the final transaction amount in DE4, all without asking the consumer to tap again and without asking the communication device for fresh transaction data.

Alternatively, the POS device 105 can also retrieve a new set of transaction data from the communication device 100 over the wireless interface (wireless network interface) and in its request include the final transaction amount and/or the result of cardholder verification on the device. Upon receipt of this new transaction data, this new transaction data can be submitted for authorization, with the earlier set(s) of transaction data being discarded or corresponding authorization request(s) being reversed. In the new transaction data, the Amount Authorized would be equal to the transaction amount so that the amount in DE55 (transmitted from the communication device 100 to the POS device 105) and the amount in DE4 (transmitted from the POS device 105 to the acquirer device 300) are equal.

The above-described embodiment can therefore be generalised in that the POS device 105 collects sufficient data from the communication device 100 (and vice versa, if appropriate) for an authorization request to be transmitted from the POS device 105 to the acquirer 300 (even if the collected data is only partially defined or has not yet been fully updated). This allows for a 'tap&go' experience, thus providing ease of use and convenience for the user. Handover and the subsequent wireless communication is then used to get additional data and/or adjust the value of the final payment amount as a result of additional services (such as loyalty, couponing, tipping, or the like). This may include requesting additional or new transaction data from the communication device 100 (such as an updated application cryptogram) or may not require such new transaction data.

As described, the communication device 100 returns sufficient data to enable the POS device 105 to send an authorization request. In parallel, the POS may offer the option of hand-over and the communication device 100 may accept hand-over, so that the POS device 105 has the option for hand-over to then optimize or adjust the transaction data prior to transmitting the authorisation request to the acquirer device 300.

As well as hand-over of the type described allowing additional services to be implemented during an electronic payment transaction, such a hand-over arrangement may also allow certain problems associated with the payment to be rectified. For example, if a transaction is not successful due to a lack of necessary data being transmitted between the communication device 100 and POS device 105 via an initial 'tap' (for example, if there is a missing cardholder verification or if the chosen transaction type is not enabled for a particular user or a particular payment card), then this missing data can be transmitted via the wireless network interface once hand-over is complete. This means that the user does not have to 'tap' the communications device a second time, thus allowing ease of use and convenience for the user. Nonetheless, the use of a second 'tap' could still be used to enable the transmission of the missing data if establishing hand-over is not possible (due to network problems or the like, for example).

The missing data required for a transaction to be completed is a further example of second data that may be transmitted between the communication device 100 and POS device 105 via the second communication circuitry 102 and 107. Thus, the above-mentioned example of a second 'tap' can be defined more generally in that, when it is determined that it is not possible for the second data to be transmitted between the communication device 100 and the POS device 105 using the second communication circuitry 102 and 107, the second data may be transmitted between the communication device 100 and the POS device 105 using the first communication circuitry 101 and 106 when the communication device 100 is brought into proximity to the POS device 105 a further one or more times.

As mentioned above, an example of a transaction not being completed occurs when the communication device 100 declines a transaction for reasons of missing cardholder verification. Cardholder verification for payment card payments made using a communications device 100 such as a mobile phone or tablet computer may be implemented using a suitable Consumer Device Cardholder Verification Method (CDCVM). Various CDCVM techniques are known in the art, including, for example, a user entering a passcode into the communication device 100 (via a suitable user interface (not shown)) or by a user completing a finger print verification process (via a suitable finger print scanner (not shown)). If hand-over is not attempted or successful, the transaction is completed by having the cardholder perform verification through CDCVM followed by a second tap (thus allowing the missing data indicating that verification has been completed to be transmitted via the first communication circuitry 101 and 106). Alternatively, with hand-over, the cardholder performs verification through CDCVM and the POS device 105 receives the missing data indicating that verification has been completed over the wireless interface. In either case, the missing verification data may be transmitted as part of new transaction data transmitted from the communication device 100 to the POS device 105.

It will be appreciated that, in the above examples, the data transmitted from the communication device 100 to the POS device 105 via the first communication circuitry 101 and 106 in order to initiate the transaction is first data and the subsequent data transmitted between the communication device 100 and the POS device 105 in order to complete the transaction via either the second communication circuitry 102 and 107 (in the case that hand-over occurs) or the first communication circuitry 101 and 106 (in the case that hand-over does not occur) is second data.

Many types of data may be included as second data, depending on the type of transaction, the services offered by the merchant, the services available to the consumer and so on. In particular, the second data may comprise data for providing an additional service associated with the electronic payment. For example, the second data may be indicative of a number of loyalty points or the like acquired by the user carrying out the transaction (for display to the user of the communication device 100) or may be for updating a payment value of the electronic payment initiated using the first data (for example, by indicating that a discount should be applied, as previously described). In this case, the transaction may still be completed (in the conventional way, without loyalty points being transferred or the payment value being changed) if the second data is not transmitted. On the other hand, the second data may comprise data which is required for the transaction to be completed. For example, the second data may comprise verification data (such as CDCVM verification data) generated in response to a verification process completed by the user of the communication device for verifying the electronic payment initiated using the first data (when that verification data was not transmitted with the first data). As another example, the second data may be for updating one of payment card details used for the payment and a transaction type of the payment (as may be necessary if, for example, the transaction type is not permitted for the payment card used to initiate the transaction—for example, if transactions involving cashback are not permitted when using a particular type of payment card). With second data of this type, the transaction cannot be completed until the second data has been transmitted.

Some further examples of second data are described below.

In an embodiment, when hand-over occurs successfully, second data transmitted from the POS device 105 to the communication device 100 over the wireless network interface comprises data indicative of an electronic receipt for the transaction. In the case that there is no handover, however, the POS device 105 may still print a receipt in the conventional way.

In an embodiment, if a transaction initiated with one payment card is declined and the cardholder selects another payment card, then the resulting new transaction data can be transmitted as second data over the wireless interface. Alternatively, the cardholder can tap again so as to allow the new transaction data to be transmitted as second data over the contactless interface (or, more generally, via the first communication circuitry 101 and 106 of the communication device 100 and POS device 105 using electromagnetic induction) to complete the transaction.

In an embodiment, if a customer wants to add a tip, the customer can enter the tip amount using a user interface (not shown) of the communication device 100. Second data comprising new transaction data (with the new payment value including the tip) can then be transmitted over the wireless interface (and the initial transaction data discarded, or the corresponding authorization reversed). Alternatively, the customer can add a tip to the receipt (as occurs currently) and the authorisation request transmitted to the acquirer device 300 can include the updated payment value (including the tip).

In an embodiment, the second data includes data indicative of a link (e.g. hyperlink) transmitted to the communication device 100 so that the consumer can buy an additional item at a discount through e-commerce, for example.

In an embodiment, the second data includes data indicative of a coupon transmitted to the communication device that the consumer can use in a subsequent transaction, for example.

It will thus be appreciated that, with the present technique, hand-over from an electromagnetic induction 'tap' data transmission technique to data transmission via a wireless network allows transmission of second data between a communication device 100 and a POS device 105 in a way which is easy to use and convenient. In particular, when hand-over is successful, a user of a communication device 100 need only tap the POS device 105 once in order to allow large volumes of second data of a large number of potential types to be transmitted between the communication device 100 and POS device 105, thus improving the user experience. Furthermore, even if hand-over is not successful (for example, due to a network problem) or possible (for example, if one or both the communication device 100 and POS device 105 do not support handover), then the electronic payment may be completed in the usual way (for example, by not transmitting the second data (when the transmission of the second data is not necessary for the transaction to be completed) or by transmitting the second data via one or more further 'taps' (when the transmission of the second data is necessary for the transaction to be completed). The ease, convenience and functionality associated with carrying out an electronic payment using a communication device 100 such as a mobile phone is thus improved the availability of hand-over. At the same time, even if hand-over does not occur, the user experience is not negatively affected (since the transaction may be completed in the conventional way, using one or more further 'taps' if necessary).

As mentioned above, in embodiments, the wireless transmission of second data may be implemented using any suitable wireless technology. In particular, the wireless transmission may be implemented via a WLAN (for example, Wi-Fi®) network or mobile telecommunications network (such as LTE). The chosen wireless technology may be implemented using Google Nearby (see https://developers.google.com/nearby/) or another form of zero configuration networking, for example. The chosen wireless technology may be to be deployed in combination with one of a plurality of possible wireless topologies on the merchant side. Some example topologies are shown in FIGS. 4A to 4D.

Figure 4A:
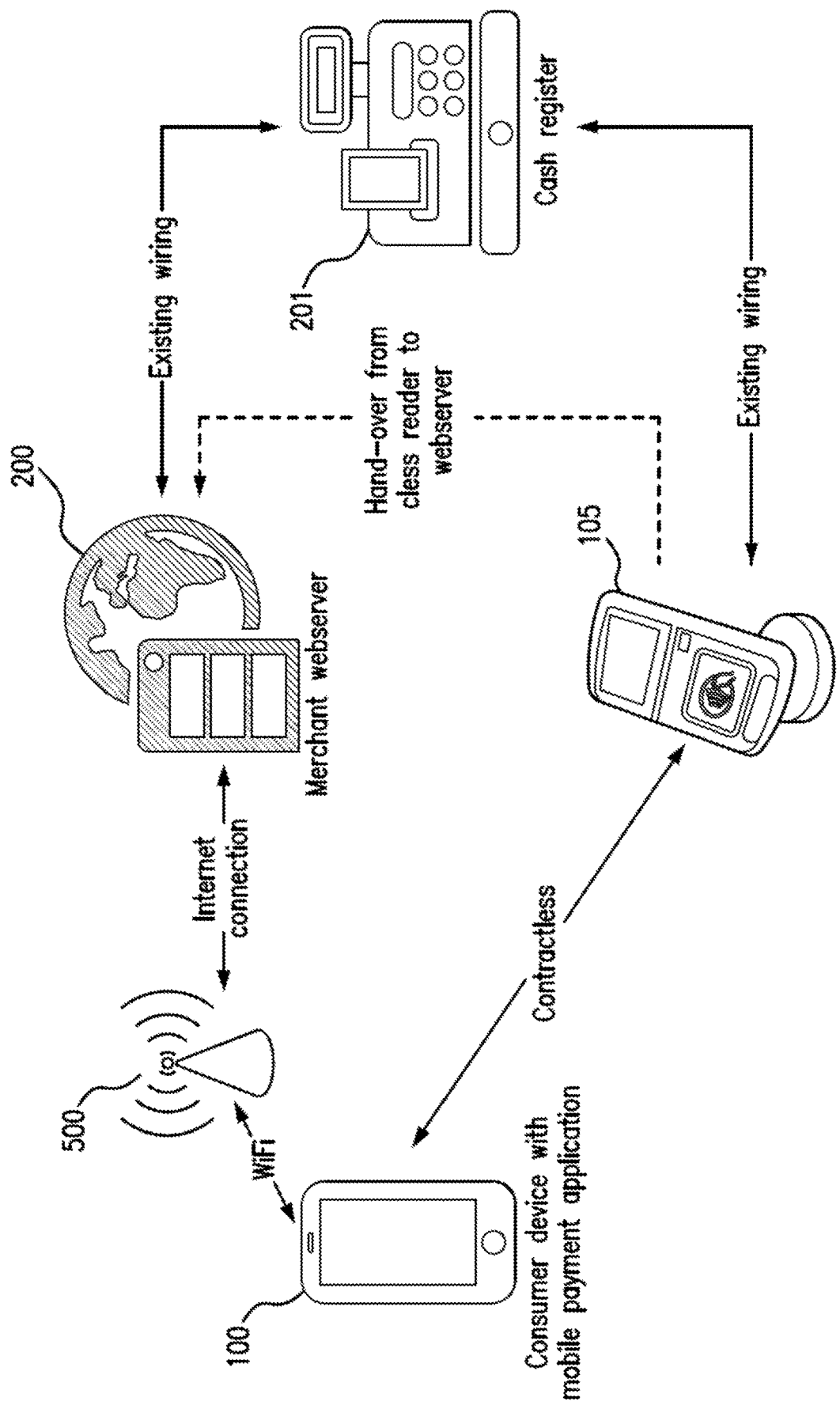
FIGS. 4A to 4D is an exemplary block diagram illustrating some example wireless topologies for use with embodiments of the present technique.

FIG. 4A shows an arrangement in which the wireless connection is implemented using Wi-Fi®. An internet connection is established between the communication device 100 and a merchant webserver 200 via a Wi-Fi® access point (base station) 500. The merchant webserver 200, in turn, is connected to a cash register 201 and POS device 105 via existing wiring. Second data is therefore transmitted between the POS device 105 and communication device 100 via the cash register 201, merchant webserver 200 and Wi-Fi® access point 500.

Figure 4B:
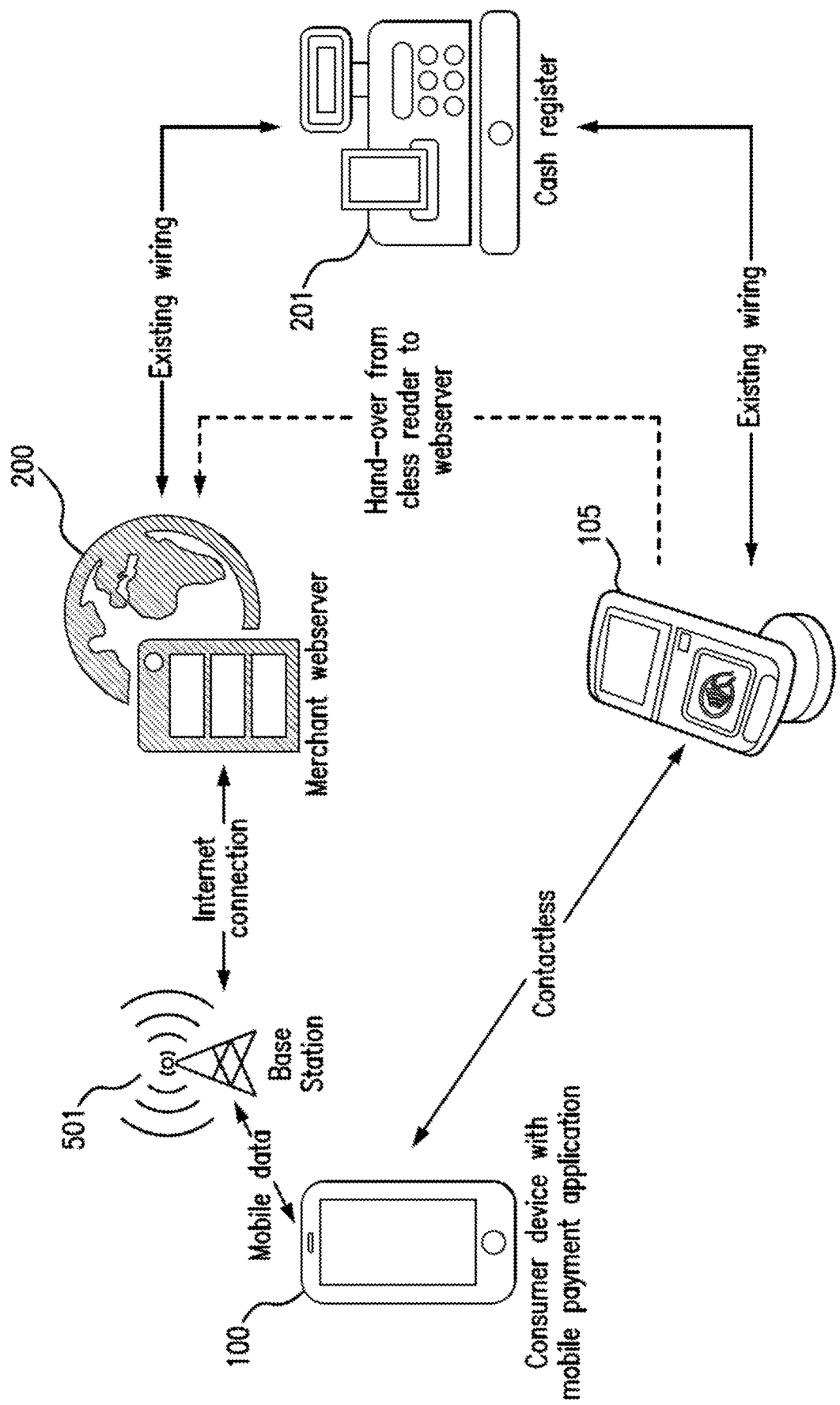

FIG. 4B shows an arrangement in which the wireless connection is implemented using a mobile telecommunications network (such as an LTE network). An internet connection is established between the communication device 100 and a merchant webserver 200 via a mobile base station 501 (mobile infrastructure equipment). The merchant webserver 200, in turn, is connected to a cash register 201 and POS device 105 via existing wiring. Second data is therefore transmitted between the POS device 105 and communication device 100 via the cash register 201, merchant webserver 200 and mobile base station 501.

Figure 4C:
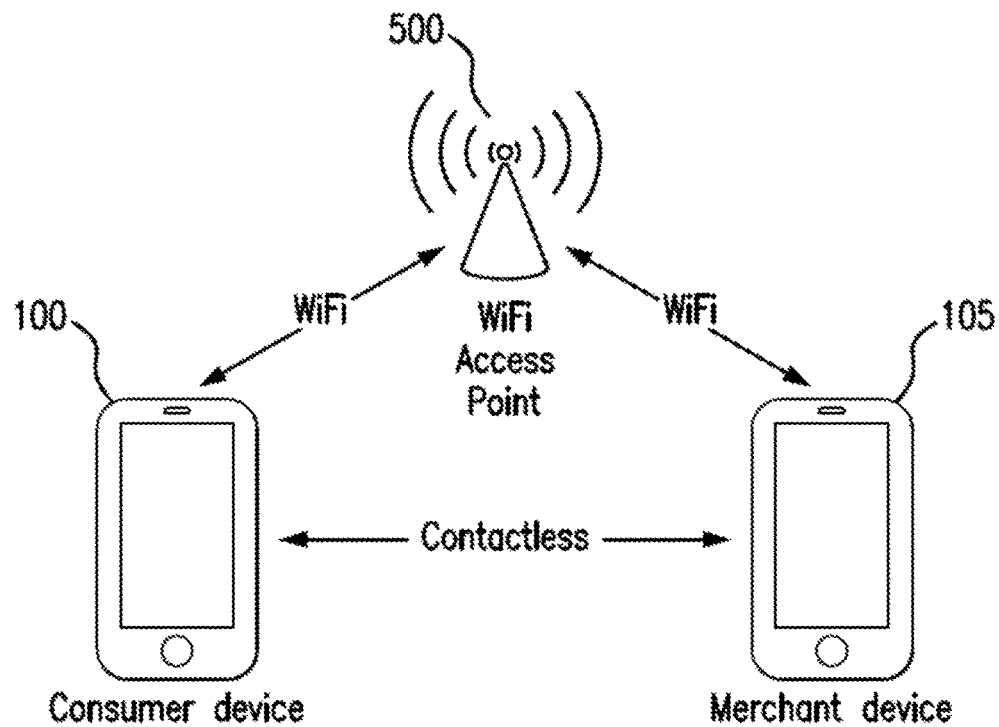

FIG. 4C shows an arrangement in which the wireless connection is again implemented using Wi-Fi®. In this case, however, the communication device 100 and POS device 105 are connected via an intermediary Wi-Fi® access point 500 (base station) without the need for an internet connection. Rather, the communication device 100 and POS device 105 are part of the same WLAN network, thus allowing second data to be transmitted between the communication device 100 and POS device 105 via the Wi-Fi® access point 500. In this case, the POS device 105 is also a communication device such as a mobile phone or tablet computer, implementing a suitable mobile software application to enable it to function as a POS device 105.

Figure 4D:
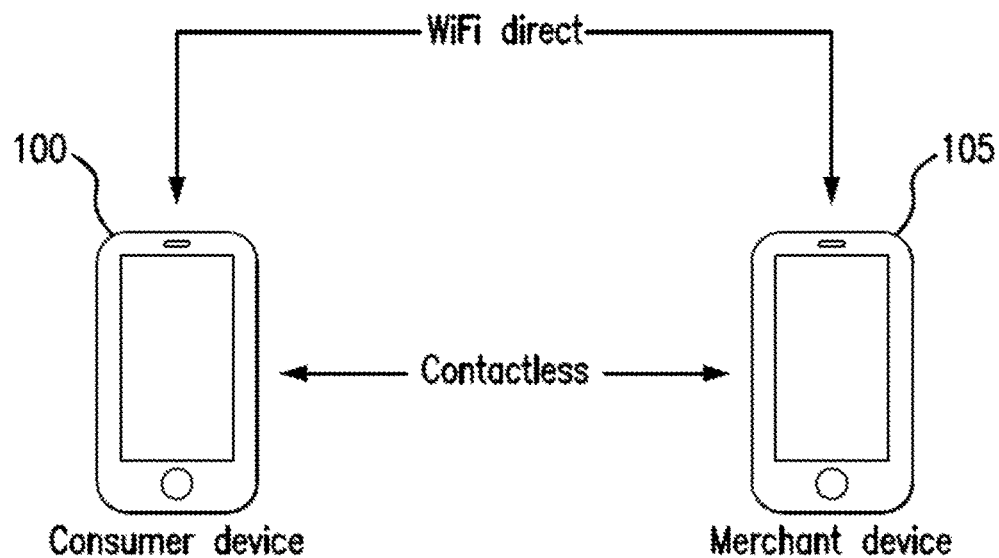

FIG. 4D shows an arrangement in which the wireless connection is again implemented using Wi-Fi®. In this case, however, the communication device 100 and POS device 105 are connected directly, that is, without any intermediary network element. Such an arrangement may be implemented using Wi-Fi® direct, for example. Wi-Fi® direct is an example of zero-knowledge network configuration (zeroconf). It will be appreciated that other suitable zeroconf network configurations could be used to enable a direct connection between the communication device 100 and POS device 106.

It is noted that, in the examples of FIGS. 4C and 4D, the POS device 105 is also a communication device such as a mobile phone or tablet computer, implementing a suitable mobile software application to enable it to function as a POS device 105.

In embodiments, the contactless kernel (implemented by the POS device 105), the mobile application (implemented by the communication device 100) and the flow between the two devices are configured such that:

[1] One device can indicate its support for hand-over to wireless, for another device to check and detect support for hand-over.

[2] Optionally, one device can indicate the reason(s) for hand-over to wireless, for another device to check whether, in combination with its own reasons, hand-over to the wireless interface is warranted and therefore accepted.

[3] One device can accept the hand-over and optionally indicate for which reasons the hand-over is accepted.

Regarding [1], in an embodiment, in order to determine whether hand-over is possible, indication data is transmitted with the first data using the first communication circuitry 101 and 106 from the communication device 100 to the POS device 105. The indication data indicates that second communication circuitry 102 of the communication device 100 is available to exchange data with the POS device 105 (and that hand-over is therefore possible with the communication device 100). The processor circuitry 108 of the POS device then determines whether the equivalent second communication circuitry is available and, if so, concludes that it is possible for the POS device 106 to transmit data to the communication device 100 or receive data from the communication device 100 via the second communication circuitry 102 and 107 (and that hand-over is therefore possible with the communication device).

In an embodiment, when the first data is transmitted between the communication device 100 and POS device 105 using the first communication circuitry 101 and 106 via Contactless and Mobile EMV® technology, a mobile application implemented on the communication device 100 can indicate its support for hand-over by transmitting the indication data in a response to a Select Proximity Payment Systems Environment (PPSE) command received from the POS device 105.

FIG. 5 shows an extract from the EMV® Entry Point, in particular, a Select Response Message Data Field (FCI) of the PPSE.

In one embodiment, an additional tag is included in the FCI. The presence of the additional tag and, optionally, its value field, indicates support (or not) of hand-over and, optionally, the wireless technologies that are available.

In another embodiment, the same mobile application is included multiple times, once with the Application Identifier (ADF Name) as it is used today (not supporting hand-over) and then once for each wireless interface it supports for implementing handover. This can be done by, for example, having a different Application Identifier (ADF Name) for the application that supports hand-over, with a different Proprietary Identifier Extension (PIX) extension for each wireless interface. In this case, the indication data is therefore the different ADF Name which indicates that the application supports hand-over. In another example, the same ADF Name can be used as that of the application not supporting hand-over, but this is used in combination with a different kernel identifier (for example, tag '9F2A') associated with this ADF Name. In this case, the indication data is therefore the ADF Name with the different kernel identifier.

In another embodiment, the mobile application can indicate its support for hand-over (and the wireless interfaces supported for hand-over) by transmitting the indication data in response to a Select Application Identifier (AID) device command received from the POS device 105. In this case, the indication data may comprise an additional data object in the File Control Information Issuer Discretionary Data (for example, tag 'BFOC'), for example. This information is passed to the contactless kernel, as per current EMV® Entry Point processing. The data included in the 'BFOC' template is used to populate the kernel data base for the transaction at the POS device 105. Therefore, the kernel can determine that the mobile application supports hand-over.

In an embodiment, given the proper value of the Processing Options Data Object List (PDOL), the POS device 105 indicates its support for hand-over and the selected wireless interface in the Get Processing Options command. That is, the response data indicating that it is possible for the POS device 106 to transmit data to or receive data from the communication device 100 via the second communication circuitry 102 and 107 is included in the Get Processing Options command.

It is noted that the above-mentioned examples allow implementing the indication and response data via Contactless and Mobile EMV® such that there is only a small impact on the EMV® Entry Point as currently defined by EMVCo®. In fact, with the exception of the embodiment in which an additional tag is included in the Select Response Message Data Field (FCI) of the PPSE, there is no impact on the EMV® Entry Point as currently defined by EMVCo®. The present technique can therefore be easily implemented in existing communication devices 100 and POS devices 105 which use Contactless and Mobile EMV® technology.

Regarding [2], a device may analyse the status of transaction, including data received from the other device, to decide whether to request (or accept) hand-over For this purpose, both the communication device 100 and POS device 105 may be configured to implement a Hand-Over Decision Process (HODeP). This may be implemented as a software additional module or process is separate from existing modules and processes as implemented in Mobile EMV®, for example. The present technique can therefore be easily implemented in existing communication devices 100 and POS devices 105 which use Contactless EMV® technology (since, for example, the necessary impact on software design (or re-design), development and testing is limited for both the communication device 100 and POS device 105).

In an embodiment, when one device sends its request for hand-over to the other device, this request includes the reason for requesting the hand-over and it may also include the reasons it supports if the other device wishes to initiate handover. For example, a mobile application (implemented by the communication device 100) may make a request for hand-over and indicates as a reason 'missing CDCVM'. At the same time, the mobile application may indicate it accepts the delivery of e-receipts, coupons, and tipping over the wireless interface (but not, for example, loyalty points). In response, the POS device 105 accepts the hand-over and indicates the reasons it accepts for hand-over. For example, the POS device 105 may indicate that it accepts 'missing CDCVM', the delivery of e-receipts, tipping, and loyalty points (but not, for example, coupons). In this case, a common list of reasons is now known to both the communication device 100 and POS device 105. The communication device 100 and POS device 105 thus know that hand-over may occur for the purpose of cardholder verification (in this case, when cardholder verification using CDCVM was not performed prior to the initial 'tap'), delivery of e-receipts and tipping. Hand-over cannot, however, occur for the purposes of loyalty points (not allowed as a reason at the communication device 100) or coupons (not allowed as a reason at the POS device 105).

In an embodiment, there are certain reasons that are always supported (that is, mandatory reasons). For example, hand-over is supported for missing cardholder verification (for example, CDCVM data) or because of change of payment card. Mandatory reasons do not need to be communicated as part of the reasons one device supports if the other device wishes to initiate handover.

The reasons for which hand-over is permitted to occur for each device form part of status information of that device (as stored in the storage medium 104 of the communication device 100 and the storage medium 109 of the POS device 105). In an embodiment, there is a dedicated software process or module that identifies the different reasons for hand-over and decides on hand-over (or not) based on the reasons for the device implementing the process or module and, when available, the reasons for another device. In the case that the reasons of another device are known, the two sets of reasons are compared. Hand-over is then permitted only for reasons which are specified by both devices as being acceptable reasons for hand-over.

As well as the reasons for a particular device, the status information may also comprise further information such as information regarding what should happen upon a failure of hand-over. For example, for each reason supported by the device for hand-over, information may be provided indicating whether the transaction can complete in a single tap without hand-over and/or whether the second data that would be transmitted via a wireless connection following hand-over may, upon failure of hand-over, instead be transmitted via a further one or more taps (that is, n taps, where n is an integer greater than or equal to 1).

The reasons for hand-over accepted by a particular device may be determined in advance and stored in a storage medium (such as storage medium 104 or 109) of that device. The reasons may also be updated by the user of the device or remotely (via the wireless network, for example). For example, if there is discovery of fraud associated with the use of discount coupons, then the merchant who issued those coupons may update each of the POS device 105 such that coupon acceptance is no longer permitted as a reason for hand-over. This prevents the coupon from being used in this case.

Figure 6:
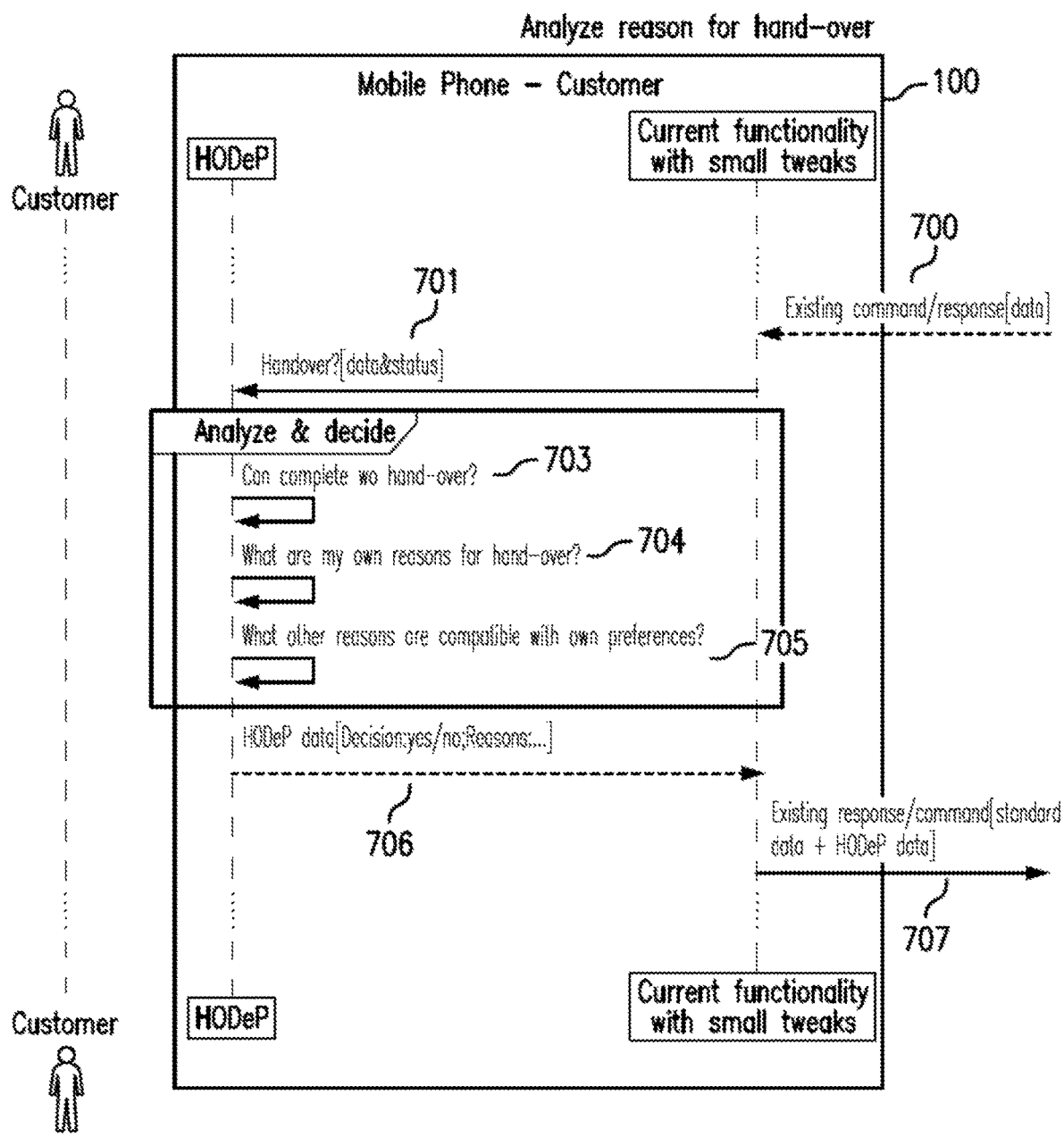
FIG. 6 is an exemplary block diagram illustrating an example part of a Hand-Over Decision Process (HODeP) process implemented by a first data processing apparatus, according to an embodiment.

FIG. 6 schematically illustrate an example part of a HODeP process implemented by the communication device 100.

In FIG. 6, at operation 700, existing command and/or response data is received and processed by the communication device. At operation 701, the handover decision process (HODep) is initiated. The data provided to the HODep at operation 701 comprises any suitable data or status information necessary for the handover decision process to determine whether or not handover should occur. At operation 703, the handover decision process determines whether or not handover can be carried out (for example, if the quality of the wireless connection necessary for handover is sufficient). At operation 704, the reasons for initiating handover in the specific case are determined. At 705, other reasons for handover (that is, reasons which are not reasons for handover at the current time, but which are nonetheless acceptable reasons for handover for the communication device) are then determined. At operation 706, the handover decision process returns the result of the handover decision process. The result comprises a decision as to whether or not handover should occur ("yes" or "no") and the acceptable reason(s) for handover. At operation 707, a response is transmitted to the POS device comprising standard data plus handover decision process data. The handover decision process data will typically include the decision ("yes" or "no") as to whether handover is to occur and the reasons (if any) for which handover is allowed to occur at the communication device 100.

Regarding [3], when a first device accepts a hand-over request from a second device, it may indicate the reasons for which the hand-over is accepted. The reasons for hand-over accepted by the first device are evaluated by the second device, and the second device takes into account its own reasons for requesting hand-over. The second device compares the reasons from the first device against its own preferences that have been captured earlier, for instance during installation and configuration of the application.

Figure 7:
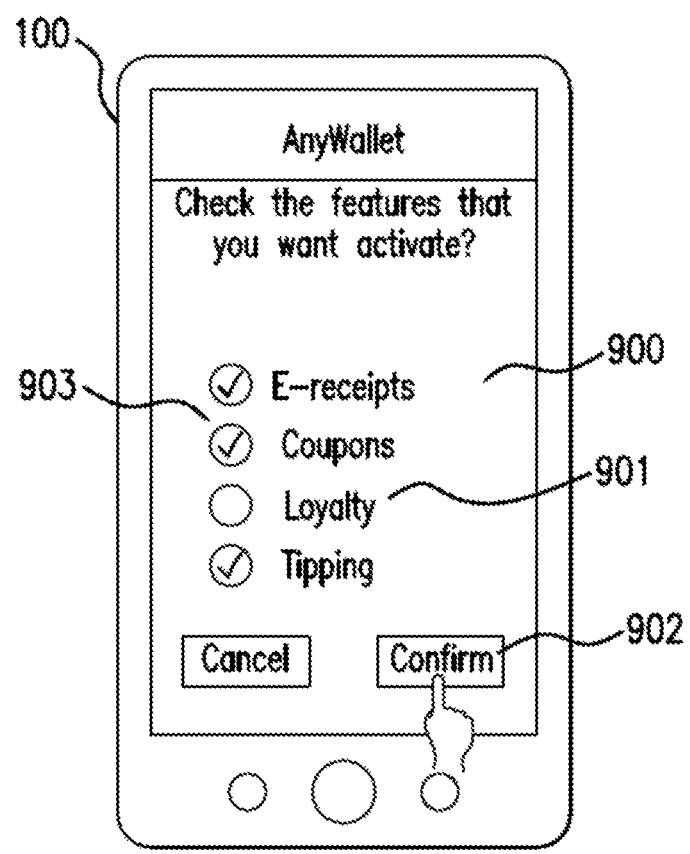
FIG. 7 is an exemplary block diagram illustrating an example selection screen displayed on a mobile phone which is used as a communication device, according to an embodiment.

For either the first or second device, the reasons for accepting hand-over may be selected in advance by the user of that device. FIG. 7 shows an example selection screen displayed on a mobile phone which is used as a communication device 100. The mobile phone comprises a user interface which the user may use to select one or more reasons for allowing hand-over. In this case, the user interface is a touch screen 900 on which a plurality of reasons 901 for accepting hand-over are displayed (it will be appreciated, however, that any other suitable user interface such as physical buttons, a trackpad or voice control interface may be used). Each reason has an associated tick box 903 which, when touched by a finger of the user, becomes selected (ticked) or non-selected (unticked). The selection of the tick box 903 associated with a particular reason may be successively toggled between being ticked or unticked by respective successive touches by the user.

In the example of FIG. 7, a user has selected the reasons of receiving e-receipts, using coupons, and tipping as acceptable reasons for hand-over, since these have been ticked using their respective tick boxes 903. On the other hand, the user has not selected the receiving of loyalty points as an acceptable reason for hand-over, since these have not been ticked using their respective tick boxes 903. Once the user is happy with the selected hand-over reasons, the user confirms their selection by selecting the "Confirm" option 902. Data indicative of each of the acceptable reasons for hand-over is then stored in the storage medium 104 of the communication device 100.

As previously mentioned, some reasons for hand-over are not subject to user preference and are therefore excluded from the list of selectable reasons for hand-over being accepted. Two examples are hand-over for the reasons of missing cardholder verification (such as missing CDCVM data) and of selecting a different payment card (for example, because the current (for example, default) card does not allow for the transaction to take place).

Other reasons may also be excluded from being available for selection or de-selection. Such reasons that are excluded may be, for example, relating to problems that need to be resolved by the consumer or the merchant in order for the transaction to take place (for example, a transaction cannot be completed with or without hand-over if CDCVM data is not provided or if a payment card cannot complete the transaction). These are different from other reasons (such as e-receipts, couponing, or loyalty) for which the transaction can still take place if they are not selected as acceptable reasons for hand-over.

Figure 8:
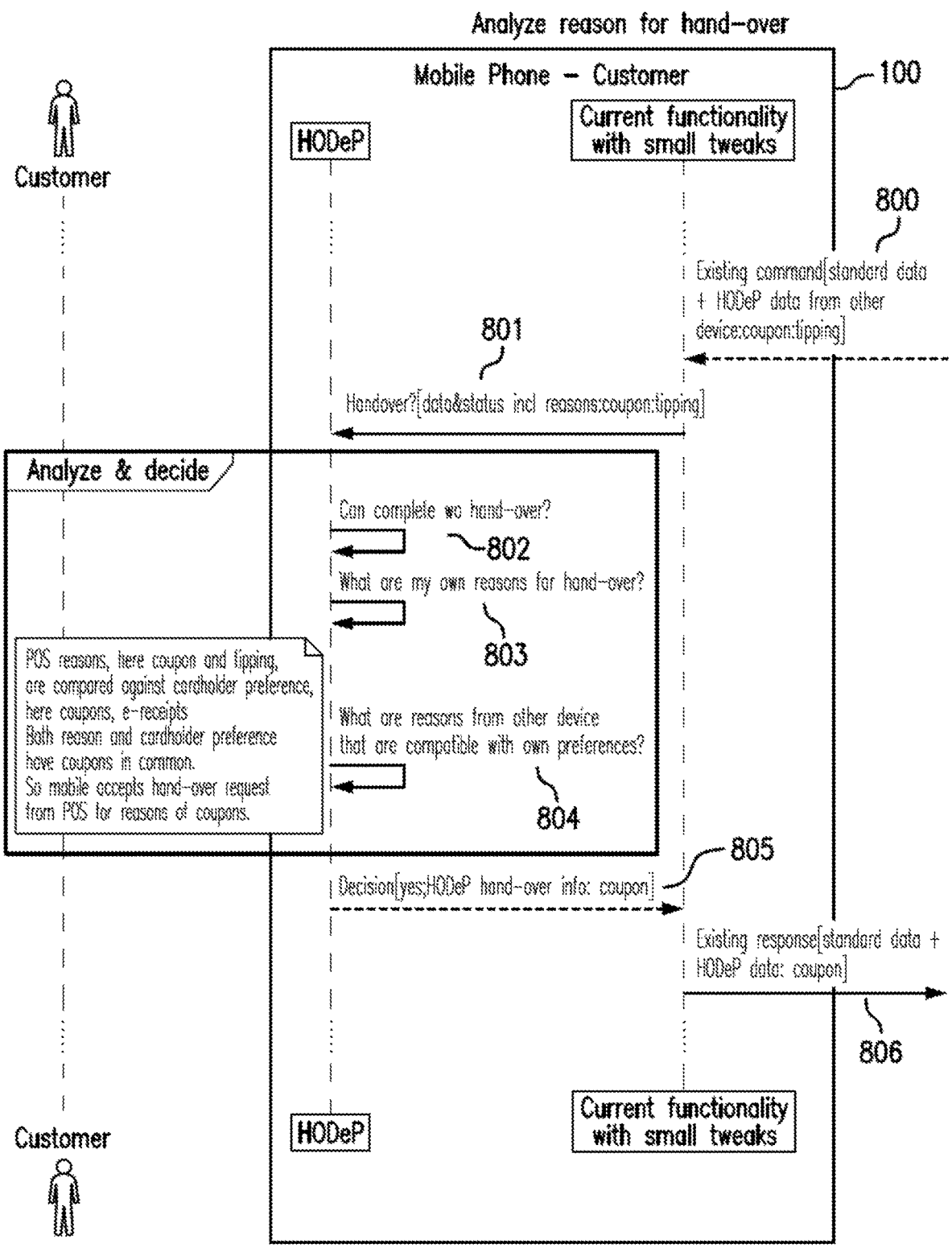
FIG. 8 is an exemplary block diagram illustrating an example part of a HODeP process implemented by a first data processing apparatus, according to an embodiment.

FIG. 8 schematically illustrates an example part of a HODeP process implemented by the communication device 100 in which reasons accepted for hand-over from another device (that is, the POS device 105) are compared against reasons accepted for hand-over for the communication device 100 itself.

In FIG. 8, at operation 800, an existing command is received from the POS device. The existing command comprises standard data together with handover decision process data from the POS device. In this case, the handover decision process data comprises data indicating that the POS device is requesting handover for the reasons of "coupons" and "tipping". At operation 801, the handover decision process (HODep) is initiated. The data provided to the handover decision process at operation 801 includes the reasons received from the POS device (in this case, "coupons" and "tipping"). At operation 802, the handover decision process determines whether or not handover can be carried out (for example, if the quality of the wireless connection necessary for handover is sufficient). At operation 803, the accepted reasons for handover at the communication device are determined. At operation 804, the determined reasons for handover which are acceptable at the communication device are compared with the reasons for handover received from the POS device. In this case, the user of the communication device has specified in advance that handover may occur for the reasons of "coupons" or "e-receipts". It is thus determined that the reason "coupons" is common to both the POS device and the communication device. The communication device therefore accepts the handover request from the POS device for the reasons of "coupons". This result is returned by the HODep at operation 805. The result indicates that handover is to be accepted and that handover is to be accepted for the reason of "coupons". Data is therefore transmitted back to the POS device at operation 806 indicating that handover has been accepted for the reason of "coupons".

In an embodiment, when hand-over requested by a first device is accepted by a second device, information transmitted to the first device from the second device indicating the acceptance of the hand-over includes the reasons of the first device that the second device accepts and, furthermore, may include further reasons accepted for hand-over by the second device. The first and second devices thus are both able to determine the accepted reasons for hand-over that are common to both devices.

In embodiments, if, after the HODeP evaluation process, there is at least one common reason for hand-over accepted by both a first device and a second device (either due to there being at least one common optional reason selected for both the first device and second device and/or there being at least one reason (such as missing CDCVM data or a need for payment card change) which is mandatory for both devices, then hand-over is initiated. Otherwise, hand-over is not initiated and the transaction completes over the contactless interface.

For example, according to the example process described by FIG. 8, the POS device 105 receives the confirmation from the communication device 100 that it agrees to hand-over, but only for the purpose of coupons. Assuming that the communication device 100 and POS device 105 also have to support the mandatory reasons 'missing CDCVM' and 'card change', the communication device 100 may also initiate or accept hand-over for the reasons 'missing CDCVM' or 'card change' (even though these were not explicitly indicated in the hand-over request and acceptance signals transmitted between the communication device 100 and POS device 105). In subsequent processing, the communication device 100 and POS device 105 may perform hand-over for the reasons of couponing (over the wireless interface), cardholder verification (for instance, through CDCVM) and/or a payment card change. Hand-over will not be performed for tipping, however (since tipping is not indicated as an accepted reason for hand-over by the communication device 100).

As discussed above, the HODeP may be implemented in each of the communication device 100 and POS device 105 as a dedicated software process or module. This dedicated software process or module may be implemented as an addition to existing functionality (appropriately amended, if necessary, to control the dedicated HODeP software process or module to run the HODeP process when required—such amendments are typically small amendments which may be carried out by a person skilled in the art of computer programming and may be referred to as "tweaks") to that the of the communication device 100 and POS device 105, thus allowing the present technique to be easily implemented in existing communication and POS devices.

It is noted that, in the case that there are no common reasons accepted for hand-over between the communication device 100 and POS device 105 (that is, the list of commonly accepted reasons for hand-over is empty), then hand-over is not initiated or accepted.

For MasterCard®, the contactless EMV® contactless payment flow, also known as M/Chip, has only two command-response pairs that may result in an abort of the transaction in progress, namely (a) the "Get Processing Options (GPO)" command-response pair and (b) the "Generate AC (GenAC)" command-response pair (for M/Chip® cards), or alternatively, the "Compute Cryptographic Checksum (CCC)" for magnetic strip cards (magstripe). These are therefore the two moments in the transaction flow in which the POS device 105 or communication device 100 may identify a reason (a so-called "blocking reason") as to why for the transaction cannot be completed.

In one example, a mobile application run by the communication device 100 may abort the transaction at the level of the GPO because conditions of use associated with the selected payment card are not satisfied. For example, a user may select a particular payment card for use in an international transaction when only domestic transactions or may select a particular payment card for use in a particular type of transaction not allowed for that payment card (for example, a transaction involving cashback when only non-cashback transactions are allowed for the selected payment card). The former may warrant selecting another card (that allows international transactions) while the latter may result in adjusting the transaction type (for instance, from "purchase with cashback" to "purchase").

In another example, the mobile application may decline the transaction in the Generate AC command (or Compute Cryptographic Checksum) because cardholder verification (through CDCVM verification, for example) was required and not performed.

With the present technique, such problems of blocked transactions may be alleviated through the use of hand-over. With existing systems, the above-mentioned example problems may be solved through the use of one or more subsequent 'taps' of the communication device 100 on the POS device 105. However, with the present technique, hand-over may be used instead of a subsequent tap, thus providing improved ease of use and convenience for the user. It will be appreciated that the transmission of many other types of data between devices that would normally require one or more subsequent 'taps' may also be implemented using hand-over instead, thus providing improved ease of use and convenience for the user.

For Visa®, the Mobile EMV® contactless payment flow has only one command-response pair that may result in an abort of the transaction in progress, namely the "Get Processing Options GPO" command-response pair. In this case, the GPO processing, including command and response, is largely based on data that is a combination of the GPO and GenAC command as used by Mastercard®. Thus, it will be appreciated that the problem of blocked transactions (for example, due to the reasons mentioned above) may also be alleviated by hand-over with the present technique in the same way as discussed above for MasterCard®.

It will be appreciated that the above-mentioned embodiments may be implemented by the processor circuitry 103 and/or 108 of the communication device 100 and POS device 105 controlling the Hand-Over Decision Process (HODeP) software process or module to be implemented prior to sending/responding to GPO or GenAC commands and adding the additional hand-over related data to the existing command/response.

Although the example HODeP processes mentioned above are implemented using a standalone software module or process, it will be appreciated that a suitable HODeP in accordance with the principles of the present technique may be implemented by any suitable software, hardware or combination of software and hardware (which may or may not be implemented within existing hardware and/or software of existing communication devices 100 and POS devices 105).

It will thus be appreciated that, more generally, in terms of the evaluation of hand-over reasons between devices, when it is determined that it is possible for second data to be transmitted between the POS device 105 and communication device 100 via the second communication circuitry 102 and 107, first type data is transmitted from the communication device 100 to the POS device 105 via either the first communication circuitry 101 and 106 or the second communication circuitry 102 and 107. The first type data indicates one or more types of second data that are permitted by a user of the communication device 100 to be transmitted between the communication device 100 and the POS device 105. The first type data therefore indicates one or more reasons for hand-over, since the transmission via hand-over of each type of data that is permitted by a user of the communication device 100 is a reason that hand-over is accepted by the communication device 100. Second type data is transmitted from the POS device 105 to the communication device 100 via either the first communication circuitry 101 and 106 or the second communication circuitry 102 and 107. The second type data indicates one or more types of second data that are permitted by a user of the POS device 105 to be transmitted between the communication device 100 and the POS device 105. The second type data therefore indicates one or more reasons for hand-over, since the transmission via hand-over of each type of data that is permitted by a user of the POS device 105 is a reason that hand-over is accepted by the POS device 105. Following the exchange of the first type data and second type data between the communication device 100 and POS device 105, only second data of one or more types permitted by both the user of the communication device 100 and the user of the POS device 105 is transmitted between the communication device 100 and POS device 105.

It is also noted that, in general terms, the second data may be of a type always permitted by both a user of the communication device 100 and a user of the POS device 105 (such as verification data or payment card change data, as previously discussed) for transmission between the communication device 100 and POS device 105.

Figure 9:
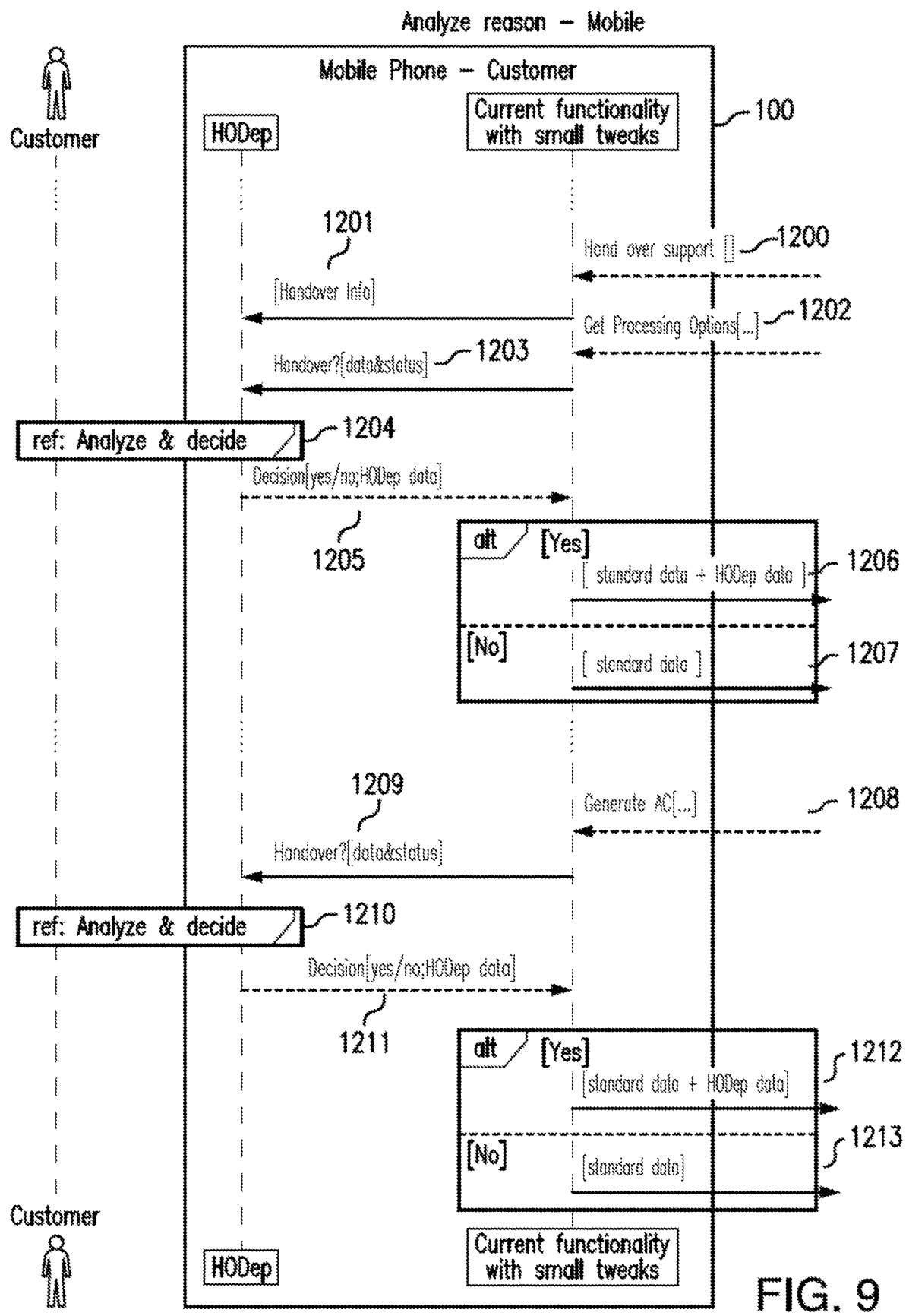
FIG. 9 is an exemplary block diagram illustrating an example data flow between existing software modules, processes and an HODeP software module process in a first data processing apparatus, according to an embodiment.
Figure 10:
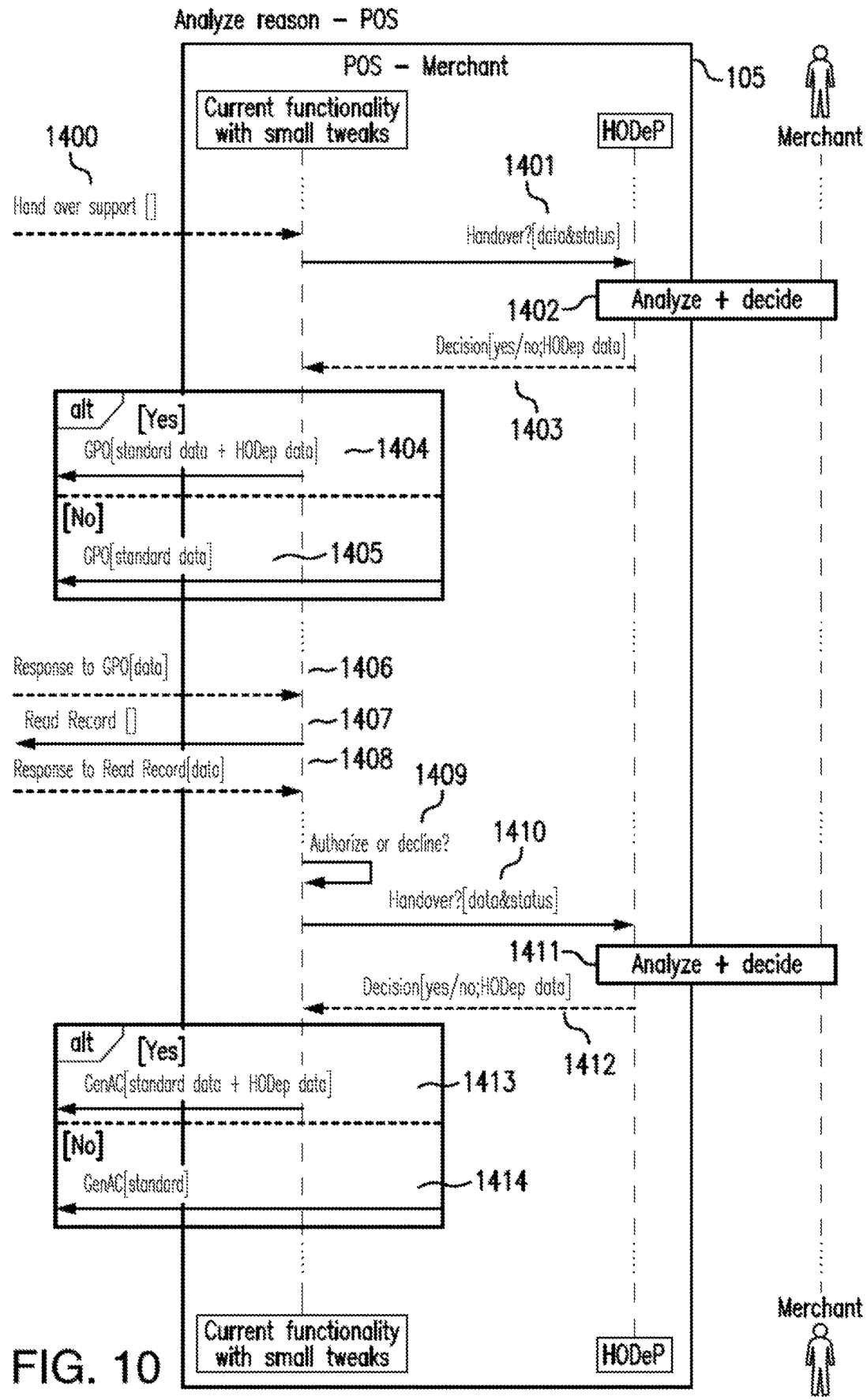
FIG. 10 is an exemplary block diagram illustrating an example data flow between existing software modules, processes and an HODeP software module process in a second data processing apparatus, according to an embodiment.

FIG. 9 schematically describes an example data flow between existing software modules/processes and an HODeP software module/process in a communication device 100. FIG. 10 schematically describes an example data flow between existing software modules/processes and an HODeP software module/process in a POS device 105. These Figures describe a Mastercard® compatible flow. However, it also describes a Visa® compatible flow if data relating to the GenAC command-response pair is removed.

In the process of FIG. 9 (carried out at the communication device 100), at operation 1200, a signal is received from the POS device 105 indicating whether handover is possible (supported) and the wireless interfaces supported by the POS device for implementing handover. At operation 1201, information indicative of the POS device's support for handover (that is, whether or not handover is supported) and the wireless interfaces supported by the POS device for handover are notified as handover information to the handover decision process. At operation 1202, a "Get Processing Options" command is received from the POS device. At operation 1203, a command is passed to the handover decision process to implement an analysis and decision procedure (like that described with reference to FIG. 6 or FIG. 8, for example) to be carried out at operation 1204. At operation 1205, a decision as to whether or not handover should take place, together with handover decision process data (indicating the acceptable reasons for handover at the communication device) is returned. In the case that it is decided that handover should occur (that is, the decision is "yes"), in response to the "Get Processing Options" command, the communication device transmits, in its response, standard data plus handover decision process data indicating the reasons for which handover is accepted at the communication device. This allows the POs device 105 to determine, from the response to the "Get Processing Options" command transmitted at operation 1206 that handover has been accepted at the communication device and the reasons for which handover is accepted. On the other hand, if handover is not accepted (that is, the decision is "no"), the response to the "Get Processing Options" command transmitted at operation 1207 is merely a standard response comprising standard data.

A similar process may occur in response to the "Generate AC" command received at operation 1208. Again, in this case, the handover decision process is notified at operation 1209 that a handover decision is made. At operation 1209, information indicative of the POS device's support for handover (that is, whether or not handover is supported) and the wireless interfaces supported by the POS device for handover are notified as handover information to the handover decision process (HODep). At operation 1210, an analysis and decision regarding handover is made. Again, the analysis and decision process may be carried out according to the operations described with reference to FIG. 6 or FIG. 8, for example. At operation 1211, the handover decision process returns a decision indicating whether or not handover is accepted ("yes" or "no") and handover decision data (for example, the reasons for which handover is accepted at the communication device). In the case that handover is accepted (that is, the decision is "yes"), the response to the "Generate AC" command is transmitted at operation 1212 and includes the handover decision process data returned by the handover decision process at operation 1211. On the other hand, if the decision is not to accept handover (that is, the answer is "no"), the response to the "Generate AC" command is merely a standard response message transmitted at operation 1213.

Thus, the POS device is able to determine whether or not handover is accepted by the communication device and what the reasons for accepting handover are at the communication device based on the presence or absence of handover decision process data in a response to a "Get Processing Options" command or "Generate AC" command.

In the process of FIG. 10 (carried out at the POS device 105), at operation 1400, a signal indicating whether or not handover is supported by the communication device 100 and the wireless interfaces supported for implementing handover is received by the POS 105. At operation 1401, a command is passed to the handover decision process to implement an analysis and decision procedure to be carried out at operation 1402. At operation 1402, an analysis and decision process are carried out. The process carried out at operation 1402 at the POS device 105 may be similar to the analysis and decision process carried out by the communication device in operations 703, 704 and 705 described with reference to FIG. 6, for example. At operation 1403, the handover decision process returns a decision indicating whether or not handover is acceptable and the reasons for accepting handover. In the case that handover is determined to be acceptable, the "Get Processing Options" command is transmitted at operation 1404 and includes the handover decision process data indicating the reasons for handover accepted by the POS device 105. On the other hand, if it is determined that handover is not acceptable, the "Get Processing Options" command is transmitted to the communication device 100 at operation 1405 without any additional handover decision process data (that is, the "Get Processing Options" command is transmitted in its standard form). At operation 1406, the response to the "Get Processing Options" command is received. As previously described with reference to FIG. 9, the response to the "Get Processing Options" command may comprise standard data in addition to handover decision process data (see operation 1206 of FIG. 9) or may comprise only standard data (see operation 1207 of FIG. 9). At operation 1407, the POS device 105 transmits a "read record" command to the communication device 100. At operation 1408, the communication device returns a response to the "read record" command. The response comprises data indicative of the type of transaction (for example, international transactions or national transactions only, whether or not transactions with cash back are permitted, or the like) associated with a payment card used by a user of the communication device in carrying out payment. Based on the response at operation 1408, the POs device is then able to authorise or decline the transaction at operation 1409. In the case that handover is permitted (based on, for example, a commonly accepted reason for handover as transmitted by the POS device at operation 1404 as part of the "Get Processing Options" command and as received with the response to the "Get Processing Options" command received at operation 1406), a decline of a transaction may result in the user being able to select a different payment card and/or a different transaction type and for the process to be completed via the wireless connection established for handover.

As alternative to performing the HODep at the "Get Processing Options" stage described above, the POS device may instead determine whether to initiate or accept handover and to thus establish a wireless connection with the communication device 100 following the authorisation of payment at operation 1409. In this case, at operation 1410, a command is passed to the handover decision process to implement an analysis and decision procedure to be carried out at operation 1411. At operation 1411, it is determined as to whether handover should occur and the reasons for this. In this case, the analyse and decision process 1411 may again comprise operations similar to those described with reference to FIG. 6 (in particular, operations 703, 704 and 705 of the analysis and decision process carried out for the communication device 100). At operation 1412, a decision as to the acceptance of handover (that is, "yes" or "no") and the acceptable reasons for handover at the POS device are returned. If accepted, a "Generate AC" ("Gen AC") command is transmitted to the communication device at operation 1413. The "Gen AC" command in this case comprises the handover decision process data provided at operation 1412. In particular, the "Gen AC" command comprises data indicative of the reasons that the POS device will accept handover. On the other hand, if handover is not accepted at operation 1412, then the "Gen AC" command is transmitted without any additional data (that is, in its standard form). The communication device 100 is therefore able to determine whether or not handover is accepted by the POS device and the reasons for acceptance in the case that handover is accepted. This is based on the presence or absence of handover decision process data in the "Gen AC" command transmitted by the POS device 105.

Whether the handover decision process data of the POS device is received with the "Get Processing Options" command at operation 1404 or the "Gen AC" command at operation 1413, it will be appreciated that the communication device may carry out a process such as that described with reference to FIG. 8 in order to determine its own reasons for handover acceptance and the common reasons (if any) that it has with the POS device.

It is noted that, in FIG. 9, only one of the transmission of handover decision process data with the "Get Processing Options" command response (see operation 1206) and the transmission of handover decision process data with the "Generate AC" command response (see operation 1212) is necessary. Similarly, with reference to FIG. 10, it will be appreciated that only one of the transmission of the handover decision process data with the "Get Processing Options" command (see operation 1404) and transmission of the handover decision process data of the POS device with the "Generate AC" command (see operation 1413) is required. As long as the communication device is aware of the reasons accepted for handover by the POS device (and vice versa), the determination of whether handover is possible for the given transaction can be determined.

Regarding the communication device 100 (as exemplified by FIG. 9), if hand-over is supported by the POS device 105 on a wireless interface that is also supported by the communication device 100, then the communication device 100, prior to completing the transaction (through an abort, a decline or an approval), provides the data retrieved from the POS device 105 and its own status information to the communication device HODeP. This process then returns whether hand-over should be initiated or not either upon a request transmitted by the POS device 105 or upon a request transmitted by the communication device 100. If the HODep decides that hand-over should occur, then the HODep will provide the additional necessary data (to be transmitted as part of second data using the second communication circuitry 102 and 107). On the other hand, when the HODeP decides against hand-over, then no additional data is returned. The data returned to the POS device 105 is thus the same as the current response.

Regarding the POS device 105 (as exemplified by FIG. 10), the approach is very similar. After having received transaction data from the communication device (which may be partial, if the mobile aborts at time of GPO, for example), the POS device 105 sends this data and its own status to the POS HODeP. The HODeP then returns whether hand-over should be initiated or not, either upon a request transmitted by the POS device 105 or upon a request transmitted by the communication device 100. If the HODep decides that hand-over should occur, then the HODep will provide the additional necessary data (to be transmitted as part of second data using the second communication circuitry 102 and 107). On the other hand, when the HODeP decides against hand-over, then no additional data is returned. The data returned to the POS device 105 is thus the same as the current response.

It will be appreciated from the information of FIGS. 9 and 10 that the modifications to the existing software application (s) run on the communication device 100 and POS device 105 to provide their respective existing functionality are very limited, because these modifications simply involve passing of data (to HODeP) and appending the returned data to the existing command or response. This allows the improved functionality provided by the present technique to be easily implemented in existing communication devices 100 (such as mobile phones, tablet computers and the like) and POS devices 105 (such as EMV® Contactless readers or the like).

Alternatively, the data returned by HODeP, if any, can be exchanged through a separate and dedicated command response pair outside of the existing EMV flow. For instance, it could send by the Entry Point. In this case, there is no impact on the part of the EMV flow that is driven by the kernel.

It will be appreciated that, if necessary, in order to establish the wireless connection so as to allow transmission of data between the communication device 100 and POS device 105 via the second communication circuitry 102 and 107, suitable credential information necessary for establishing the wireless connection may be transmitted between the communication device 100 and POS device 105 via the first communication circuitry 101 and 106. The use of credential information in this way helps to ensure that any wireless connection established between the communication device 100 and POS device 105 is secure so that data transmitted over the wireless connection between the communication device 100 and POS device 105 cannot be intercepted by a third party. It also ensures that the communication device and POS device used in the transaction communicate with each other (and not with another POS device or communication device in the vicinity—this is known in the industry as session management).

The exchange of credential information for establishing a secure wireless connection between a communication device 100 and POS device 105 is discussed in US 2013/0097080 A1, for example.

Figure 11:
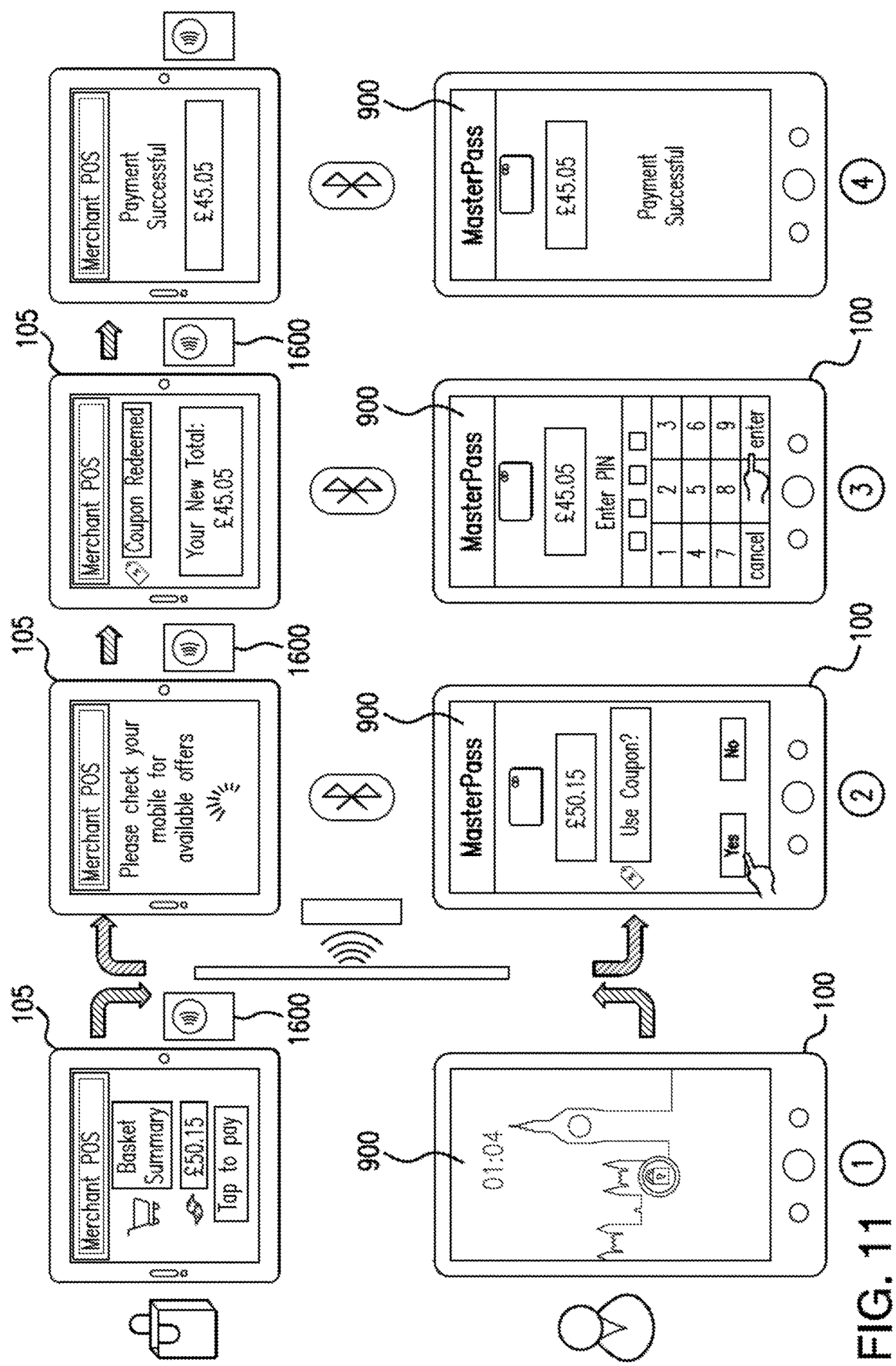
FIG. 11 is an exemplary block diagram illustrating a first use scenario of the present technique, according to an embodiment.
Figure 12:
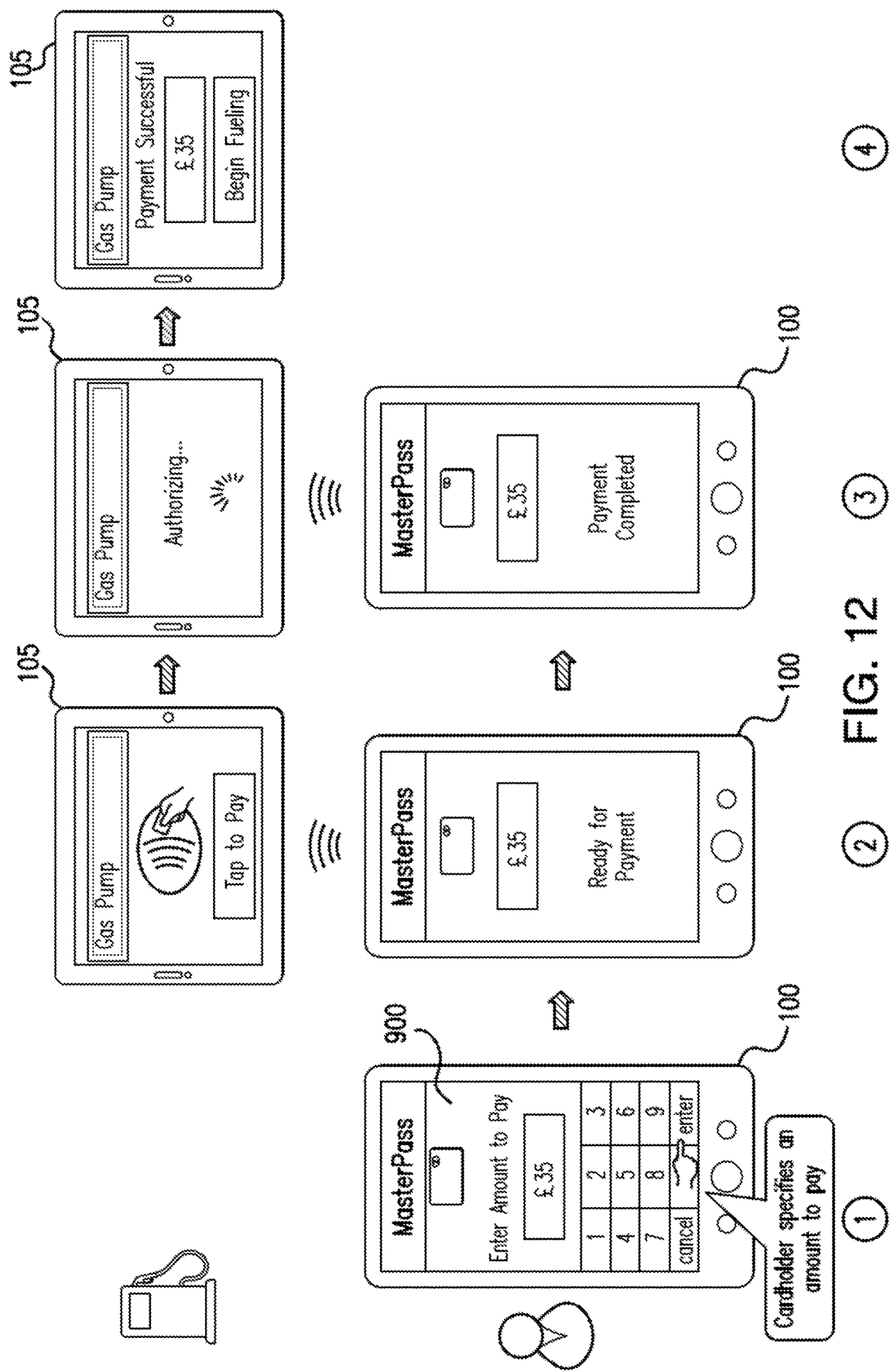
FIG. 12 is an exemplary block diagram illustrating a second use scenario of the present technique, according to an embodiment.
Figure 13:
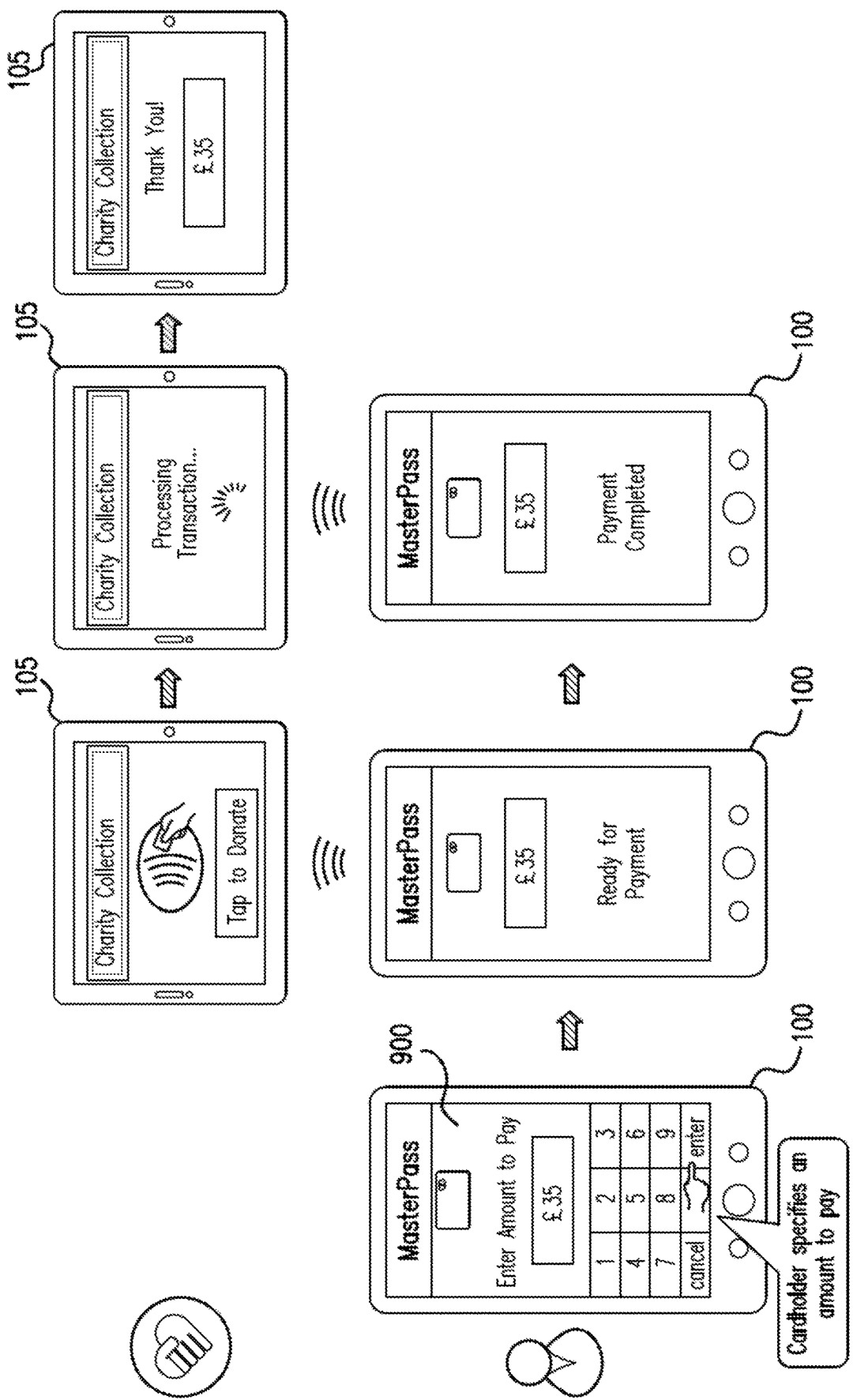
FIG. 13 is an exemplary block diagram illustrating a third use scenario of the present technique, according to an embodiment.

FIGS. 11 to 13 show some example uses cases of the present technique, according to embodiments.

FIG. 11 schematically shows an example in which the second data is coupon data for allowing a user of a communication device 100 to obtain a discount on the price of a good or service they are purchasing. At operation (1), the price of the good or service to be purchased by the user is displayed a screen of a POS device 105 (in this case, a tablet computer with an external EMV® Contactless reader 1600 attached to it). The user taps the communication device 100 on the reader in order to initiate payment. Hand-over is also initiated at this point, and, at operation (2), the POS device 105 determines whether there are any coupon-based offers or discounts applicable for the user. Information indicative of such offers or discounts may be acquired from data stored on the communication device 100 and/or stored on an external merchant webserver (as merchant webserver 200 as previously mentioned). A screen 900 of the communication device 100 then displays the possible offers or discounts to the user and gives the user an option as to whether or not to use one or more of those offers or discounts. In this case, as shown in operation (3), the users select "yes" to using a discount coupon, which reduces the price of the good or service to £45.05 (previously £50.15, without the discount coupon). The user then verifies the payment (in this case, by entering a personal identification number (PIN)) and, at operation (4), the payment at the discounted price is completed successfully. In this case, the second data transmitted between the communication device 100 and POS device 105 is the data relating to the coupon which allows the discounted price to be determined. The second data is transmitted via the second communication circuitry 102 and 107 upon successful hand-over (in this case, via Bluetooth®).

It will be appreciated that the use case of FIG. 11 illustrates that, through the present technique, it is possible to implement a complex payment scenario involving loyalty, coupons, and the like in the face-to-face environment. For example, considering plastic payment cards as the payment instrument, a customer generally has to swap between multiple cards in order to complete a payment with loyalty points and/or coupons. The present technique recognises that, when communication devices such as mobile phones are used as the payment instrument, the user experience is improved as loyalty points and coupons may be available in digital form. The user is thus able to complete a complex transaction involving loyalty points, coupons, or the like with a single device, thus improving the user experience. The experience may involve multiple tapping: once to use the coupon, once to perform payment, and possibly once more for performing verification CDCVM. However, with the present technique involving hand-over, the user experience is further optimized, as the customer only need tap once and the remaining processing occurs seamlessly.

FIG. 12 schematically shows an example in which the second data comprises a payment amount chosen by a user. This provides an alternative payment experience in which the customer (using their communication device 100) initiates payment of a chosen amount (rather than the payment amount being entered at the POS device 105). An example of where this may be useful is at vehicle fuelling stations. Currently, in some regions, at a fuelling station, a customer begins by inserting a payment card into a slot at the fuel pump. Further information may also be entered at the pump, such as a fuel type selection, address verification information or the like. This experience may be improved with the present technique, as illustrated in FIG. 12. At operation (1), the user enters the amount (in the relevant currency) of fuel that they wish to pay for (in this case, £35) using a touch screen 900 of their communication device 100 (in this case, a mobile phone). At operation (2), the user is invited to 'tap' the communication device 100 on the POS device 105 (implemented as part of the fuel pump, for example). This allows a wireless connection to be established between the communication device 100 and POS device 105. At operation (3), data indicative of the chosen amount is transmitted to the POS device 105 using the established wireless connection (as second data). At operation (4), the payment process is completed and the POS device 105 allows the amount of fuel specified by the user to be dispensed. In this example, the 'tap' of the communication device 100 on the POS device 105 may comprise taking a payment of a placeholder amount from the user (as previously described). The actual amount paid by the user is then the amount transmitted at operation (3) via the wireless connection.

FIG. 13 schematically shows another example in which the second data comprises a payment amount chosen by a user. In this example, the transaction is charity donation. The POS device 105 may therefore be carried by representatives of a charity at a charity event, for example. Attendees are able to donate funds by first specifying the amount they wish to donate and then 'tapping' to complete the transaction. The mechanism behind this is like the fuel pump example described with reference to FIG. 12. At operation (1), the user enters the amount of money (in the relevant currency) that they wish to donate (in this case, £35) using a touch screen 900 of their communication device 100 (in this case, a mobile phone). At operation (2), the user is invited to 'tap' the communication device 100 on the POS device 105. This allows a wireless connection to be established between the communication device 100 and POS device 105. At operation (3), data indicative of the chosen amount is transmitted to the POS device 105 using the established wireless connection (as second data). At operation (4), the payment process is completed. The user of the communication device 100 is therefore able to make a charity donation of an amount of their choice easily and conveniently. In this example, the 'tap' of the communication device 100 on the POS device 105 may comprise taking a payment of a placeholder amount from the user (as previously described). The actual amount paid by the user is then the amount transmitted at operation (3) via the wireless connection.

FIGS. 14-23 show some further example applications of the present technique. In each of the Figures, a series of screenshots are shown to illustrate how a user might interact with the communication device 100. In these examples, the communication device 100 is a smartphone with a touch screen display 900. It will be appreciated, however, that the described functionality could also be implemented with another type of user interface (such as non-touch display with physical buttons and/or a touch pad or the like). The functionality of FIGS. 14-23 is implemented by a software payment application stored in the storage medium 104 and executable by the processor 103. Such a software payment application ("app") may take various forms and may be made available at an online store such as the Apple® App Store (for iOS® devices) or Google® Play Store (for Android® devices).

Figure 14:
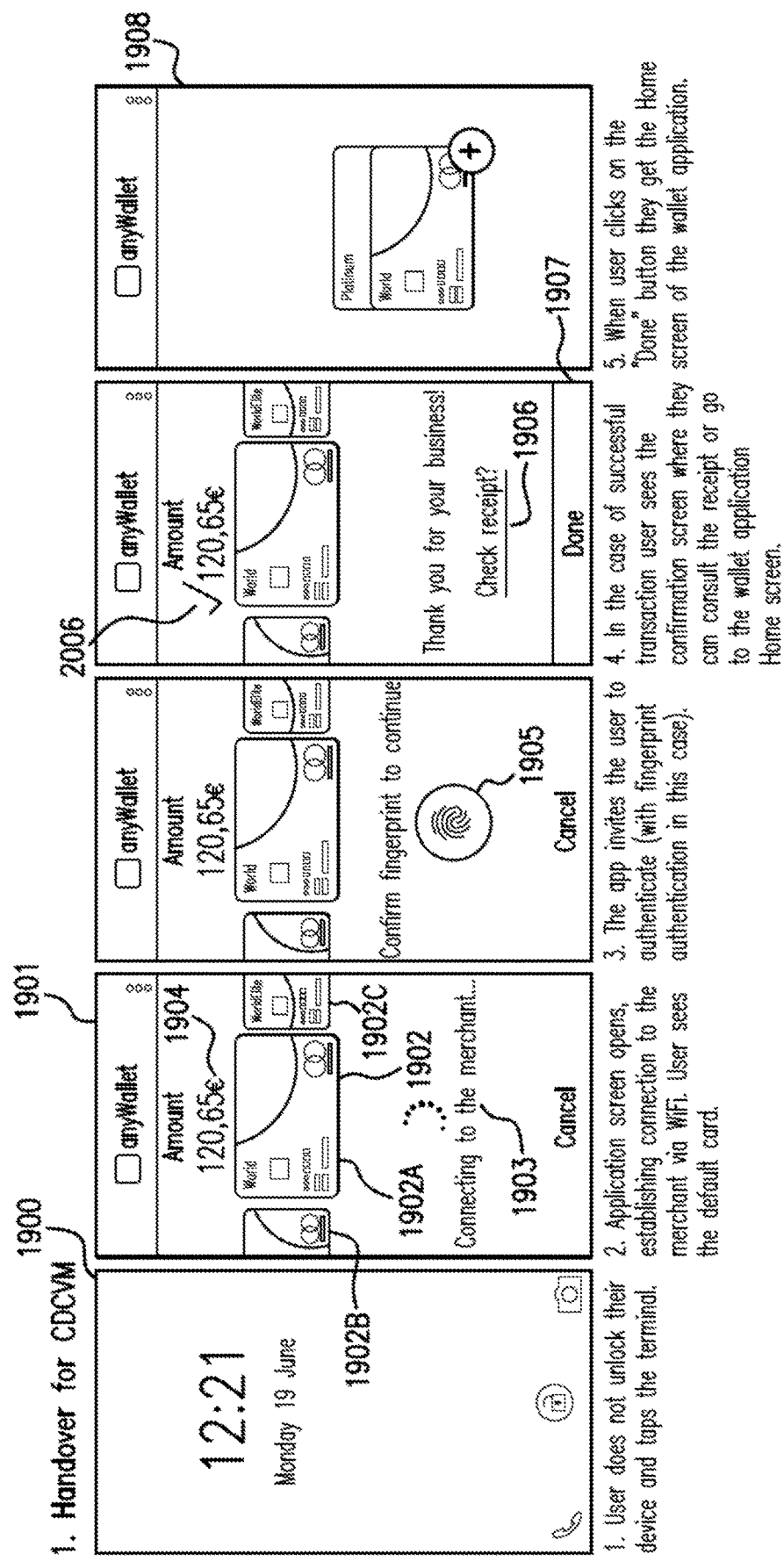
FIG. 14 is an exemplary block diagram illustrating a fourth use scenario of the present technique, according to an embodiment.

FIG. 14 illustrates an example in which card holder verification (CDCVM) is needed but was not performed prior to or at the time of the initial 'tap' of the communication device 100 on the reader of the POS device 105. Verification is therefore performed over a wireless connection via the second communication circuitry 102 and 107. Throughout this description, the term "wireless connection" should be understood to mean a connection established between the communication device and POS device via the second communication circuitry 102 and 107. It is noted that the example process described with reference to FIG. 14 may be combined with any of the processes of FIGS. 15-23.

At operation 1, a home screen 1900 is displayed on the display of the communication device. The user taps the communication device on a reader (such as an NFC reader) of the POS device to initiate a transaction. The user does not unlock their device (in this case, using their fingerprint) at this stage.

At operation 2, a payment application screen 1901 is displayed. The payment application screen shows electronic images of a number of payment cards belonging to the user (the details of these payment cards will have previously been stored on the communication device 100 by the user). The user is informed by indicator 1903 that the communication device is attempting to connect to the POS device (merchant device) by a wireless connection (in this case, Wi-Fi®). The payment card 1902A is a default card selected by the user. It is visually distinguished from the other cards 1902B and 1902C on record by being displayed such that it is larger than the other cards. In addition to the cards, the amount of the transaction 1904 is displayed.

At operation 3, because cardholder verification has not yet occurred, the user is asked to provide their fingerprint by the indicator 1905. The communication device 900 is provided with a fingerprint scanner (not shown) in order to allow this. The use of fingerprint scanners in communication devices such as mobile phones and the like is known in the art and is therefore not described here. It will also be appreciated that other methods of authenticating the users identify could be used, such as asking the user to provide a passcode or through the use of image authentication techniques such as iris or facial recognition. Again, such authentication techniques are known in the art and are therefore not discussed in detail here.

At operation 4, following successful card holder verification from the user (in this case, a successful fingerprint authentication), the user is informed by indicator 2006 (which, in this case, takes the form of a "check" or "tick" mark) that the transaction has been completed successfully. In this example, the user is given a further option of viewing an electronic receipt by selecting the "check receipt" link 1906. When finished, the user selects the "done" button 1907 at operation 5, and the application screen returns to a payment application home screen 1908 of the payment application, which, in this case, shows visual images indicative of some of the payment cards the details of which are electronically stored on the communication device 100.

Figure 15:
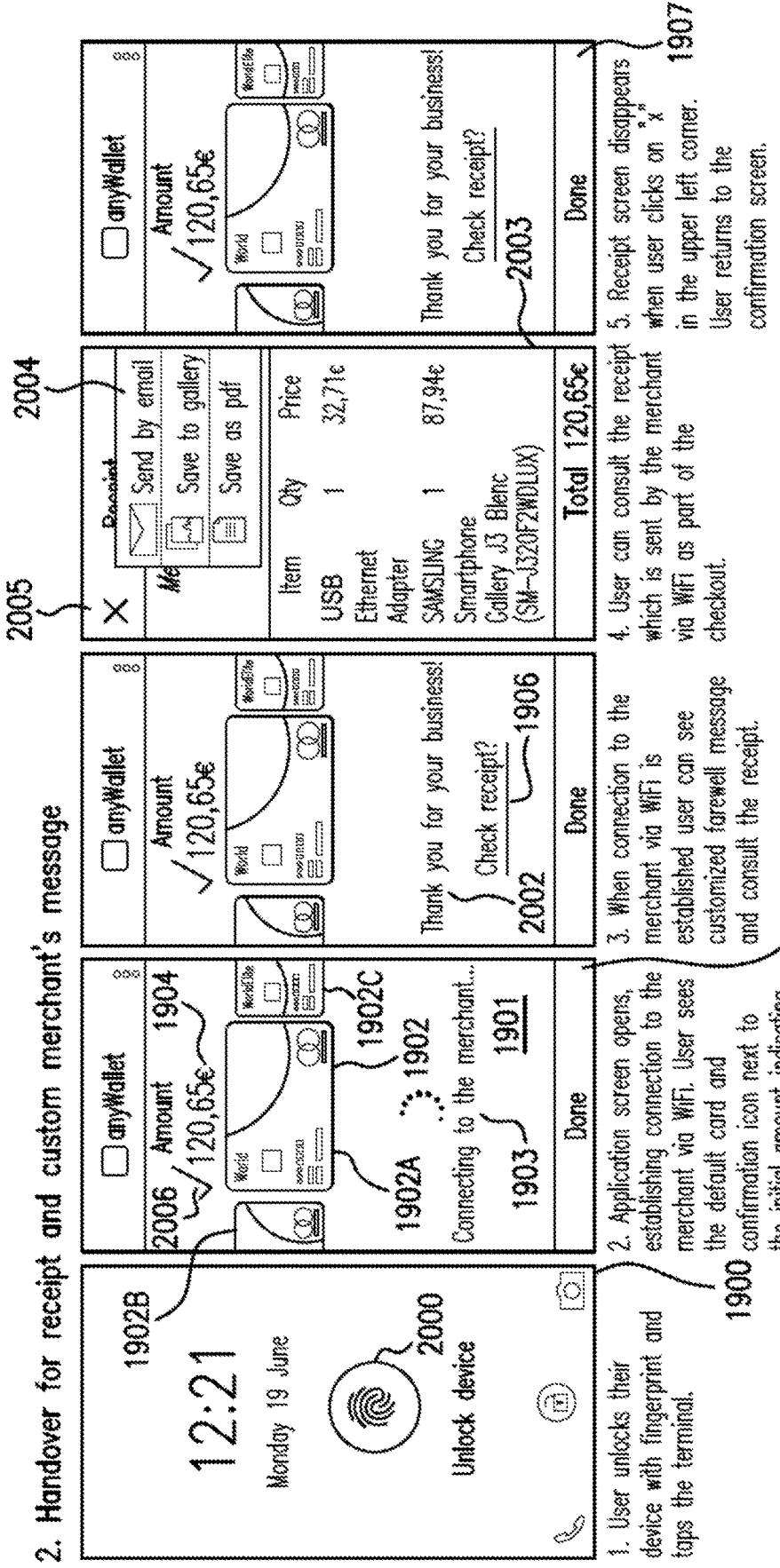
FIG. 15 is an exemplary block diagram illustrating a fifth use scenario of the present technique, according to an embodiment.

FIG. 15 shows an example arrangement in which an electronic receipt is transmitted to the communication device over the wireless connection. At operation 1, the home screen 1900 is displayed. In this case, however, the user unlocks the device at the same time as they tap the communication device on the reader of the POS device 105. The user is prompted to unlock the device by the notification 2000.

At operation 2, the payment application screen 1901 is again opened and a number of stored electronic payment cards are displayed to the user. The electronic payment cards again include a default electronic payment card 1902A and other selectable payment cards 1902B and 1902C. Again, the amount of the transaction 1904 is displayed on the payment application screen. In this case, because the user has already verified the payment by unlocking the device with their fingerprint prior to or at the same time as tapping the communication device on the reader, the payment at operation 2 proceeds without the user having to undertake any further operations. The payment is therefore completed at operation 2 (as indicated by indicator 2006) and the user can proceed by pressing the "done" button 1907 in order to proceed to operation 3.

At operation 3, the user is provided with a message 2002 from the merchant. This message is transmitted over the wireless connection and may be customised by the merchant. In this case, the message is thanking the user for their business. The user is again given the opportunity to view an electronic receipt by selecting the "check receipt" button 1906. If the user selects the "check receipt" button 1906, then the process proceeds to operation 4, in which an electronic receipt 2003 is displayed. The user is furthermore given a number of selectable options 2004 regarding actions to be taken with the electronic receipt 2003. In this example, the options 2004 include allowing the user to send the receipt by email, to save an electronic image of the receipt in an electronic image gallery or to save the receipt as a PDF file. In the case that the electronic receipt is saved as an image or PDF file, it will be stored in the storage medium 104. Once the user has viewed the receipt 2003 and selected any further appropriate option 2004, the user is able to exit the receipt by selecting the close button 2005.

At operation 5, the selection of the close button 2005 brings the application screen back to a form in which it notifies the user that the transaction is complete (this is the same screen as displayed at operation 3). The user is then able to end the payment process by selecting the "done" button 1907.

Figure 16A:
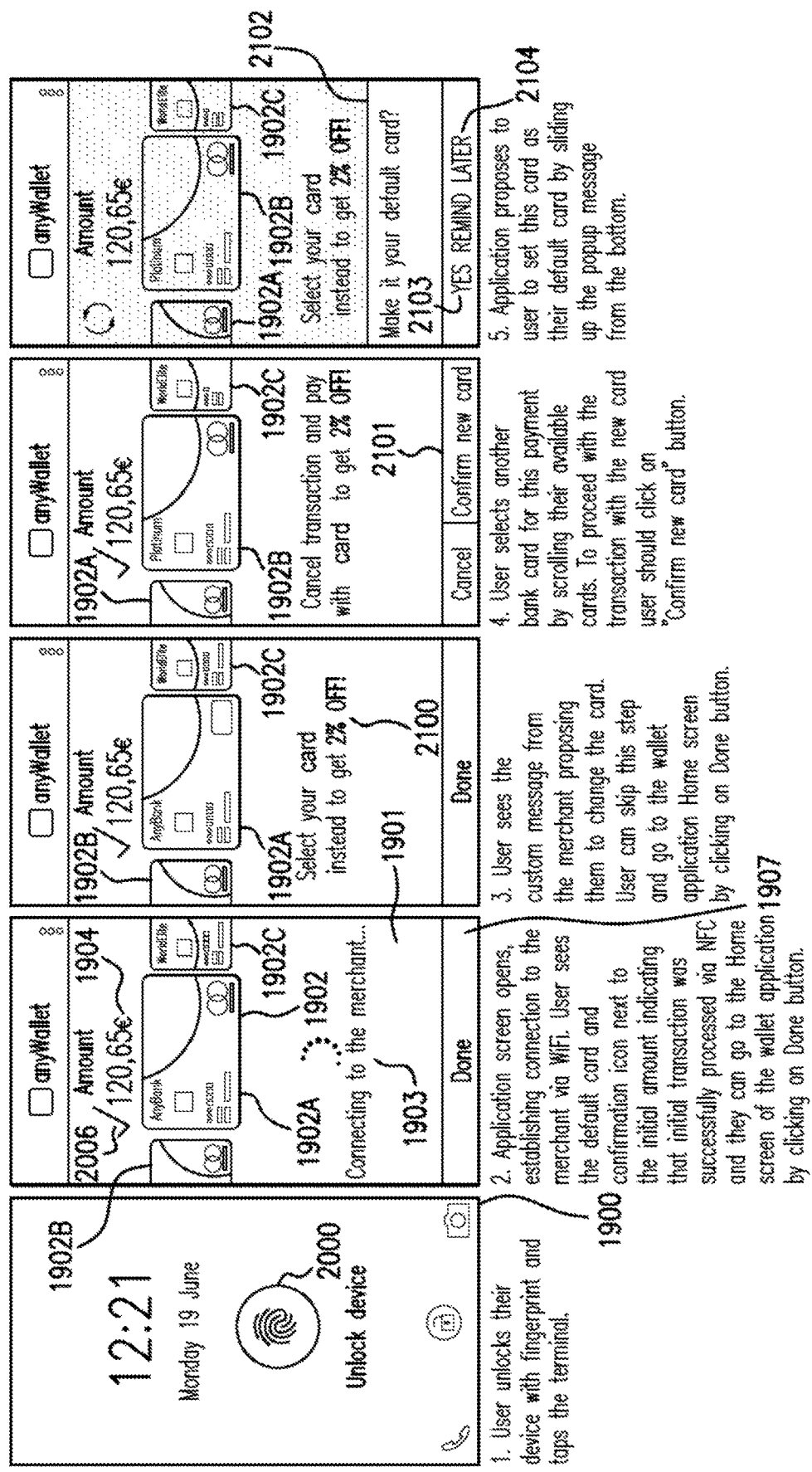
FIGS. 16A and 16B is an exemplary block diagram illustrating a sixth use scenario of the present technique, according to an embodiment.
Figure 16B:
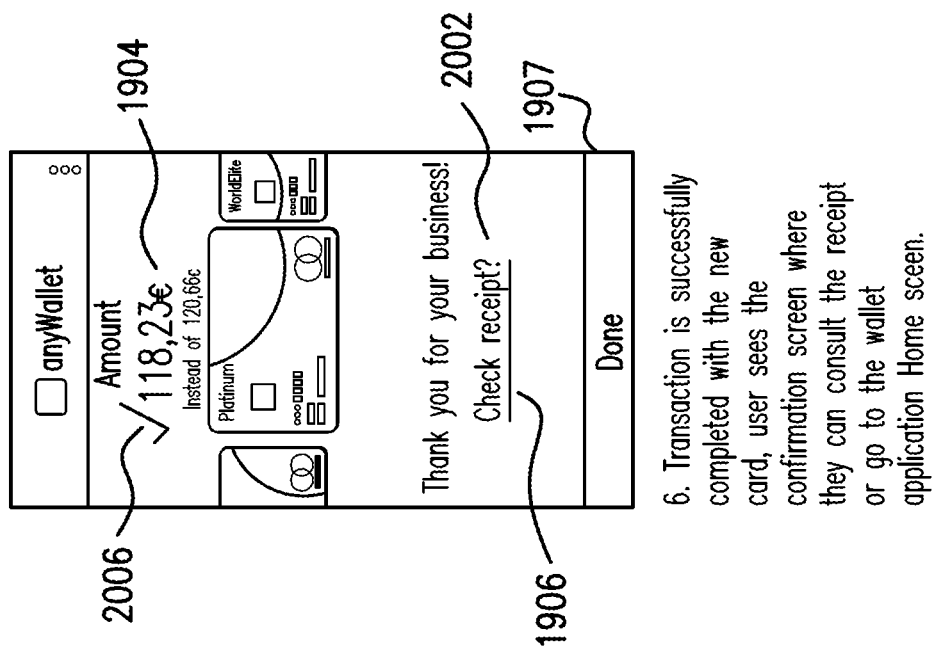

FIG. 16 shows an example arrangement in which a user is incentivised to use a different payment card to the payment card (for example, the default card) previously selected to complete a particular transaction. At operation 1, the home screen 1900 is shown to the user. The user taps the communication device 100 on to a reader of the POS device 105 and unlocks the communication device using their fingerprint. At operation 2, the user is informed (by indicator 2006) that the payment has occurred successfully. Again, the payment amount 1904 and a selection of electronic payment cards 1902 is displayed. In this case, as in operation 2 of the process described with reference to FIG. 15, the transaction is completed using the default payment card 1902A. The user may therefore complete the payment process by pressing the "done" button 1907. On the other hand, if the user waits for a wireless connection to be established with the POS device, the process proceeds to operation 3, in which the user sees a message 2100 informing them that they will get a discount (in this case, 2%) by selecting a specific different card. In this case, the discount is applied if the user chooses to use their "Maestro" card 1902B instead of the default card 1902A. The user may therefore select the card 1902B (by, for example, using their finger to perform a dragging action to the left on the currently selected card 1902A so that the card 1902B is selected instead of the default card 1902A). Again, it can be seen that the card 1902B is selected because it is visually indicated as a larger image when compared to the non-selected cards 1902A and 1902C. The user is able to confirm the use of the new card by selecting the "confirm" button 2101. At operation 5, the user is presented with an option 2102 to make the newly selected card 1902B the default card (that is, the card that is automatically selected for payment) for future transactions instead of the current default card 1902A. The user may select either the "Yes" button 2103 or the "reminder later" button 2104. Only selection of the "Yes" button 2103 will result in the default card being changed to the newly selected card 1902B.

At operation 6, the user is informed (by indicator 2006) that the transaction at the discount price (which replaces the transaction at the original price shown in operation 1) is complete. In this case, the discount has been applied so as to provide an amended total transaction amount 1904. The user is again given the option to view an electronic receipt 1906 and is provided with a "thank you" message 2002 from the merchant. The user is then able to end the transaction process by selecting the "done" button 1907.

Figure 17:
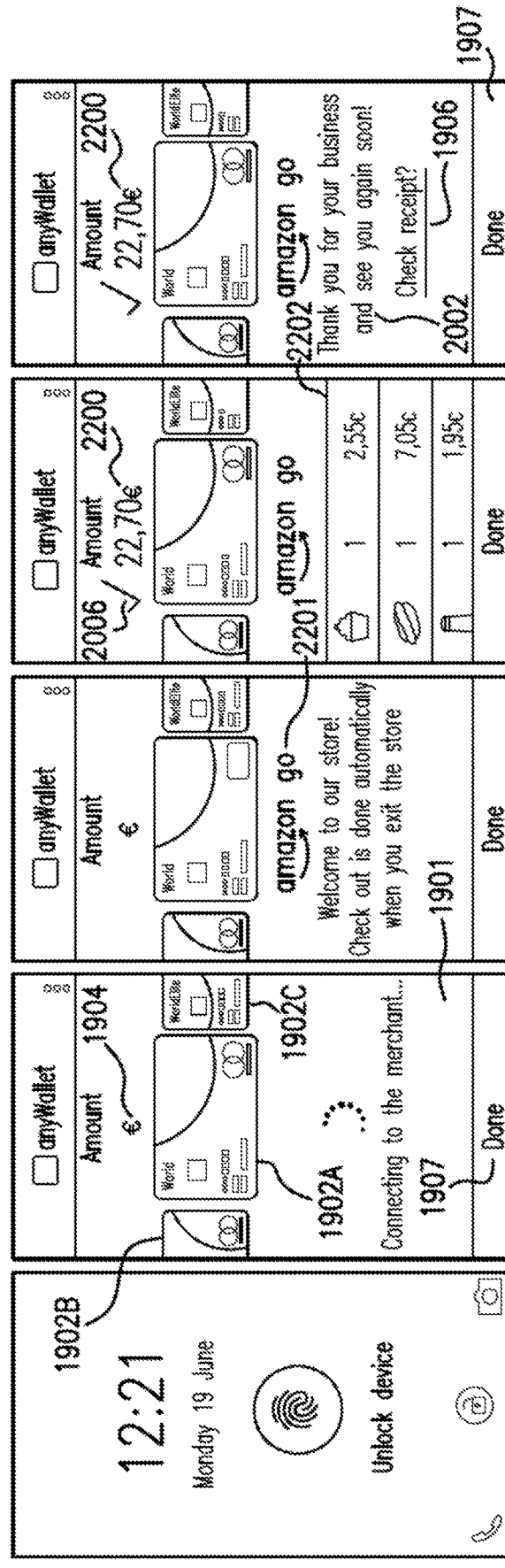
FIG. 17 is an exemplary block diagram illustrating a seventh use scenario of the present technique, according to an embodiment.

FIG. 17 shows another application of the present technique in which a user is able to purchase a number of items in a store without having to go through a physical checkout process. Such functionality is provided via a service such as Amazon® Go or the like, more information about which may be found at https://www.amazon.com/go, for example.

At operation 1, the user is again presented with the home screen 1900 and is prompted to unlock the device using their fingerprint prior to or at the same time as tapping the communication device 100 on a reader of the POS device 105. At operation 2, the application screen 1901 is shown in the usual way. In this case, however, the total transaction amount 1904 is not yet known. The total transaction amount is automatically incremented by the price of items for sale picked up by the user as they walk around the store. In this case, the "done" button 1907 is not selectable by the user (it appears "greyed out" so that the user can visually see that it is not selectable, for example) since the transaction is completed automatically when the user is detected as leaving the store. At operation 3, the user is presented with a welcome message 2201 from the provider of the store. The message includes information informing the user that checkout is done automatically when the user exits the store and that going to a physical checkout is therefore not necessary. At operation 4, the user starts shopping, that is, walking around the store and picking up items that they wish to buy. Each item picked up by the user is automatically added to a list of items to be purchased. The list is updated for each item picked up and carried by the user. In this case, a list 2202 of the items selected and carried by the user in the store is shown on the payment application screen. It can also be seen that the total transaction amount 1904 has been increased in accordance with the items to be purchased by the user. Furthermore, it is indicated by indicator 2006 that the total transaction amount is confirmed (informing the user that they are able to leave the store because the items picked up have been paid for). At operation 5, when the user leaves the store, the application screen provides a further message 2002 from the store thanking the user for their business. As usual, the user is presented with the option 1906 to view a receipt electronically on the device. The process is then ended by the user selecting the "done" 2001 button.

Figure 18B:
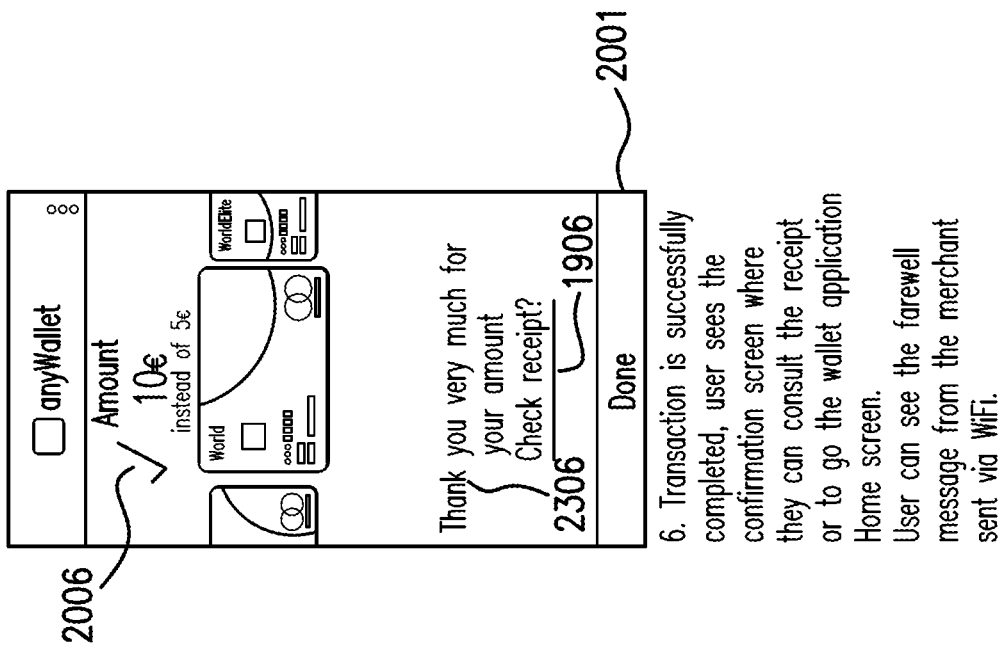

FIG. 18 shows an example arrangement in which a user may donate one of a predetermined selection of payment amounts to a charity. At operation 1, the user is again presented with the usual home screen 1900. The user unlocks the device using their fingerprint before or at the time of tapping the communication device 100 onto a reader (in this case, an NFC reader) POS device 105. It is noted that, throughout this description, the term "reader" refers to an element of the POS device 105 comprising the first communication circuitry 106 The user is informed by information 1903 that a wireless connection with the merchant is being established. A donation amount 2300 is shown. Furthermore, an indicator 2301 is shown next to the payment amount 2300 to indicate that the payment via NFC has been successful (it is noted that the payment via NFC may therefore be successful even if a wireless connection with the merchant is not possible, as previously discussed). At operation 3, the wireless connection with the merchant is established, and the user is presented with a number of selectable payment amounts 2302. In this case, the selectable payments amounts are €10, €15, €20, or "other amount". The user is thus easily able to select an appropriate payment amount by selecting an appropriate one of the options 2302. Information indicative of the options is transmitted to the communication device 100 over the wireless connection from the merchant. In this case, a default amount (of €5 in this example) is automatically selected as the payment amount. If the user is happy with this amount, then they may skip the selection of the payment by pressing the "done" button 1907. On the other hand, if the user wishes to change the payment amount, then they may do so by selecting an appropriate one of the selectable payment buttons 2302. In this case, the user has chosen to select a different payment amount by selecting the "€10" option. It will be appreciated that the user could have also selected one of the other options. In the case that the user selects "other amount", the user is presented with an on-screen numerical keypad or the like so as to enable them to manually enter a desired payment amount which is not presented as one of the predetermined payment amount options. In this case, as shown in operation 4, the user selects the "€10" option, and it is seen that payment complete indicator 2006 is replaced with the payment update symbol 2305. The donation amount is updated over the wireless connection with the merchant, and the process proceeds to operation 5. At operation 5, the user is able to proceed with the process by selecting the "update payment" button 2303. On the other hand, if the user does not then wish to change the payment amount, then they may select the "skip update payment" button 2304. Selection of the button 2304 will result in the application screen returning to that described with reference to operation 3. On the other hand, if the user selects the button 2303, then the updated payment amount is confirmed. It is noted that, at operation 4, the selection by the user of an updated payment amount results in the payment amount 2300 being updated via the wireless connection. The fact that the payment amount is to be updated is indicated by the update indicator 2305 at operation 5. The user then selects the button 2303 to confirm the payment. This results in the confirmation screen being shown in operation 6. Here, the user is informed (by indicator 2006, which replaces indicator 2305) that the payment of the updated amount (updated via the wireless connection) has been completed successfully. The user is also presented with a "thank you" message 2306 from the charity (again, transmitted over the wireless connection). The user may then view a receipt by selecting option 1906 or may complete the process by selecting the "done" button 1907. It is noted that charity donation processes such as that described with reference to FIG. 18 may be implemented as part of a commercial transaction in a store or the like. In this case, prior to the user completing the payment for a good service, they may be presented with the opportunity to make a charity donation in the way as described with reference to FIG. 18. Such a process may be an additional process provided via the wireless connection and the donated amount may be added to the total amount of the purchased goods and services. The user is thus able to make a donation to a charity in an easy and convenient manner as part of the normal transaction process used when purchasing goods or services from a merchant.

Figure 19A:
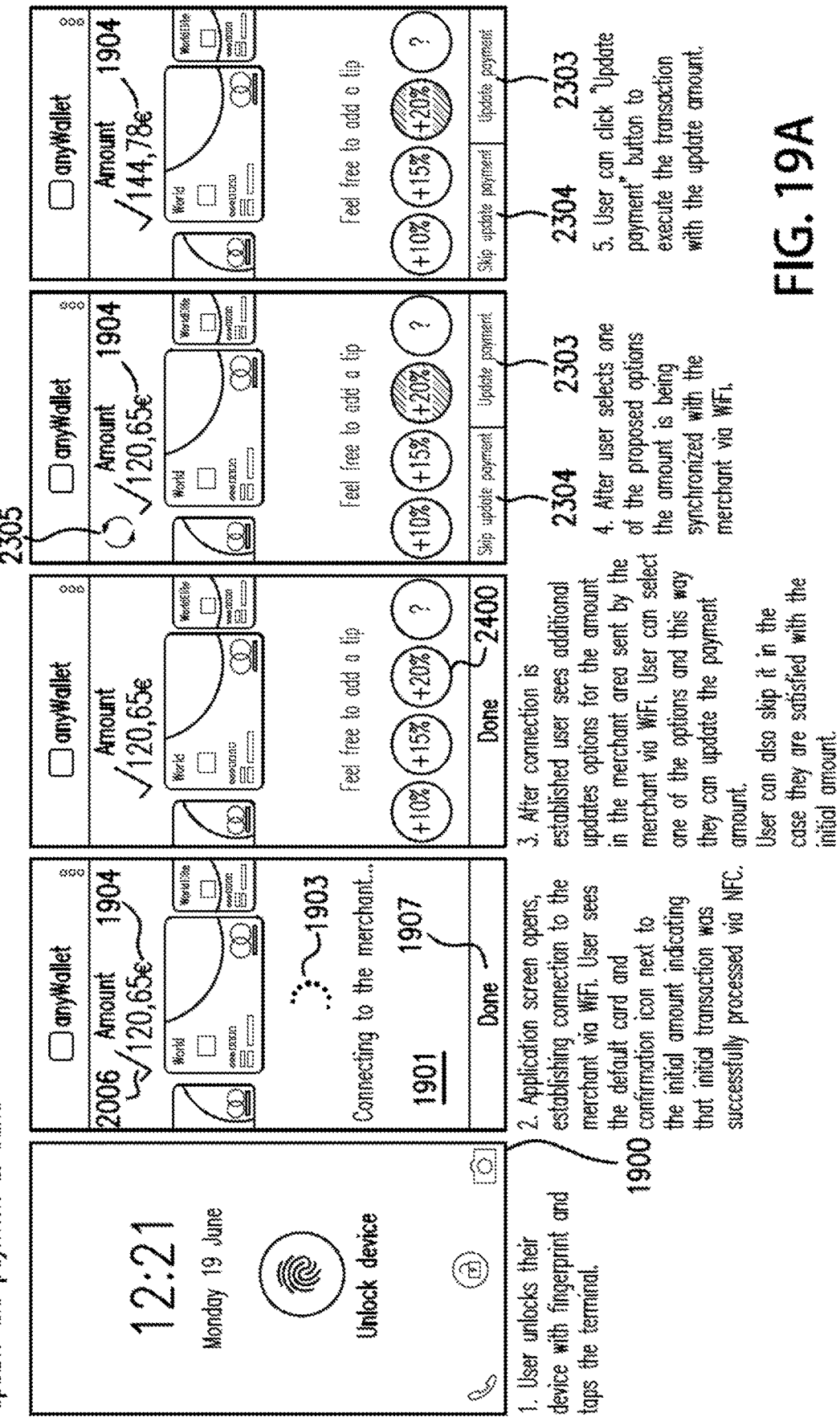
FIGS. 19A and 19B is an exemplary block diagram illustrating a ninth use scenario of the present technique, according to an embodiment.
Figure 19B:
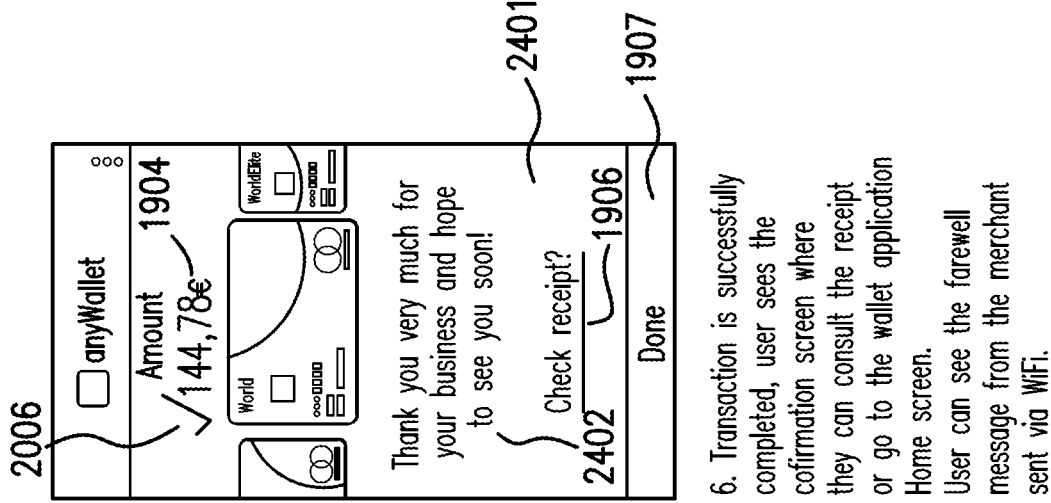

FIG. 19 shows an example arrangement in which a user may add a tip to a total payment amount when paying for a restaurant meal or the like. Again, at operation 1, the user is presented with a home screen 1900 and unlocks the communication device 100 using their fingerprint prior to or at the same time as tapping the communication device 100 onto a reader of the POS device 105. At operation 2, the user is presented with the payment application screen 1901, which includes the total transaction amount 1904 and the indicator 2006 indicating that the payment via NFC has been successful. The user may therefore leave the restaurant at this stage, knowing that the transaction amount has been successfully paid. That is, the user will know that the transaction amount will have been successfully paid via NFC (in particular, contactless) even if the user does not wait for a wireless connection to be established with the merchant (the indicator 1903 indicating that the wireless connection is being established). The user may therefore select the "done" button 1907 prior to the wireless connection with the merchant being established. The transaction amount will still be paid due to the verified NFC payment. In this example, the user waits for the wireless connection with the merchant to be made. At operation 3, a number of tipping options are provided to the user, in a similar way to that described with reference to FIG. 18 regarding a selection of a charity donation amount. The user is presented with a number selectable tip options, each of which is associated with a different tipping amount. In this case, there are 3 predetermined tip options of 10%, 15% and 20%. Furthermore, there is again an "other amount" option, which allows a user to manually enter a numerical tip amount (either a percentage or an absolute currency value) using a numerical keypad or the like (not shown). In this case, as shown in operation 4, the user selects the 20% tip option, and it is seen that payment complete indicator 2006 is replaced with the payment update symbol 2305. The payment amount is updated over the wireless connection with the merchant, and the process proceeds to operation 5. It is seen that the user is again presented with a "skip update payment" button 2304 and an "update payment" button 2303. Selecting the button 2304 will result in the application screen returning to that described with reference to operation 3. On the other hand, selecting the button 2303 will result in the payment with the updated payment amount (as determined depending on the selected tip amount) being confirmed and the process proceeding to operation 6. At operation 6, it can be seen that the total payment amount 1904 has been successfully updated with the selected tip amount (in this case, a 20% tip has been added and therefore the total amount is now 20% higher than it was originally). The confirmation screen 2401 shown at operation 6 displays the final transaction amount 1904 (which is now displayed along with the indicator 2006 which informs the user that the amount has been confirmed). The confirmation screen 2401 also includes a message 2402 from the merchant and, again, the user is able to view an electronic receipt of the transaction by selecting the "check receipt" 1906 button. The process is then completed by the user selecting the "done" button 1907.

Figure 20B:
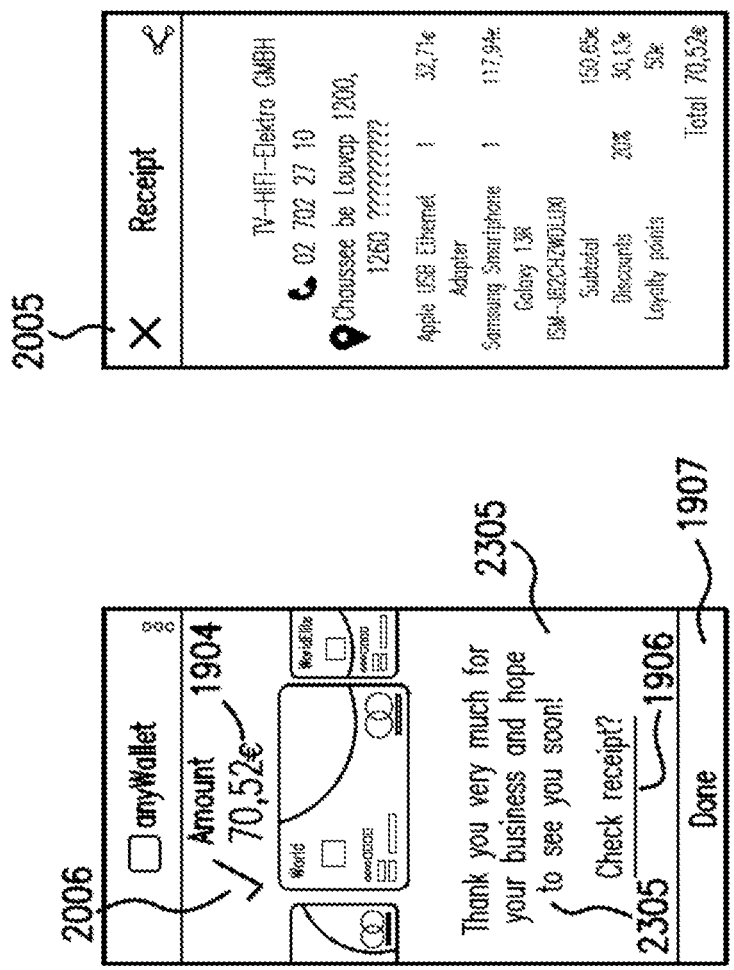

FIG. 20 shows an example arrangement in which coupon and/or loyalty options are provided to the consumer. At operation 1, the user is again shown the home screen 1900. The user unlocks the communication device 100 with their fingerprint before or at the same time as tapping the communication device 100 on a reader of the POS device 105. At operation 2, the payment amount 1904 is shown, together with the indicator 2006 indicting that the payment via NFC has been successful. The user is again notified by the information 1903 that a wireless connection between the communication device 100 and merchant is in the process of being established. The user may complete the transaction without waiting for the wireless connection to be established by selecting the "done" button 1907. On the other hand, if the user waits for the wireless connection to be established, in this case, a number of coupons 2500 and an option to use loyalty points 2501 are provided to the user. Information indicative of the coupons 2500 and loyalty points 2501 are stored in the storage medium 104 of the communication device 100 or may be transmitted to the communication device 100 using the wireless connection, for example. In the latter case, the coupons and/or loyalty points may be electronically represented by data stored at a server or the like, as previously discussed. In this case, the coupons 2500 are depicted as a strip of electronic images and an individual coupon may be selected by the user dragging their finger to the left or to the right on the touch screen display 900 (which, in all embodiments, is controlled by the processor 103). The user may furthermore select the use of loyalty points 2501 by selecting or deselecting the tick box 2502 (checkbox) using their finger on the touch screen display 900. This allows the user to easily select whether or not they use coupons and/or loyalty points to reduce the price of the transaction. If the user does not wish to use any of the coupons or loyalty points, then the process is ended by the user selecting the "done" button 1907. On the other hand, the user may select one or both of the use of a coupon and/or loyalty points. In this example, in operation 4, the user selects the specific coupon 2500A, which gives the user 20% off the original transaction amount. The transaction amount 1904 is therefore undated to display the new transaction amount when the discount coupon has been applied. Again, the symbol 2305 indicating that the new transaction amount is being notified to the merchant (via the POS device 105) over the wireless connection is displayed (in the same way as described for FIGS. 18 and 19, for example). At operation 5, the user also chooses to apply a number of loyalty points to the transaction amount. In this case, there are EUR50 worth of loyalty points which are selectable for use by the user selecting a "tick" in the tick box 2502. The transaction amount is therefore reduced further by EUR50 due to the use of the EUR50 worth of loyalty points. Again, the symbol 2305 indicates that the transaction amount 1904 is being updated over the wireless connection between the communication device 100 and the POS device 105. Once the user is happy with the discount which has been applied, they are able to select the "update payment" button 2303 which allows the process to proceed to operation 6 in which a confirmation screen 2503 is shown. Alternatively, in either operation 4 or operation 5, the user may select the "skip update payment" button 2304 in order to return the screen of the payment application to that described with reference to operation 3. This allows a user to change their mind about applying a discount (for example, the user may wish to save further loyalty points or may wish to use the coupon for another transaction in the future) and allows the user to proceed with the payment without applying any discount due to loyalty points or coupons. It will also be appreciated that the user may choose only one of the uses of a coupon or the use of loyalty points before selecting the "update payment" button 2303. For example, at operation 4, the user may not wish to use their loyalty points at this stage. They may therefore be satisfied with the 20% discount provided by the coupon 2500A and thus select the "update payment" button 2303 at operation 4. In this case, operation 5 will be skipped, and the process will proceed directly to operation 6. At operation 6, the confirmation screen 2503 again provides the user with the final payment amount, together with a symbol 2006 indicating that it is this amount which has actually been paid (that is, the transaction has been completed with the final transaction amount displayed on the screen). The user is also again provided with a thank you message from the merchant 2305 together with the opportunity to view an electronic receipt of the transaction by selecting the "check receipt" button 1906. In this case, at operation 7, the user chooses to view the receipt (the receipt showing the amount of discount that has been applied due to the coupon and/or loyalty points used). Again, by the user selecting the button 2005, the screen returns to a screen as described with reference to operation 6. The user may then complete the process by selecting the "done" button 2001.

Figure 21:
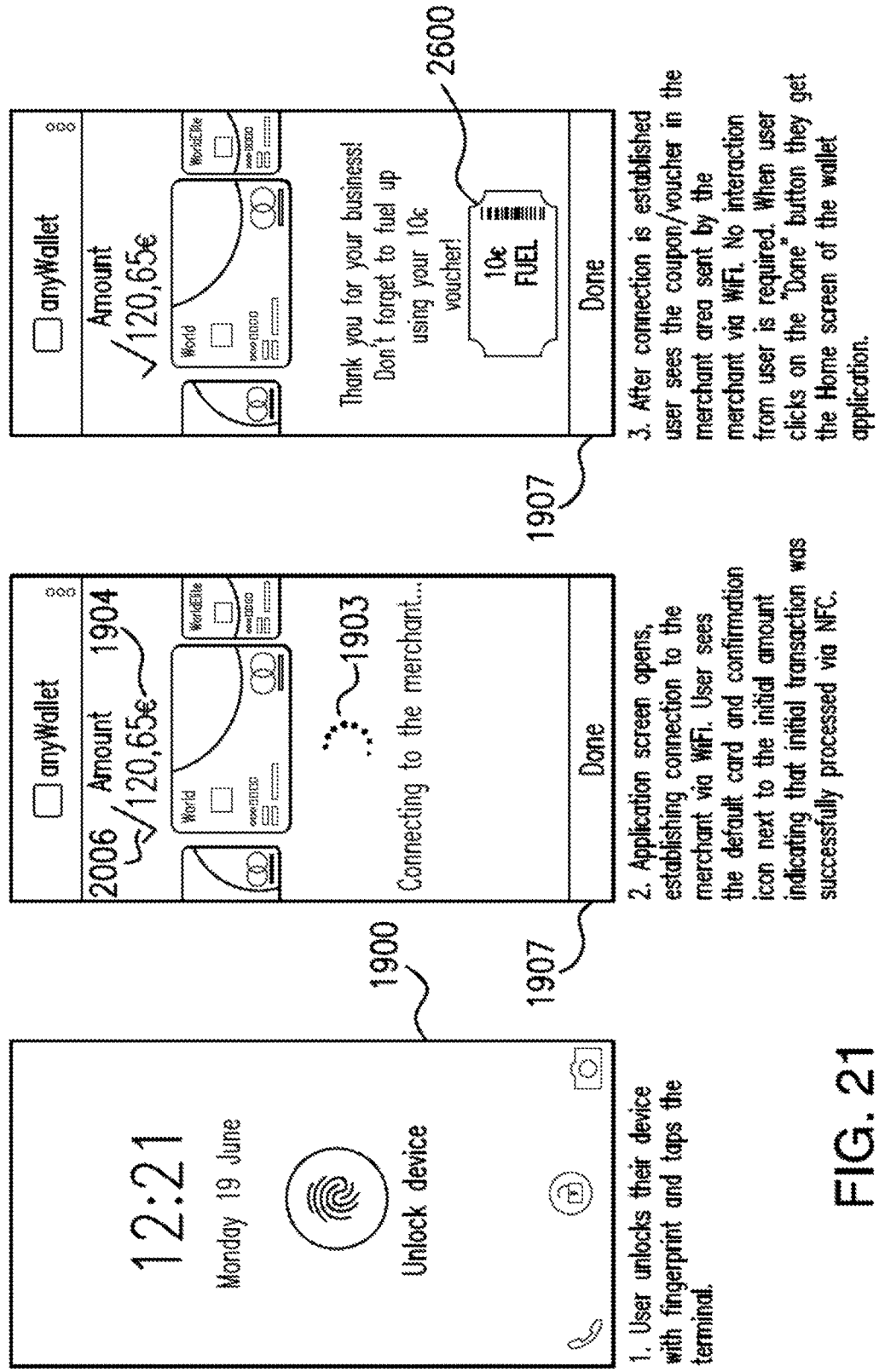
FIG. 21 is an exemplary block diagram illustrating an eleventh use scenario of the present technique, according to an embodiment.

FIG. 21 shows an example arrangement in which a coupon is received by a user after completing a transaction. In this case, the product purchased by the user is fuel at a fuel station. Such an arrangement may be carried out in combination with the arrangement described with reference to FIG. 12, for example. At operation 1, the user is again presented with the locked home screen 1900 of the communication device 100. The user unlocks the device with their fingerprint and taps the communication device 100 on a reader of the POS device 105 (the POS device 105 being located at a fuel pump, for example). The user then fills up with fuel and the final cost of the fuel pumped by the user 1904 is displayed, along with the indicator 2006 indicating that the transaction has been completed successfully via NFC. Again, the user may end the transaction at this point by selecting the "done" button 1907. Alternatively, the user may wait for a wireless connection to be established with the merchant as indicated by the connecting symbol 1903. In this case, the user has waited, and therefore the process proceeds to operation 3. In this case, the user is presented with an electronic fuel coupon which can be used by the user next time they purchase fuel from the same merchant. Information indicative of the fuel voucher is stored in the storage medium 104 of the communication device 100 and/or at a server, for example. The user may therefore use this electronic voucher in a way as previously described with reference to FIG. 20 (for example). It is thus demonstrated that the present technique can be used by a user to apply coupons or the like to change the overall transaction amount when a buying a particular good or service from a merchant. On the other hand, the present technique may also be used to provide a user with electronic coupons or the like in the first place. This demonstrates the flexibility of the present technique in terms of allowing extra data (second data) to be exchanged between a communication device 100 and POS device 105 via a wireless connection.

Figure 22:
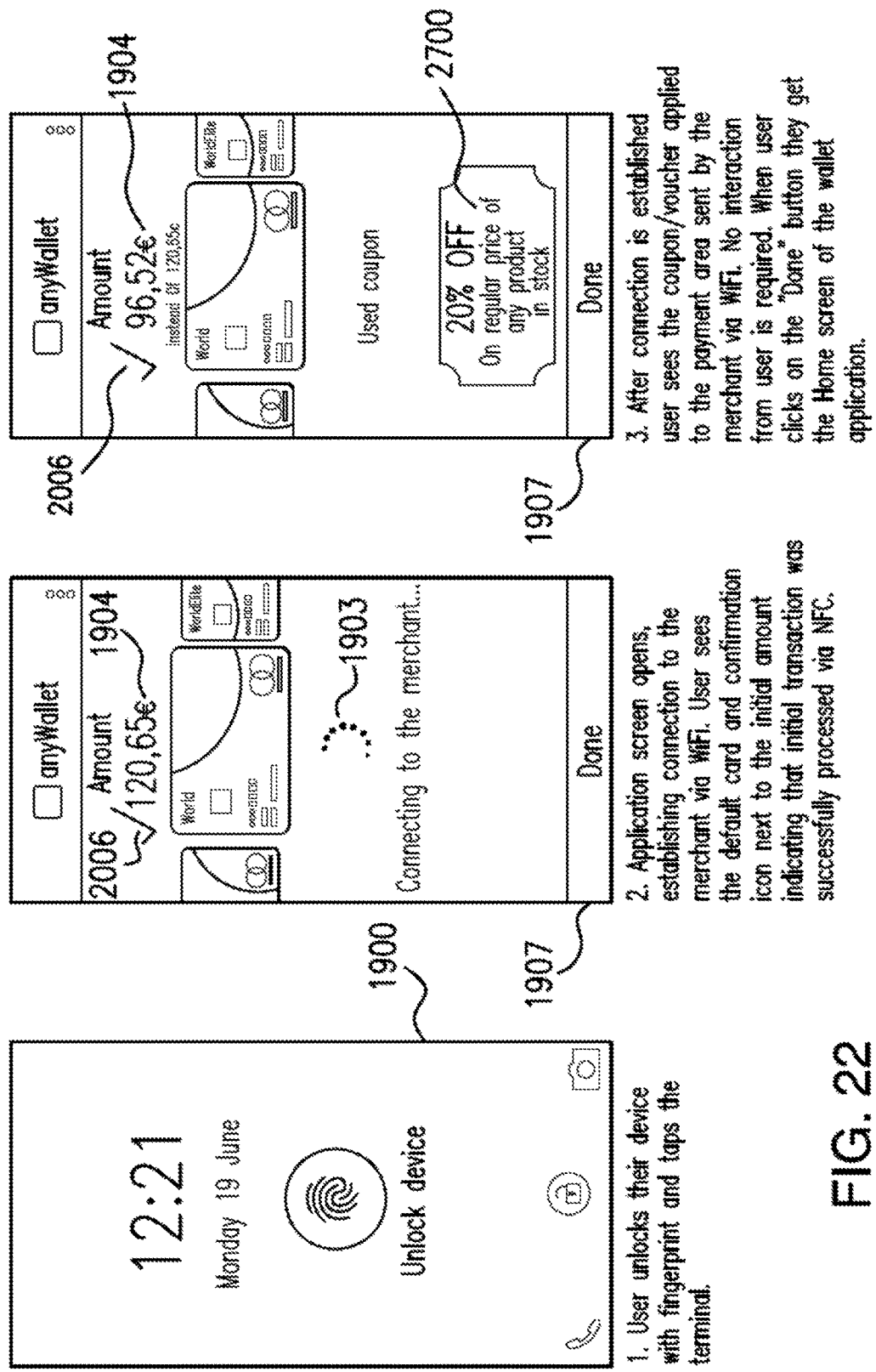
FIG. 22 is an exemplary block diagram illustrating a twelfth use scenario of the present technique, according to an embodiment.

FIG. 22 shows a further example arrangement involving a coupon. In this case, unlike the arrangement described with reference to FIG. 20, a coupon held by the user is applied automatically, without the user having to manually select that coupon. Whether a coupon is selectable by a user or is applied automatically may be determined by the user and/or merchant depending on preferences of the user and/or merchant, for example. In the example of FIG. 22, the user is again initially presented with a lock screen 1900 of the communication device 100. The user unlocks the device using their fingerprint at the same time as or before tapping the communication device 100 on a reader at the POS device 105. At operation 2, the amount of the transaction 1904 is displayed, along with the indicator 2006 indicating that the transaction has occurred successfully via NFC. Again, the user may now end the process by selecting the "done" button 1907. Alternatively, if the user waits for the wireless connection to be established with the merchant (as indicated by the indicator 1903), the process proceeds to operation 3. At operation 3, it has been recognised (for example, via electronic data stored in the storage medium 104 of the communication device 100 or electronic data stored at a server or the like and associated with an account of the user) that the user has a discount coupon which can be used with the merchant. In this case, the coupon is a "20% off" coupon (that is, a coupon which reduces the total transaction amount by 20%). Information indicative of the discount to be applied is transmitted between the communication device 100 and POS device 105 via the wireless connection. The transaction is therefore completed (as again indicated by the indictor 2006) and the user is presented with a confirmation screen confirming the final transaction amount. The confirmation screen also indicates the coupon 2700 that has been used, thus informing the user why the total transaction amount has been reduced. The user may then complete the process by selecting the "done" button 1907. In this case, no user interaction is required in order for the discount coupon to be applied, thus providing increased convenience to the user, and improving the transaction speed.

Figure 23:
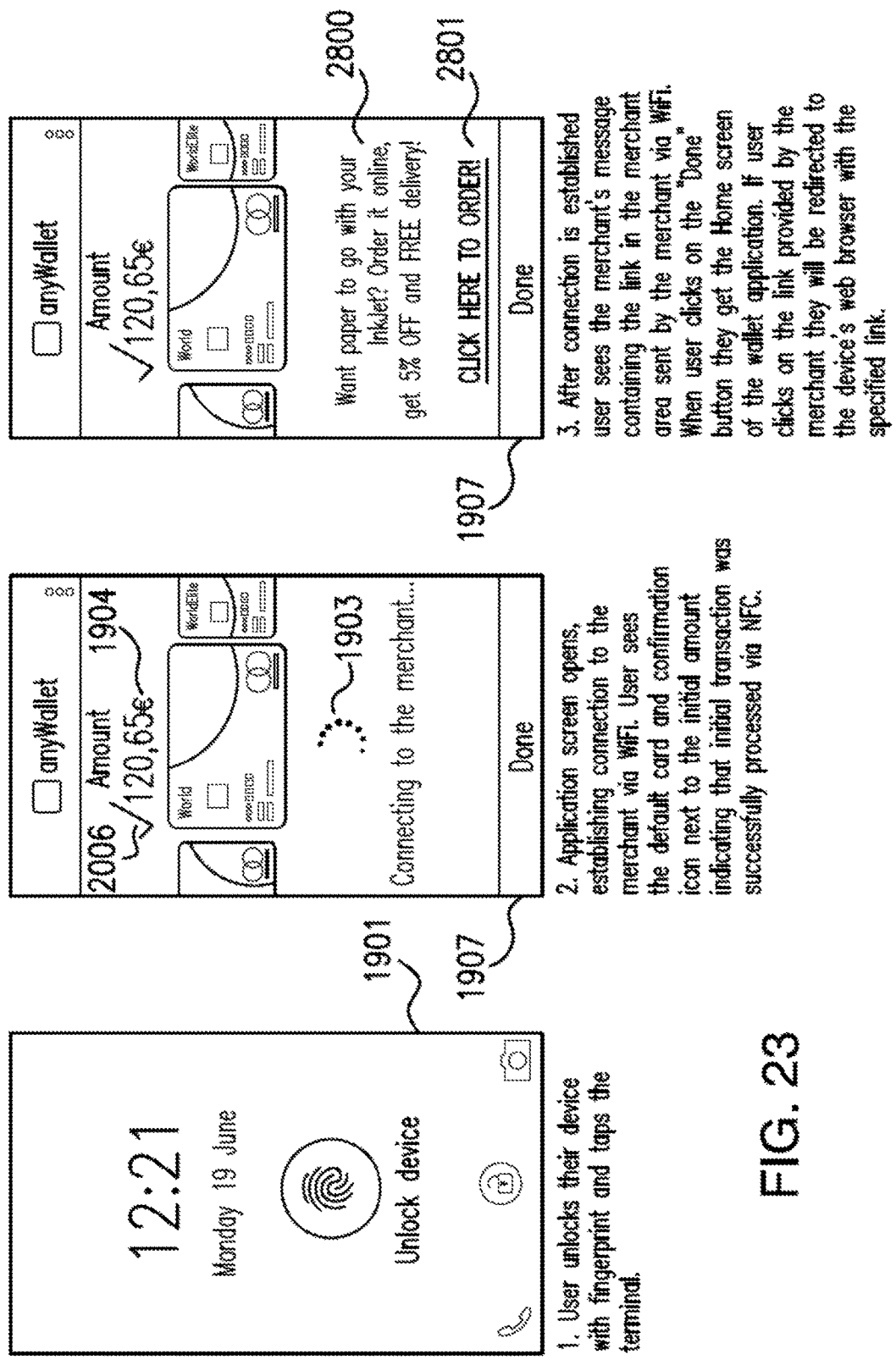
FIG. 23 is an exemplary block diagram illustrating a thirteenth use scenario of the present technique, according to an embodiment.

FIG. 23 shows a further example arrangement in which, after a user has completed a transaction, a link (for example, a hyperlink) is provided from the merchant to the communication device 100 via the wireless connection. At operation 1, again, the user is presented with a lock screen 1900 at which the user unlocks the device with their fingerprint and taps the communication device 100 onto a reader of the POS device 105. At operation 2, the transaction amount 1904 is confirmed and it is indicated by indicator 2006 that the transaction is complete via NFC. It is noted that, in this and in the other examples, the indication 2006 that the transaction is complete is an indication that all necessary data for completing the transaction has been acquired from the communication device 100. The transaction may therefore proceed (for example, by the transmission of an authorisation request from the POS device 105 to the device 300 of an acquirer) at a value of the confirmed transaction amount without any further input from the user (for example, if the user chooses not to complete any of the subsequent possible operations implemented via a wireless connection with the merchant). In this case, at operation 2, the user is informed that a connection is being established with the merchant by connection indicator 1903. As usual, the user may end the process at this stage by selecting the "done" button 1907. On the other hand, if the user does not end the transaction process at this stage, the process proceeds to operation 3, in which a confirmation screen is presented to the user together with information 2800 and a link 2801 (for example, a hyperlink to a website operated by the merchant) provided by the merchant. Data indicative of this information and the link is transmitted over the wireless connection. In this case, as well as the information from the merchant comprising textual information, a commercial offer is also provided to the user, together with the link which the user may use to take advantage of the offer via e-commerce or the like. The user may select the link 2801 in order to find out more information and, if desired, take advantage of the merchants offer directly from their communication device 100 (by visiting the website targeted by the link, for example). Alternatively, the user may end the process by selecting "done" button 1907.

Figure 24:
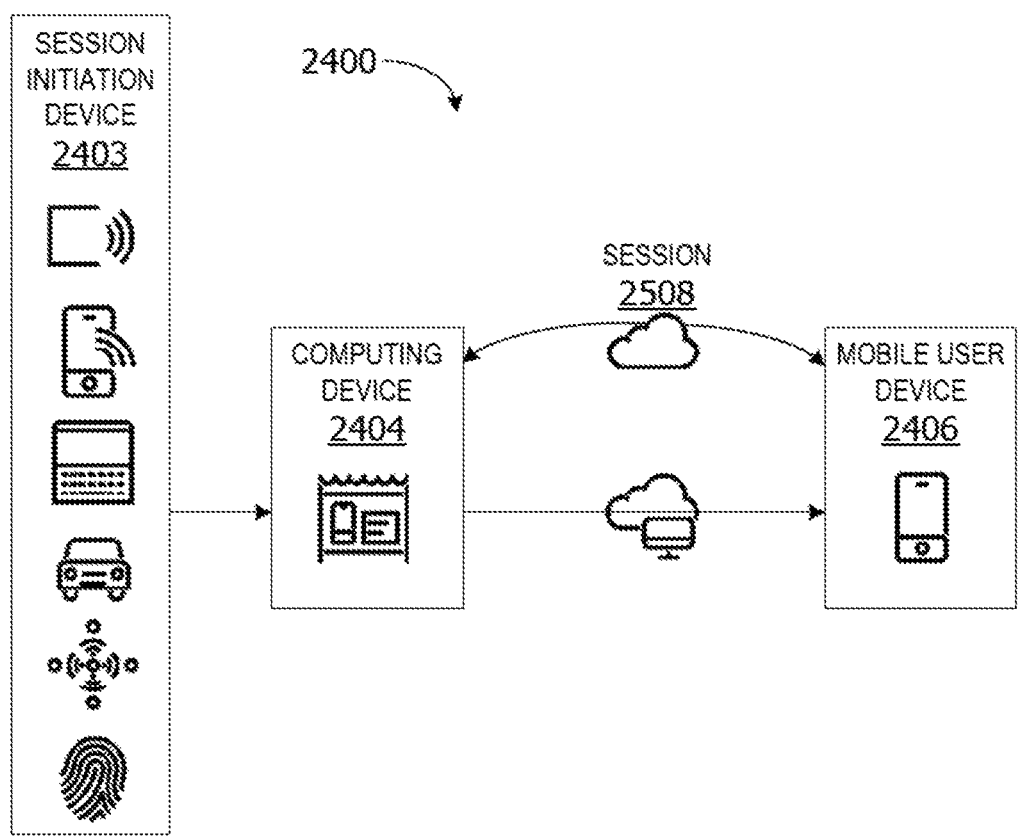
FIG. 24 is an exemplary block diagram illustrating a system for initiating a communications session between devices using a variety of modalities.

FIG. 24 is an exemplary block diagram illustrating a system 2400 for initiating a communications session between devices using a variety of modalities. In some examples, a session initiation device 2403 is configured to generate trigger data in accordance with a user-selected modality in a set of modalities responsive to occurrence of a predetermined event corresponding to the selected modality. The session initiation device 2403 may be implemented as one or more devices for generating, detecting, or receiving trigger data.

In some examples, the session initiation device 2403 can include one or more biometric reader devices, one or more point-of-sale (POS) terminals, a physical card reader, a contactless card reader, one or more sensor devices, one or more e-commerce devices, one or more payment cards, one or more Internet-of-Things (IoT) devices, a license plate reader (camera and/or character recognition system), as well as any other device capable of generating or detecting a unique user identifier registered by at least one user with the system.

A biometric reader device is a device for generating biometric data associated with a user. A biometric reader can include a fingerprint scanner, an image generating device, a voice analysis device, or any other type of device for reading or generating biometric data. An image generating device can include a still image camera or a motion picture camera for generating images of at least a portion of a user. Images of a user may be analysed for facial recognition.

An IoT device is any type of network enabled device capable of wired or wireless connection to a network, such as the Internet. An IoT device can include a smart appliance, a smart wearable device, a smart television, a smart thermostat, or any other type of smart device. A smart appliance can include a smart refrigerator or any other type of appliance.

The computing device 2404 represents any device executing computer-executable instructions (e.g., as application programs, operating system functionality, or both) to implement the operations and functionality associated with the computing device. The computing device 2404, in some examples, includes a mobile computing device or any other portable device. A mobile computing device includes, for example but without limitation, a mobile telephone, laptop, tablet, computing pad, netbook, gaming device, and/or portable media player. The computing device 2404 can also include less-portable devices such as servers, desktop personal computers, kiosks, or tabletop devices. Additionally, the computing device can represent a group of processing units or other computing devices. In some examples, the computing device 2404 includes a user interface device, such as, but not limited to, a touchscreen, display screen, speakers, etc. The computing device 2404 may be referred to as a data processing device, a data processing apparatus, and/or data processing system.

The computing device 2404 in some examples, includes a processor, a memory, and communication circuitry. The communication circuitry, in this example, includes a first communication circuitry configured to transmit data to a mobile user device or receive data from the mobile user device using electromagnetic induction when the first computing device is brought into proximity to the mobile user device and a second communication circuitry configured to transmit or receive data via a radio signal.

In some examples, the computing device is a device associated with a merchant. The computing device 2404 sends a request for a mobile device identifier (ID) corresponding to a mobile user device 2406 in response to receiving the trigger data from the session initiation device 2403. The trigger data includes at least one unique user-registered identifier which is mapped to the requested mobile device identifier.

A communication session 2520 is established between the computing device 2404 and the mobile user device 2406 using the mobile device identifier. In some examples, the computing device 2404 establishes the communication session 2520. However, in other examples, a connection server establishes the session 2520 and mediates the session until the session ends.

The computing device 2404 in other examples controls the first communication circuitry to transmit first data to the mobile user device via the established communication session when the first computing device is brought into proximity to the mobile user device. On condition the second communication circuitry is enabled to transmit second data such that data based on the transmitted second data is receivable by the mobile user device or to receive second data based on data transmitted by the mobile user device, controls the second communication circuitry to transmit second data via the communication session such that data based on the transmitted second data is receivable by mobile user device or to receive the second data based on data transmitted by the mobile user device.

Figure 25:
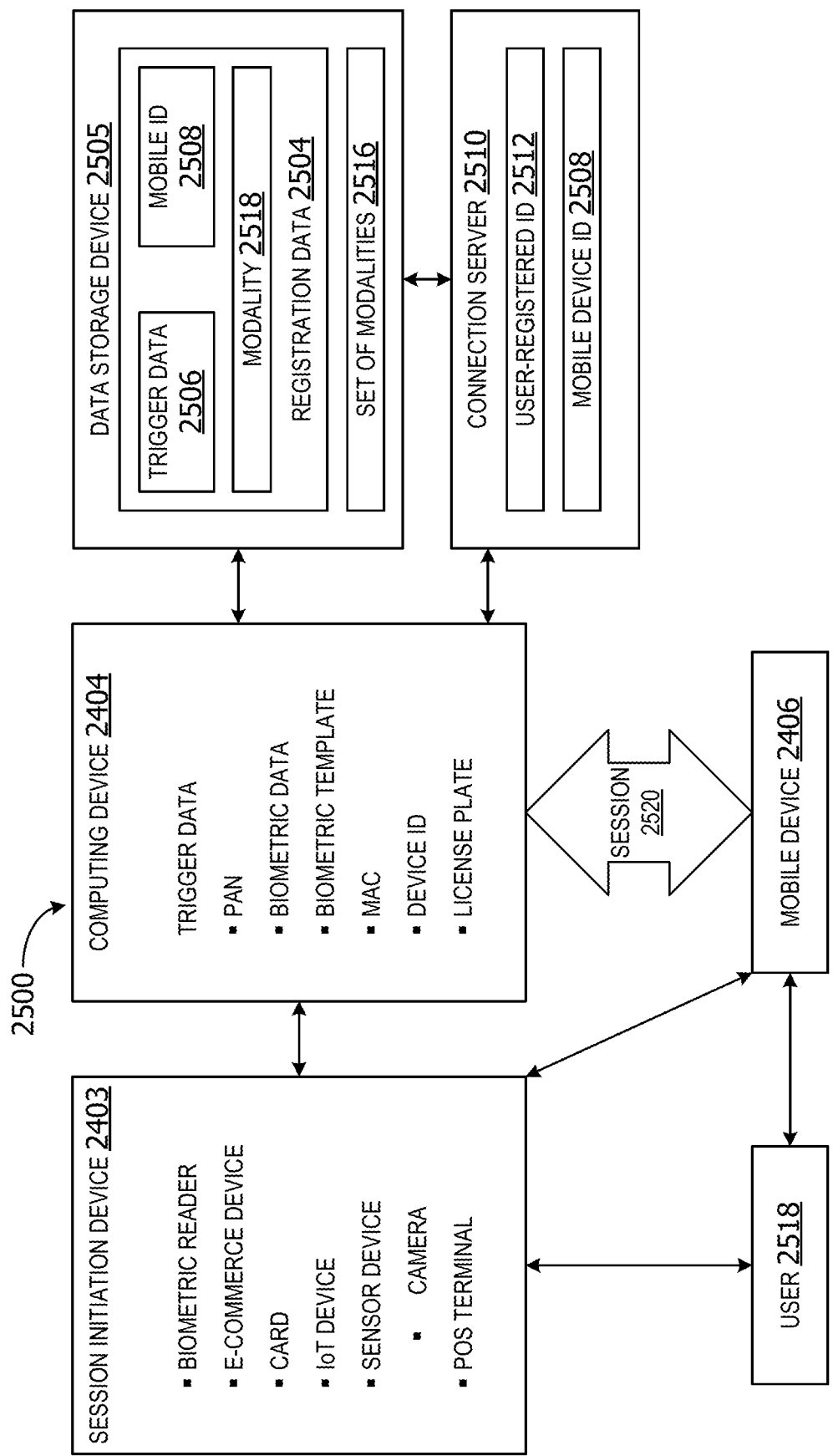
FIG. 25 is an exemplary block diagram illustrating a system for contactless communication session initiation based on pre-registered trigger data.

FIG. 25 is an exemplary block diagram illustrating a system for contactless communication session initiation based on pre-registered trigger data. In some examples, the session initiation device 2403 transmits trigger data 2406 to the computing device 2404. The session initiation device 2403 in some examples includes one or more of a biometric reader, an e-commerce device, a payment card, an IoT device, a sensor device, and/or a POS terminal.

A payment card may include a credit card, a debit card, a rewards card, a gift card, a check card, or any other type of physical card used to complete a transaction. A sensor device may include a camera, microphone, weight sensor, a barcode reader, motion sensor, light sensor, proximity sensor, infrared detector, or any other type of sensor device.

The trigger data 2506 is data associated with a selected modality for initiating a communications session between the computing device 2404 and the mobile user device 2406. The trigger data 2506 in some non-limiting examples includes a personal account number (PAN), biometric data, biometric template, media access control (MAC) address associated with a device, an IoT device ID, a license plate, an email address, or any other user-registered ID 2512 within the trigger data 2506 mapped to a mobile device ID 2508 associated with the mobile user device 2406. The mobile device ID may be referred to as a mobile user device ID, a mobile ID and/or a user mobile device ID.

The PAN, in some examples, includes any identifier associated with an account of the user. The PAN may be obtained via an e-commerce transaction associated with an e-commerce device, a PAN associated with a payment card, a PAN associated with a cryptocurrency account or any other type of payment account.

In some examples, the MAC address is an identifier associated with a device, such as, but not limited to, a computing device, a printer device, a router, or any other device. The license plate is an identifier associated with a motor vehicle.

In some examples, the user-registered ID 2512 is mapped to the mobile device ID 2508 within a data storage device 2505. The data storage device 2505 can include one or more different types of data storage devices, such as, for example, one or more rotating disks drives, one or more solid state drives (SSDs), and/or any other type of data storage device. The data storage device lxx in some non-limiting examples includes a redundant array of independent disks (RAID) array. In other examples, the data storage device 2505 includes a database.

The data storage device 2505 in this example is included within a computing device, such as the connection server, attached to the computing device, plugged into the computing device, or otherwise associated with the computing device. In other examples, the data storage device 2505 includes a remote data storage accessed by the computing device via a network, such as a remote data storage device, a data storage in a remote data center, or a cloud storage. The data storage device can include a database, such as, but not limited to, a relational database for storing data.

The user provides the user-registered ID 2512 during a registration process. During the registration process, registration data 2504 for the user is obtained and stored in the data storage device 2505. The registration data 2504 is user-provided registration data which can include, for example but without limitation, the user-registered ID 2512, the mobile device ID 2508 and/or a set of user-selected modalities 2516, such as, but not limited to, a user-selected modality 2518. The user-selected modality 2518 specifies one or more methods by which the user-registered ID may be obtained.

For example, if the selected modality includes biometric recognition, the system obtains biometric data from the user via a biometric reader. The biometric data is analysed to obtain the biometric ID which is mapped to the mobile device ID.

In another non-limiting example, if the modality is vehicle recognition, the system identifies a vehicle within range of a sensor, such as a camera. The vehicle license plate number is the user-registered ID which maps to the mobile device ID 2508. Thus, when the user's vehicle is recognized, the system automatically establishes a connection between the mobile user device 2406 and the computing device 2404 to enable contactless communications sessions between the devices.

In this example, a connection server 2510 receives the request for the mobile device ID 2508 from the computing device 2404 associated with a merchant. The server 2510 in some non-limiting example is a computing device. The server 2510 in this example is a tap and connect server. In other examples, the server 2510 can be implemented as a blade server, a server in a rack, a server in a data center, and/or a cloud server.

A cloud server is a logical server providing services to the computing device 2404 or other clients, such as, but not limited to, the mobile user device 2406. The cloud server is hosted and/or delivered via a network. In some non-limiting examples, the cloud server is associated with one or more physical servers in one or more data centers. In other examples, the cloud server is associated with a distributed network of servers.

The connection server 2510 obtains the mobile device ID from the data storage device and then utilizes the mobile device ID to establish the communications session between the mobile user device 2406 and the computing device 2404. The connection server 2510 mediates the session 2520 until the session is terminated.

Figure 26:
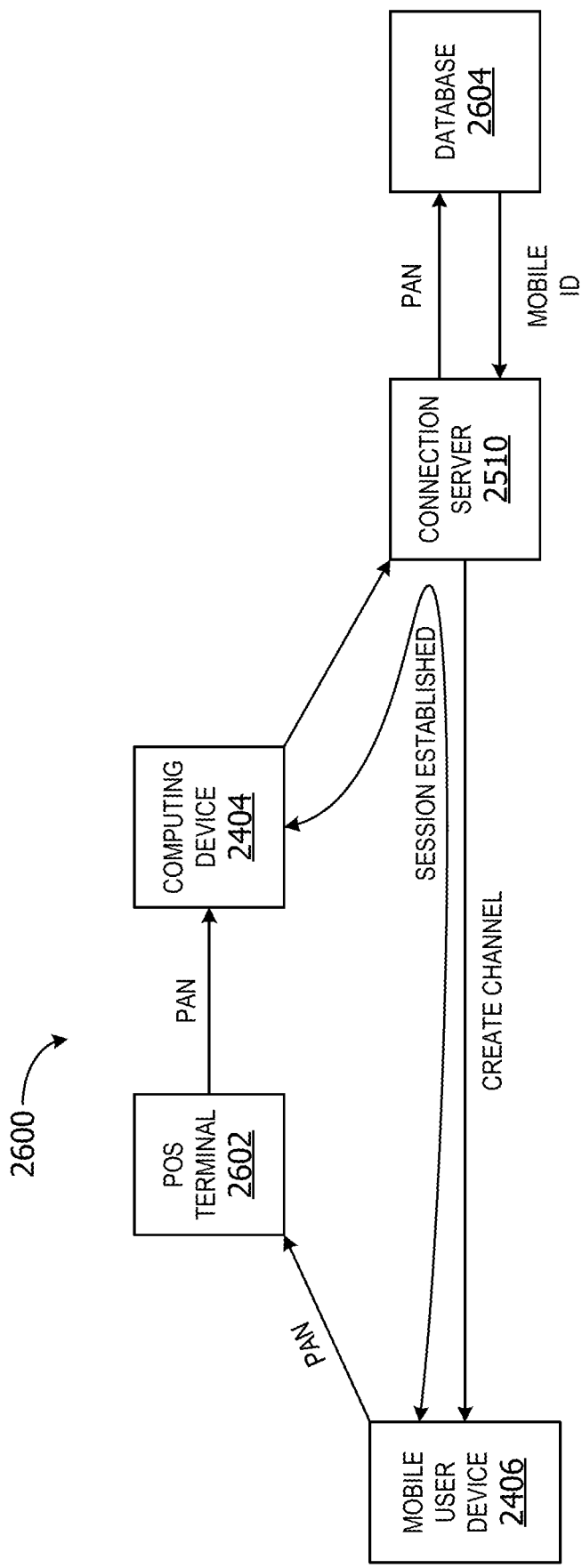
FIG. 26 is an exemplary block diagram illustrating a communications session establishment associated with a contactless transaction between a mobile user device and a point-of-sale (POS) terminal.

FIG. 26 is an exemplary block diagram illustrating a process 2600 for communications session establishment associated with a contactless transaction between a mobile user device 2406 and a POS terminal 2602. The POS terminal 2602, in this non-limiting examples, is a session initiation device, such as, but not limited to, the session initiation device 2403 in FIG. 24 and FIG. 25 above.

The system in this non-limiting examples establishes a potentially long-lived communication session between a merchant computing device 2404 system and a cardholder's mobile user device 2406. The connection establishment is based on an initial contactless transaction between the cardholder and the merchant, from either the cardholder's mobile device or another contactless card.

The communication is facilitated, in this example, by a connection server 2510, which stores an association between the card, identified by the PAN and the cardholder's registered mobile device ID. The communication session is mediated by the server, and may be used for a multiplicity of purposes, including, but not limited to payment, value added services, provision of a transaction receipt, cardholder verification for recurring transactions, notification services, such as rewards, discounts, specials, or other discounts.

In this example, the user (cardholder) performs a contactless transaction from their mobile device with the terminal 2602. This communicates the PAN, as well as other information such as a cryptogram to secure the transaction. The PAN is a type of trigger data, which is registered by the user, such as, but not limited to, the trigger data 2506 in FIG. 25. The terminal 2602 passes this data into the merchant system as would normally be the case for processing the transaction. The merchant system calls the connection server 2510, passing the PAN, in order to be able to establish a long-lived session with the cardholder's mobile user device 2406. The server 2510 looks up its database 2604 to retrieve the ID of the mobile user device registered against that PAN. The server uses the mobile device ID to create a channel to the cardholder's mobile user device 2406. This enables the establishment of a session between the merchant system and the cardholder's registered mobile device, mediated by the server 2510.

Figure 27:
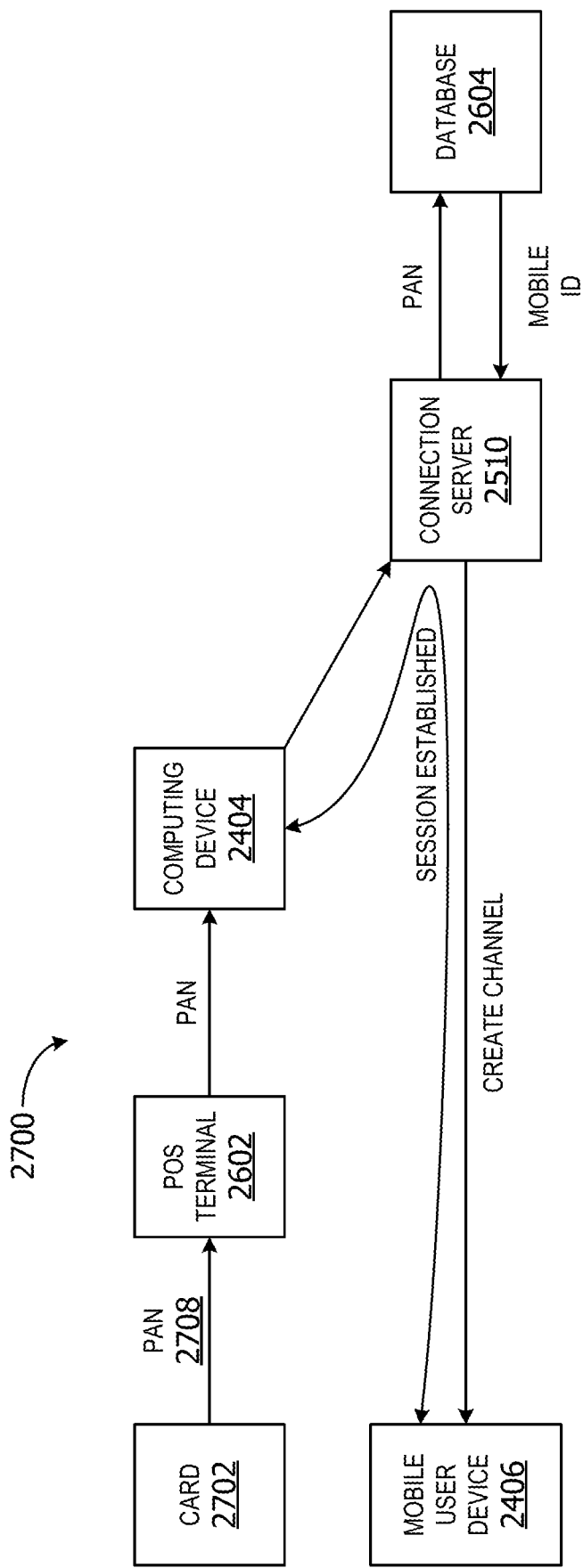
FIG. 27 is an exemplary block diagram illustrating a system for establishing a communications session based on a personal account number (PAN) obtained from a payment card.

FIG. 27 is an exemplary block diagram illustrating a process 2700 for establishing a communications session based on a PAN obtained from a payment card. In this example, the initial trigger for creating the contactless session is based on a transaction completed using the cardholder's contactless payment card 2702, rather than their mobile user device 2406. The session establishment proceeds as before.

Figure 28:
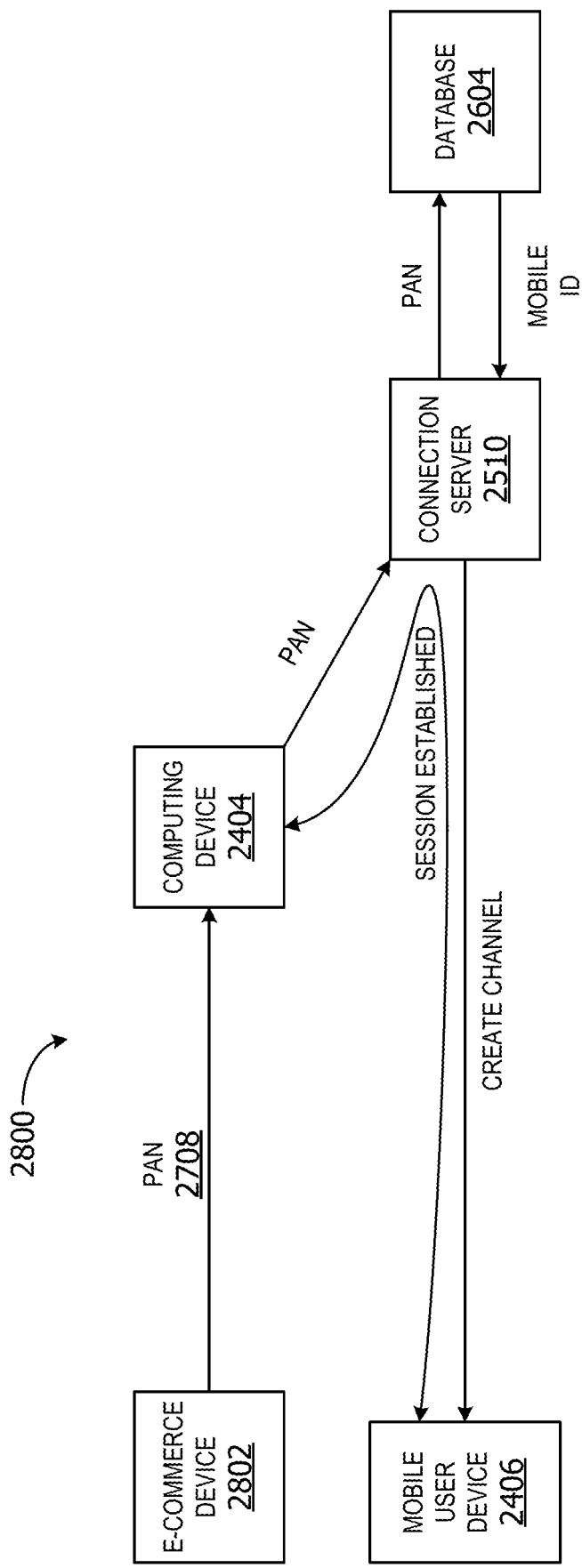
FIG. 28 is an exemplary block diagram illustrating establishing a communications session based on a PAN obtained via an online transaction.

FIG. 28 is an exemplary block diagram illustrating a process 2800 establishing a communications session based on a PAN obtained via an online transaction. In this example, the PAN is communicated to the merchant computing device 2404 in other ways than a contactless or contact transaction. The PAN is communicated across the internet from an e-commerce device 2802, such as a remote computing device, to the merchant computing device 2404. The e-commerce device 2802, in this non-limiting examples, is a session initiation device, such as, but not limited to, the session initiation device 2403 in FIG. 24 and FIG. 25 above. This could also occur with a mail order (MO) or telephone transaction (TO), with the merchant physically entering the communicated PAN into the system. Having received the PAN, the merchant computing device 2404 communicate this data to the server 2510, enabling a session to be established between the merchant system and the cardholder's registered mobile device.

Figure 29:
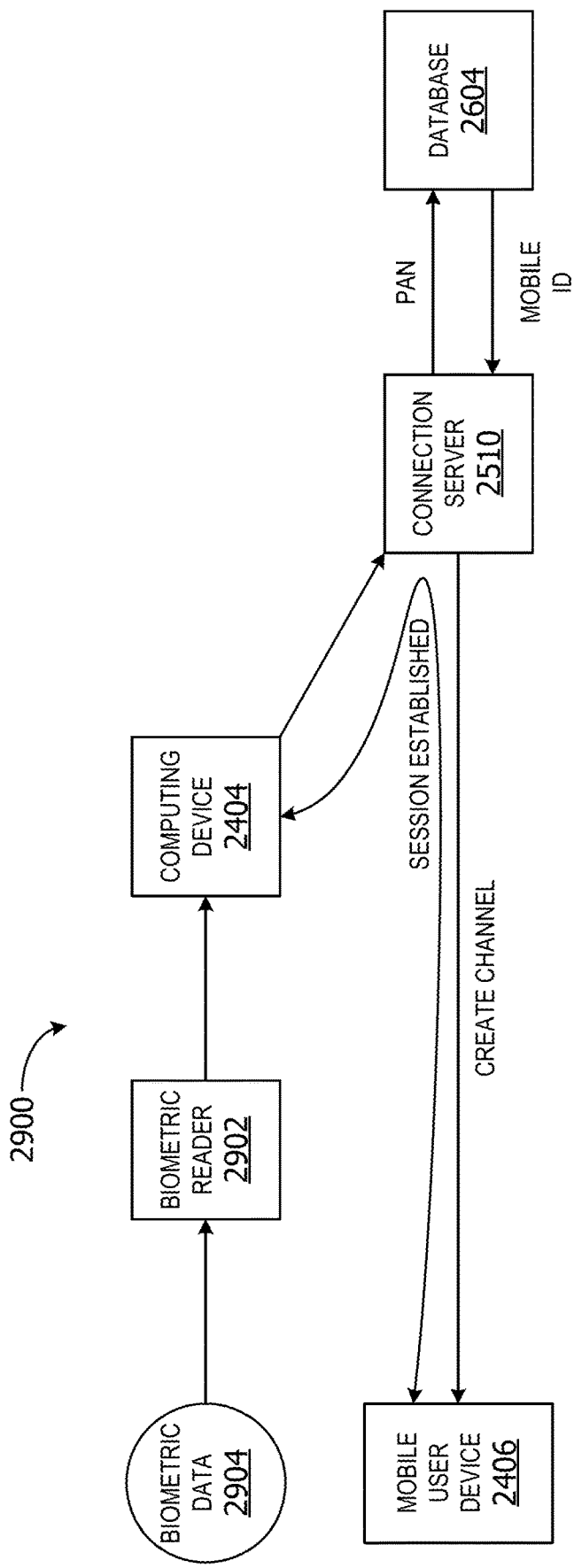
FIG. 29 is an exemplary block diagram illustrating establishing a communications session based on biometrics.

FIG. 29 is an exemplary block diagram illustrating a process 2900 for establishing a communications session based on biometrics. In this example, the user cardholder registers their mobile user device, as well as at least one biometric with the server 2510. The biometric and the device data are stored on the database 2604. A biometric may include, for example, fingerprint, facial recognition, palm, or finger vein, etc. In some examples, the user presents the biometric to a biometric reader 2902, which captures a biometric template. This template is passed into the merchant system. The biometric reader 2902, in this non-limiting examples, is a session initiation device which gathers and/or transmits trigger data to a merchant computing device, such as, but not limited to, the session initiation device 2403 in FIG. 24 and FIG. 25 above. The biometric reader obtains biometric data from the user. The biometric data 2904 is a type of trigger data for initiating session creation, such as, but not limited to, the trigger data 2506 in FIG. 25. In this example, the biometric data, in the form of a biometric template, is transmitted by the computing device. The merchant system sends the biometric template to the server 2510. The server looks up the associated mobile device ID in the database 2604.

Figure 30:
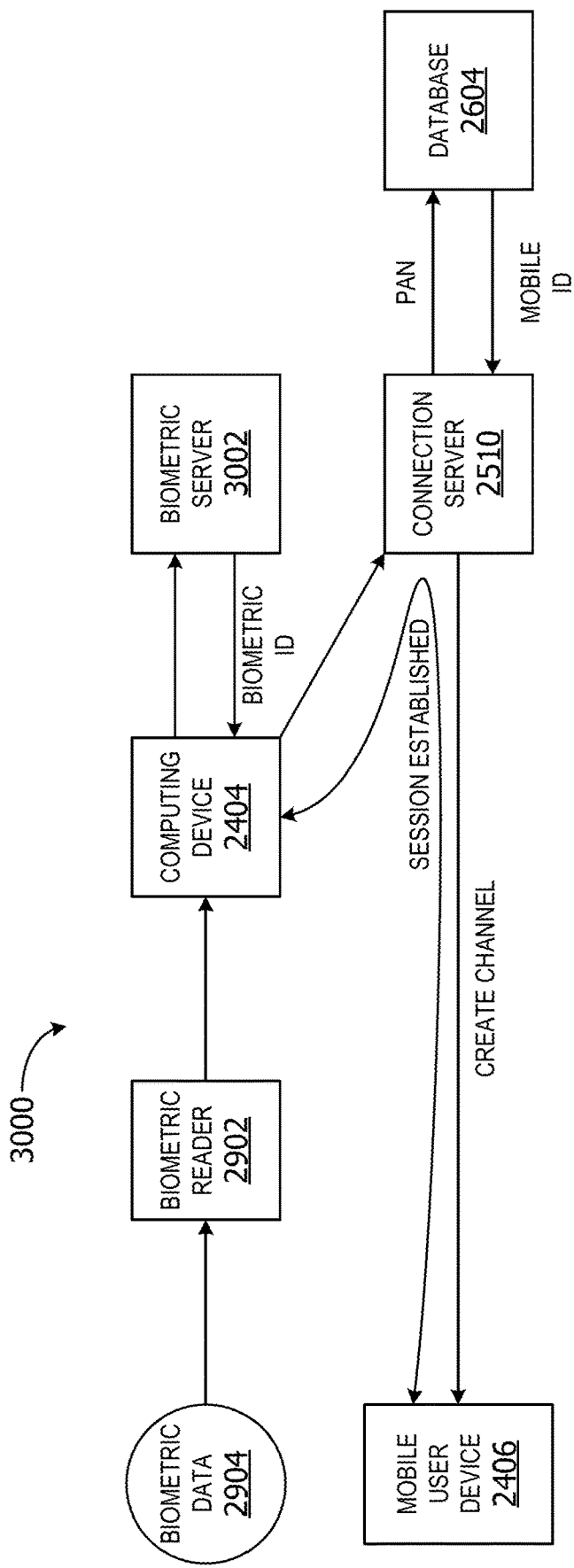
FIG. 30 is an exemplary block diagram illustrating establishing a communications session based on a biometric identifier (ID).

FIG. 30 is an exemplary block diagram illustrating a process 3000 for establishing a communications session based on a biometric ID. In this example, the processing of the biometric template is done by a third-party biometric server 3002 to identify the user. The biometric template is associated to a user biometric ID within the database 2604. In this case, the user biometric ID is utilized by the server 2510 to establish the communications session. The biometric ID is a type of trigger data, which is registered by the user, as a user-selected trigger for initiating creation of a communications session between the user mobile device and the merchant computing device, such as, but not limited to, the trigger data 2506 in FIG. 25.

In an example, at transaction time, the user presents their biometric to the biometric reader 2902, which extracts a template, and passes the template to the merchant computing device 2404. The merchant computing device 2404 sends the biometric template to the third-party biometric server 3002, and receives back the corresponding user biometric ID. The merchant then sends the user biometric ID to the server 2510, which looks up its database 2604 to get the mobile device ID that that has been registered against the biometric ID. The server then initiates session establishment.

Figure 31:
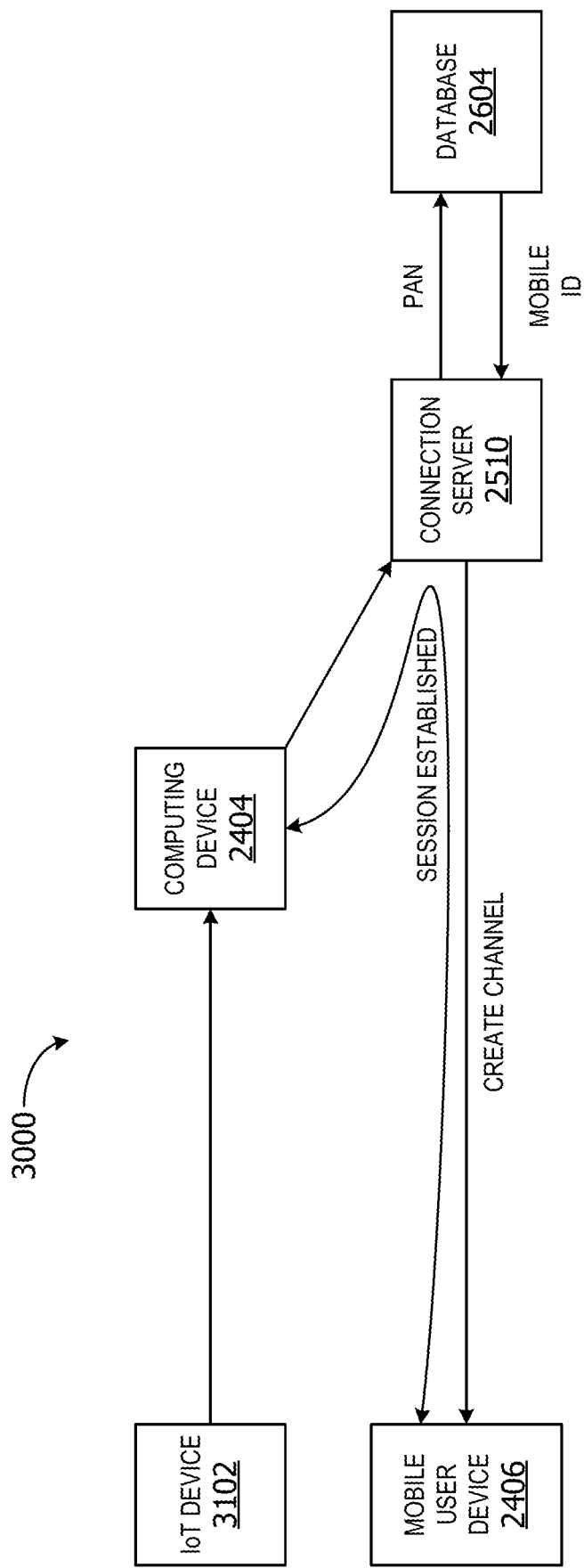
FIG. 31 is an exemplary block diagram illustrating establishing a communications session based on an Internet-of-Things (IoT) device ID.

FIG. 31 is an exemplary block diagram illustrating establishing a communications session based on an IoT device ID. The IoT device ID is a type of trigger data, which is registered by the user, such as, but not limited to, the trigger data 2506 in FIG. 25.

In some examples, the session may be established by an IoT device. The IoT device 3102 has an assigned ID which is registered with the server 2510 and associated with the mobile user device ID. The IoT device 3102, in this non-limiting examples, is a session initiation device for providing trigger data to the merchant computing device, such as, but not limited to, the session initiation device 2403 in FIG. 24 and FIG. 25 above.

In some examples, the IoT device 3102 may autonomously, or in conjunction with other systems, initiate a purchase request with a merchant. The IoT device communicates its device ID to the merchant or the merchant system may extract it from the device or the merchant computing device 2404 calculates it as a digital fingerprint—for instance using Trusted Device technology. The merchant system communicates the IoT Device ID to the server 2510, which looks up the Device ID in its database 2604 in order to identify the associated mobile user device 2406. The session establishment is initiated. The computing device 2404 can use the session to request payment, to allow the cardholder to modify the purchase request, or to provide other services.

Figure 32:
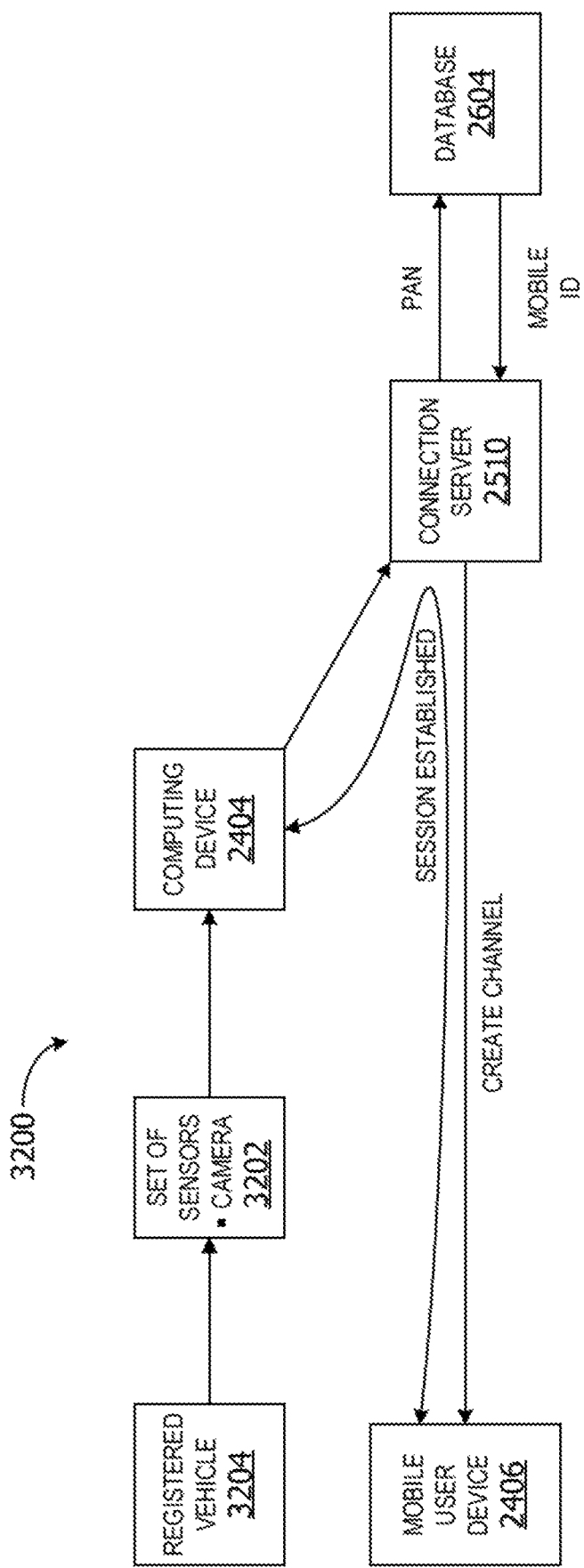
FIG. 32 is an exemplary block diagram illustrating establishing a communications session based on a registered vehicle ID.

FIG. 32 is an exemplary block diagram illustrating a process 3200 for establishing a communications session based on a registered vehicle ID. The registered vehicle ID (license plate number) is a type of trigger data, which is registered by the user, such as, but not limited to, the trigger data 2506 in FIG. 25.

In this example, the user registers the license plate number of a vehicle with the server 2510, which stores the mapping of the license plate number to the mobile user device ID in the database 2604.

In a non-limiting example, a user approaches a situation where a car-related payment is required, for example a toll booth, parking lot or drive thru at a quick service restaurant. A set of sensor devices 3202, including a camera, associated with an Automatic Number Plate Recognition system reads the number plate of the car and passes that to the merchant system. The set of sensor devices 3202, in this non-limiting examples, is a session initiation device for detecting trigger data and sending the trigger data to the merchant computing system, such as, but not limited to, the session initiation device 2403 in FIG. 24 and FIG. 25 above. The merchant system sends the number plate to the server 2510, which looks up the database 2604 to determine the cardholder's registered mobile, and a session is established. This allows payment to be taken via interaction with the cardholder's mobile device along with other merchant services.

In other examples, the association may be from any registered ID. The system can make use of IDs with a sufficient level of intrinsic uniqueness (such as those which are unique due to some form of generation algorithm or outside agency which ensures this by providing additional contextual information); however this does not need to be a limiting factor. The server 2510 may assign a disambiguating factor. For example, a company could allow its employees' company ID (unique to the company, but not globally unique) to be used at the cafeteria and other internal stores, and the server may assign a unique ID to the merchant locations associated with the company, thereby creating a unique ID.

In situations where multiple drivers utilize the same vehicle and each user has their own mobile user device, multiple users may register the same vehicle license plate number as trigger data for more than one mobile user device. In such cases, the system may establish a communications session with two or more mobile user devices in response to detecting trigger data registered for more than one user device. In these examples, data transmitted from the merchant computing device is transmitted to two or more mobile user devices for output to two or more users via the user interface device associated with each registered mobile user device.

In still other examples, when a user driving a vehicle having a license plate number which is registered to multiple users, the session initiation device monitors for when the user activates their mobile user device, which also activate near field communications (NF) low energy and/or ultra-wide band. The system can identify the user that is actually on the premises and within range of the sensors associated with the session initiation device. The system then only communicates with the registered mobile user device that is within range (within a predetermined area). In other examples, the system identifies the registered mobile user device within a geofence area. In this manner, the system utilizes location-based trigger data to select (rings or initiates communication) with the appropriate mobile user device because a device capable of connecting via NFC/BT is within proximity to the session initiation device. The location-based trigger data can include a combination of triggers, such as, detection of the license plate and detection of the mobile user device within the geofence area or within a threshold range of the session initiation device.

Figure 33:
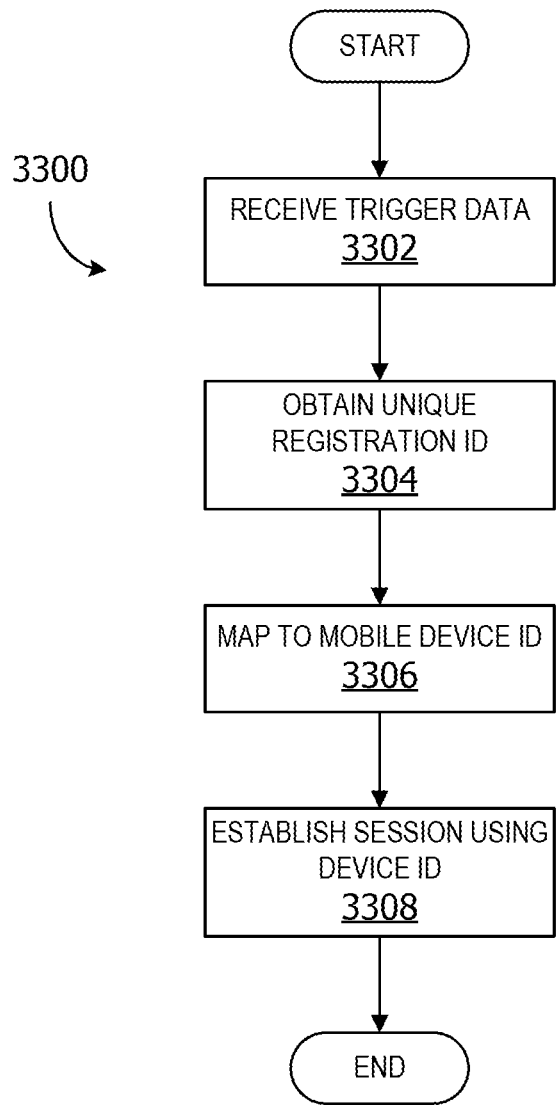
FIG. 33 is an exemplary flow chart illustrating a method of establishing communication session between devices using trigger data obtained via at least one modality.

FIG. 33 is an exemplary flow chart illustrating a method of establishing communication session between devices using trigger data obtained via at least one modality. It should be understood that the method 3300 as described may be implemented and/or executed by one or more components of a system such as systems described above with respect to FIGS. 1-32. At 3302, a computing device receives trigger data. The trigger data, in some examples, is received from a session initiation device, such as, but not limited to, the session initiation device 2403 in FIG. 2. The computing device obtains a unique registration ID from the trigger data 3304. The unique registration ID can be any type of ID, such as, but not limited to, a PAN, an IoT device ID, a vehicle license plate number, a biometric ID, or any other type of ID. The unique registration ID is mapped to a mobile device ID at 3306. The registration ID and corresponding mobile device ID, in some examples, is stored in a database in a data store, such as, but not limited to, a data storage device, a cloud storage, a data store on a data canter, or any other type of data store. A communications session between the devices is established using the mobile device ID at 3308. The process terminates thereafter.

Figure 34:
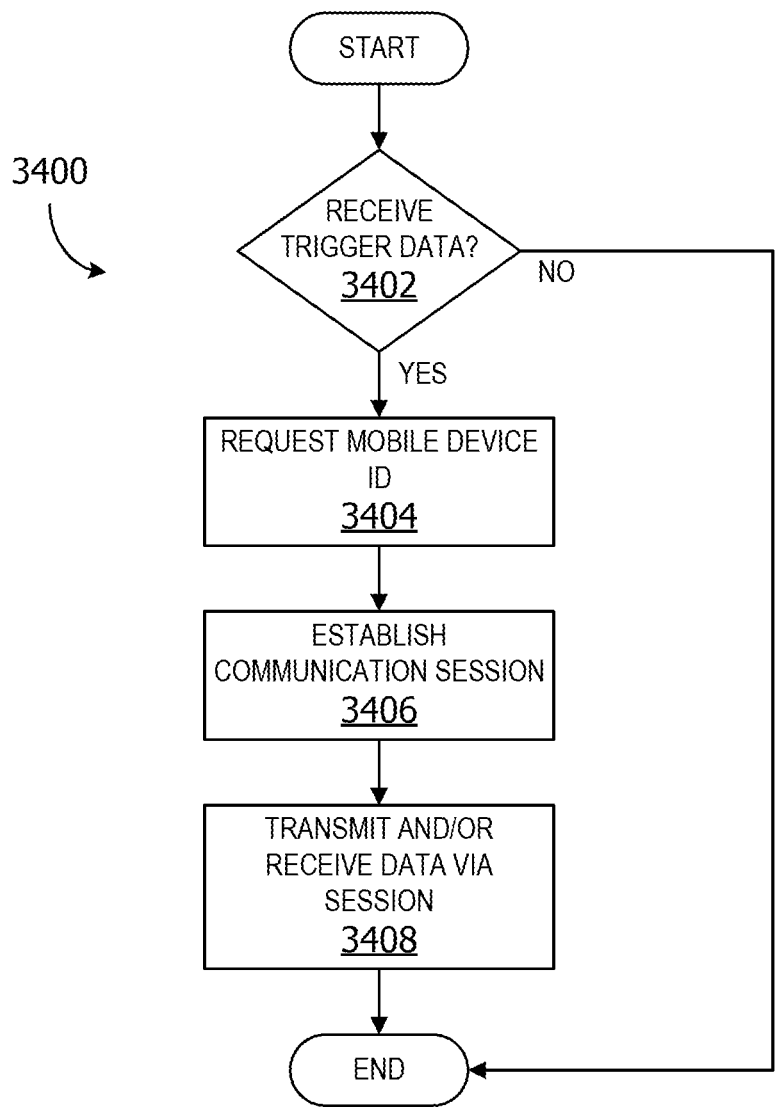
FIG. 34 is an exemplary flow chart illustrating a method of establishing communications between a computing device and a mobile user device based on a mobile device ID.

FIG. 34 is an exemplary flow chart illustrating a method of establishing communications between a computing device and a mobile user device based on a mobile device ID. It should be understood that the method 3400 as described may be implemented and/or executed by one or more components of a system such as systems described above with respect to FIGS. 1-32. If trigger data is received from a session initiation device at 3402, the computing device requests a mobile device ID at 3404. A communication session is established based on the mobile device ID at 3406.

The mobile user device 2406 represents any computing device executing computer-executable instructions. The mobile user device 2406 can be implemented as a mobile computing device, such as, but not limited to, a wearable computing device, a mobile (smart) telephone, laptop, tablet, computing pad, netbook, gaming device, and/or any other portable device. The user device 2406 includes at least one processor and a memory. The user device 2406 can also include a user interface component.

In some examples, the communication session is established and mediated by a connection server, such as, but not limited to, the connection server 2510 in FIG. 25. The computing device transmits data to the mobile user device and/or receives data from the mobile user device via the communication session at 3408. In some examples, the communication session is utilized to complete a transaction for goods and/or services. In other examples, the potentially long-lasting communication session is utilized to manage provision of other services, such as discounts, rewards, ordering items, confirming order of items, authenticating a user, requesting delivery of ordered items, confirming receipt of items, scheduling services, as well as any other type of service. The process terminates thereafter.

Figure 35:
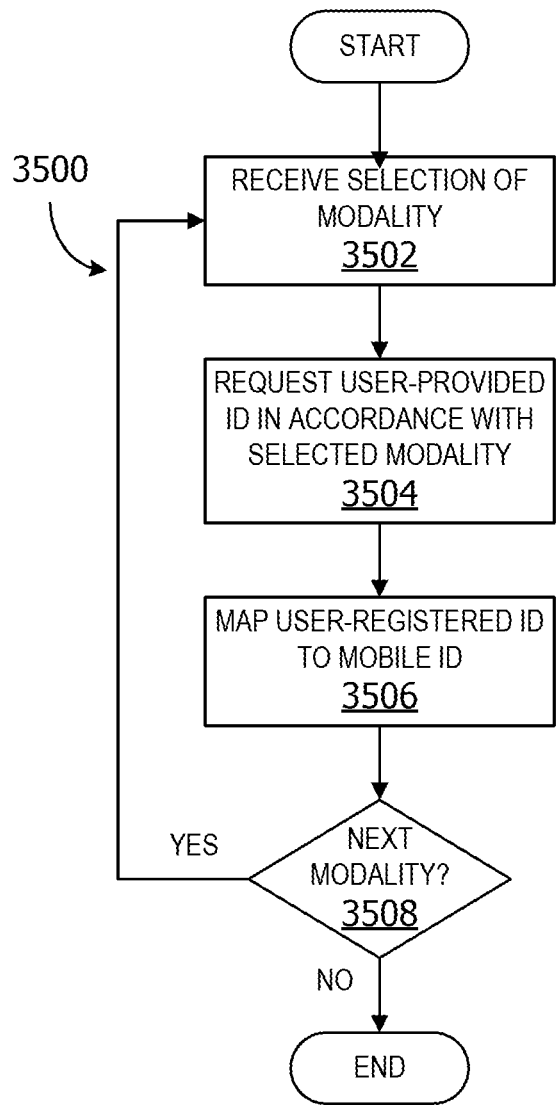
FIG. 35 is an exemplary flow chart illustrating a method of registering a mobile user device for contactless communication session establishment in accordance with a user-selected modality.

FIG. 35 is an exemplary flow chart illustrating a method of registering a mobile user device for contactless communication session establishment in accordance with a user-selected modality. It should be understood that the method 3500 as described may be implemented and/or executed by one or more components of a system such as systems described above with respect to FIGS. 1-32. At 3502, a user-selection of a modality is received during a user registration process. The system requests a user-provided identifier in accordance with the selected modality at 3504. For example, if the selected modality is a biometric-based modality, the user provides biometric data as part of the registration process. Likewise, if the selected modality is license plate recognition, the user provides the license plate number of the vehicle as the user-provided ID. The user-provided ID is mapped to a mobile device ID associated with the mobile user device of the user registering at 3506. The mapping may be made within a database entry associated with the user. A determination is made whether the user wishes to register a next modality for contactless communication session establishment at 3508. For example, the user may wish to register biometric data, such as facial recognition, as well as license plate recognition for the user's vehicle. If so, the process iteratively executes operations 3502 through 3508 until all selected modalities are registered. The process terminates thereafter.

Figure 36:
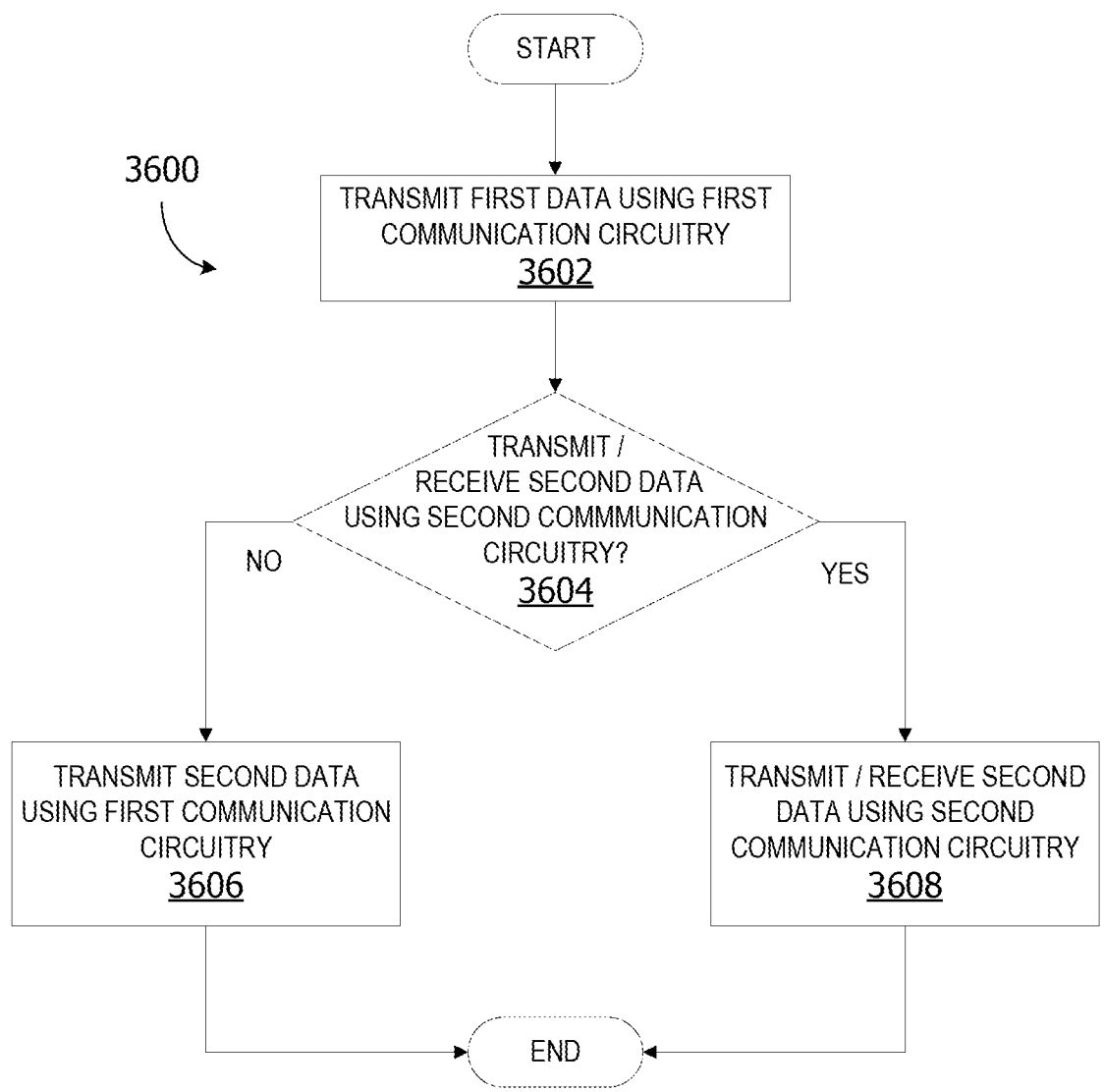
FIG. 36 is an exemplary flow chart illustrating a method of enabling communications between devices in accordance with an embodiment.

FIG. 36 is an exemplary flow chart illustrating a method 3600 of enabling communications between devices in accordance with an embodiment. It should be understood that the method 3600 as described may be implemented and/or executed by one or more components of a system such as systems described above with respect to FIGS. 1-32. The process shown in FIG. 36, in some examples, is carried out by a first data processing apparatus such as communication device 100, according to an embodiment. At 3602, the first communication circuitry 101 is controlled to transmit first data to a second data processing apparatus (such as POS device 105) when the first data processing apparatus is brought into proximity to the second data processing apparatus. At 3704, it is determined whether it is possible for the second communication circuitry 102 to receive second data based on data transmitted by the second data processing apparatus or to transmit second data such that data based on the transmitted second data is receivable by the second data processing apparatus, the second data being associated with the first data. When it is determined that it is possible for the second communication circuitry 102 to receive second data based on data transmitted by the second data processing apparatus or to transmit second data such that data based on the transmitted second data is receivable by the second data processing apparatus, the process moves to operation 3608, in which the second communication circuitry 102 is controlled to receive second data based on data transmitted by the second data processing apparatus or to transmit second data such that data based on the transmitted second data is receivable by the second data processing apparatus. The process then ends. On the other hand, when it is determined that it is not possible for the second communication circuitry 102 to transmit second data such that data based on the transmitted second data is receivable by the second data processing apparatus or to receive second data based on data transmitted by the second data processing apparatus, the process moves to operation 3606, in which the first communication circuitry 101 is controlled to transmit second data such that data based on the transmitted second data is receivable by the second data processing apparatus or to receive second data based on data transmitted by the second data processing apparatus when the first data processing apparatus is brought into proximity to the second data processing apparatus a further one or more times. The process then ends thereafter.

Figure 37:
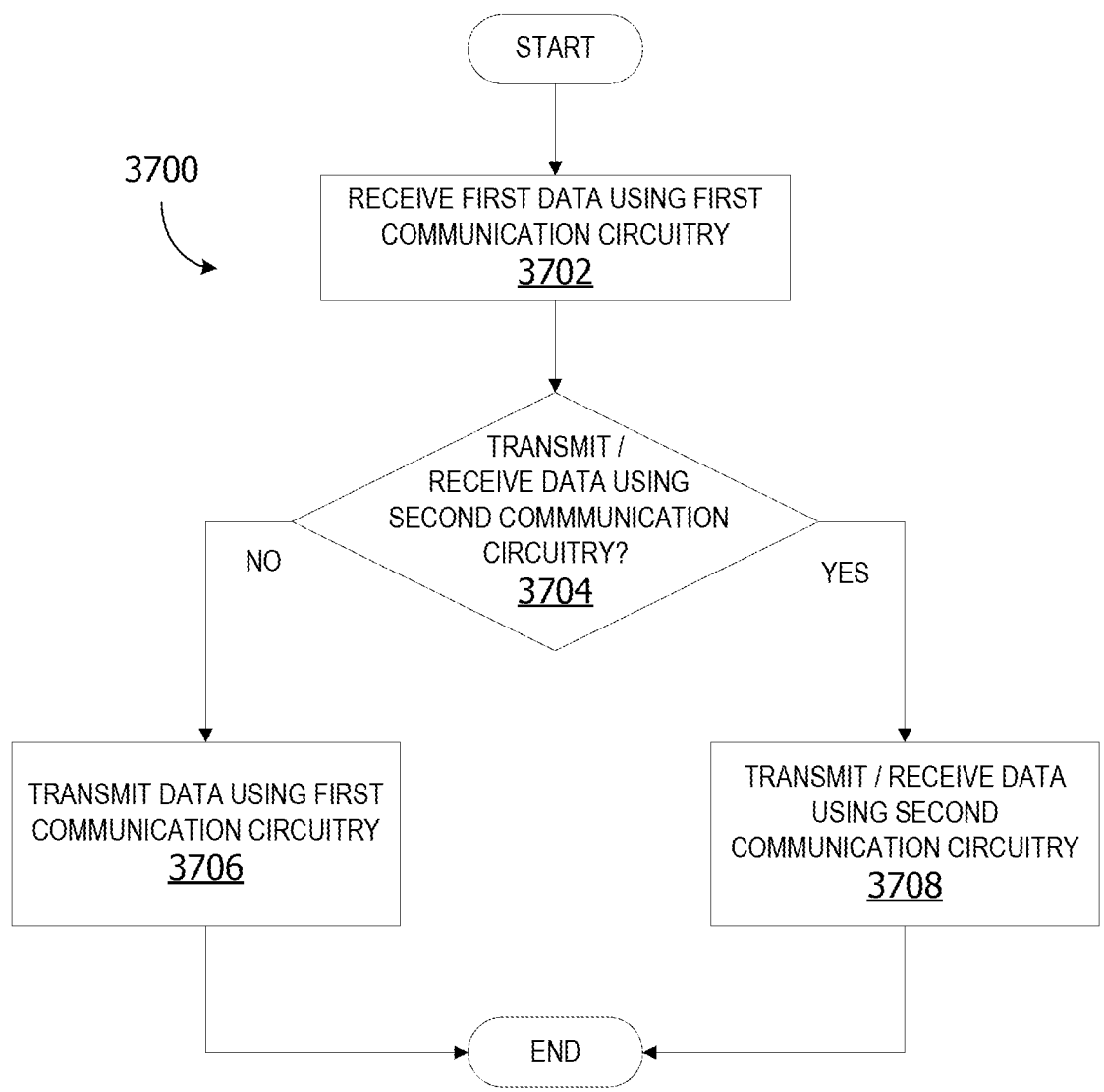
FIG. 37 is an exemplary flow chart illustrating a method of enabling communications between devices in accordance with an embodiment.

FIG. 37 is an exemplary flow chart illustrating a method of enabling communications between devices in accordance with an embodiment. It should be understood that the method 3700 as described may be implemented and/or executed by one or more components of a system such as systems described above with respect to FIGS. 1-32. In some examples, the process shown in FIG. 37 is carried out by a first data processing apparatus such as POS device 105, according to an embodiment. At operation 3702, the first communication circuitry 106 is controlled to receive first data from a second data processing apparatus (such as communication device 100) when the second data processing apparatus is brought into proximity to the first data processing apparatus. At 3704, it is determined whether it is possible for the second communication circuitry 107 to receive second data based on data transmitted by the second data processing apparatus or transmit second data such that data based on the transmitted second data is receivable by the second data processing apparatus, the second data being associated with the first data. When it is determined that it is possible for the second communication circuitry 107 to receive second data based on data transmitted by the second data processing apparatus or to transmit second data such that data based on the transmitted second data is receivable by the second data processing apparatus, the process moves to 3708, in which the second communication circuitry 107 is controlled to receive second data based on data transmitted by the second data processing apparatus or to transmit second data such that data based on the transmitted second data is receivable by the second data processing apparatus. The process then ends. On the other hand, when it is determined that it is not possible for the second communication circuitry 107 to transmit second data such that data based on the transmitted second data is receivable by the second data processing apparatus or to receive second data based on data transmitted by the second data processing apparatus, the process moves to 3706, in which the first communication circuitry 106 is controlled to transmit second data such that data based on the transmitted second data is receivable by the second data processing apparatus or to receive second data based on data transmitted by the second data processing apparatus when the first data processing apparatus is brought into proximity to the second data processing apparatus a further one or more times. The process then terminates thereafter.

In embodiments, the term "Bluetooth®" refers to any existing or future Bluetooth® specification as overseen by the Bluetooth® Special Interest Group (SIG) which is suitable for use with some examples.

In embodiments, the term "Wi-Fi®" refers to any existing or future IEEE 802.11 Wireless Local Area Networks (WLAN) specification as certified by the Wi-Fi® Alliance which is suitable for use with some examples.

In embodiments, the term "Near Field Communication (NFC)" refers to any existing or future NFC specification as managed by the various NFC standards organisations which is suitable for use with the present technique. In particular, the terms "Contactless EMV®" and "Mobile EMV®" refer to any existing or future EMV® specification as managed by EMVCo® which is suitable for use with some examples.

Exemplary Operating Environment

Figure 38:
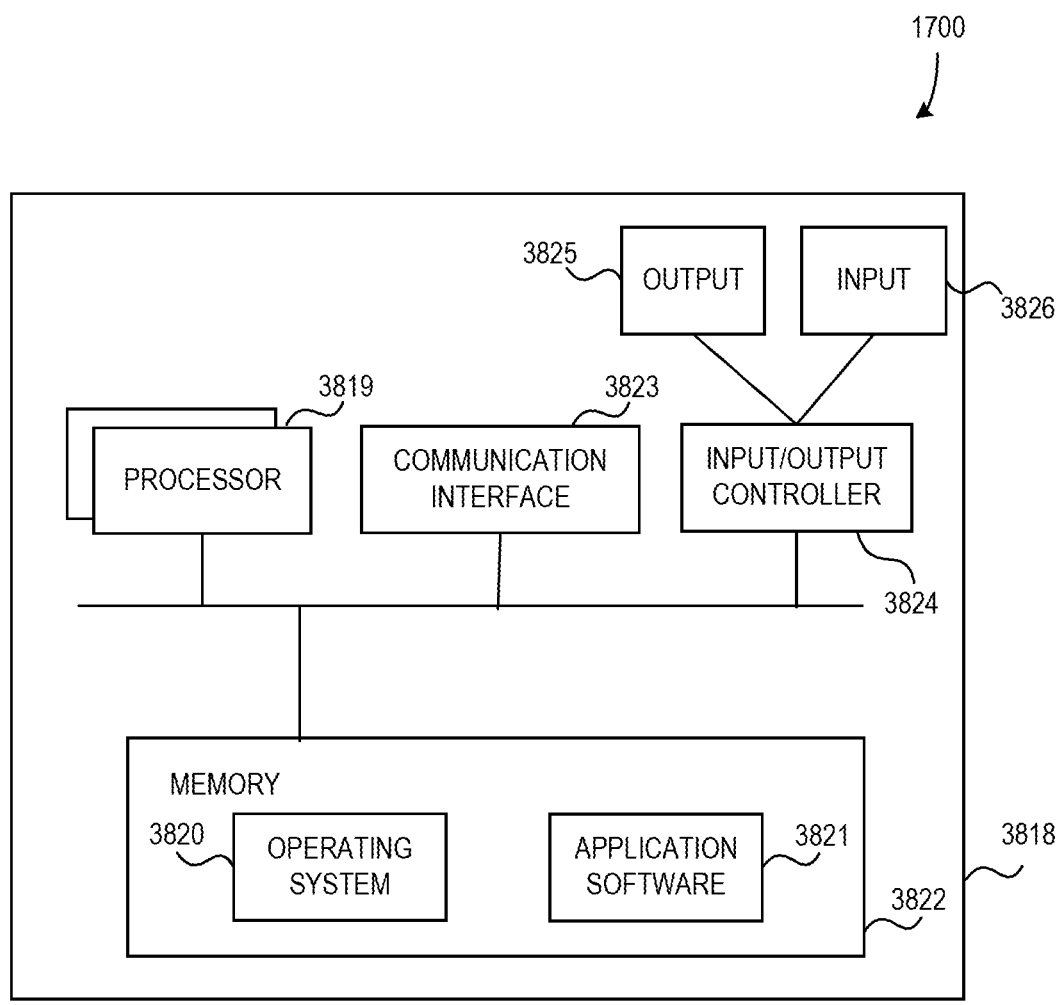
FIG. 38 illustrates a computing apparatus according to an embodiment as a functional block diagram.

The present disclosure is operable with a computing apparatus according to an embodiment as a functional block diagram 3800 in FIG. 38. In an embodiment, components of a computing apparatus 3818 may be implemented as a part of an electronic device according to one or more embodiments described in this specification. The computing apparatus 3818 comprises one or more processors 3819 which may be microprocessors, controllers, or any other suitable type of processors for processing computer executable instructions to control the operation of the electronic device. Alternatively, or in addition, the processor 3819 is any technology capable of executing logic or instructions, such as a hardcoded machine. Platform software comprising an operating system 3820 or any other suitable platform software may be provided on the apparatus 3818 to enable application software 3821 to be executed on the device. According to an embodiment, monitoring a plurality of clusters and generating unified alerts associated with issues across multiple clusters, as described herein may be accomplished by software, hardware, and/or firmware.

Computer executable instructions may be provided using any computer-readable media that are accessible by the computing apparatus 3818. Computer-readable media may include, for example, computer storage media such as a memory 3822 and communications media. Computer storage media, such as a memory 3822, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 3822) is shown within the computing apparatus 3818, it will be appreciated by a person skilled in the art, that the storage may be distributed or located remotely and accessed via a network or other communication link (e.g. using a communication interface 3823).

The computing apparatus 3818 may comprise an input/output controller 3824 configured to output information to one or more output devices 3825, for example a display or a speaker, which may be separate from or integral to the electronic device. The input/output controller 3824 may also be configured to receive and process an input from one or more input devices 3826, for example, a keyboard, a microphone, or a touchpad. In one embodiment, the output device 3825 may also act as the input device. An example of such a device may be a touch sensitive display. The input/output controller 3824 may also output data to devices other than the output device, e.g. a locally connected printing device. In some embodiments, a user may provide input to the input device(s) 3826 and/or receive output from the output device(s) 3825.

The functionality described herein can be performed, at least in part, by one or more hardware logic components. According to an embodiment, the computing apparatus 3818 is configured by the program code when executed by the processor 3819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: receive trigger data associated with a user-selected modality in a set of modalities from a session initiation device, the trigger data generated in response to occurrence of a predetermined event corresponding to the selected modality; request a mobile device identifier from a second computing device responsive to receiving the trigger data from the session initiation device, the trigger data comprising at least one unique user-registered identifier, the unique user-registered identifier mapped to the requested mobile device identifier; establish a communication session between the first computing device and the mobile user device using the mobile device identifier; control a first communication circuitry to transmit first data to the mobile user device when the first computing device is brought into proximity to the mobile user device via the established communication session; and control a second communication circuitry to transmit second data such that data based on the transmitted second data is receivable by mobile user device or to receive the second data based on data transmitted by the mobile user device via the established communication session on condition the second communication circuitry is enabled to transmit second data such that data based on the transmitted second data is receivable by the mobile user device or to receive second data based on data transmitted by the mobile user device.

In some examples, the connection server is a tap and connect server, which has a registration between a user payment card number (PAN) and a user mobile computing device. When the user uses their card at a payment terminal, the merchant computing device sends the PAN to the connection server. The connection server sets up a channel between the merchant computing device and the cardholder's mobile user device by making that association from the database of registered card numbers. This enables use of a card for a physical transaction, contactless transaction or contact chip transaction.

In other examples, rather than purely triggering the establishment of the session based on an initial contactless transaction, the system is able to establish the channel based on other means of ID methods than purely a contactless or contact card. With e-commerce modalities, the channel is established based on a remote, e-commerce transaction, without in-person contact with the payment card.

In other examples, a user can be registered to set up alternative modalities for establishing the connection between the user's mobile device and a merchant's computing device. For example, if the user selects a biometric modality, the user registers their biometric data. The system associates that registered biometric data to the user's mobile device. When the user arrives at a merchant's establishment, the merchant gathers piece of biometric data which is sent to a connection server and/or a biometric server. The server utilizes the biometric data to look-up and obtain the user's registered mobile device ID, used to establish a channel between merchant and card holder computing devices.

In other examples, the user registers a car registration plate, which can be read by a camera or other session initiation device in a parking lot, drive-thru or toll scenario. The system identifies a registered car license plate number and uses it to obtain the mobile device ID and establish the communications session.

In other examples, the database could have an accumulation of different IDs for each user. For example, a user may register their PAN, biometric data, and a vehicle license plate. In another example, a user may register multiple IoT devices as well as their vehicle license plate and PAN. This database could have accumulation of different IDs registered against the same mobile device. When the system detects trigger data including a registered type of ID, the system establishes the communications session between the merchant and cardholder mobile device for loyalty value added services, taking a payment over channel, etc.

In other examples, an IoT device can include a refrigerator or other appliance. In an example scenario, if a refrigerator tries to automatically order groceries, the system recognizes the device IoT and automatically establishes the communications channel with the user's mobile device. The user is enabled to review the order, approve it, cancel it, or modify the order in real-time. Likewise, if the IoT device is a printer, the user device session may be established to enable the user to approve, modify or cancel automatic orders for new ink cartridges, etc.

In other examples, the user can access the registration data on the database via the mobile user device to perform de-registration. De-registration could include removing or modifying selected modalities, changing user provided identifiers, removing payment cards, etc.

Alternatively, or in addition to the other examples described herein, examples include any combination of the following:

- a data storage device storing user-provided registration data, the user-provided registration data comprising a mapping of the unique user-registered ID to the mobile device ID and a selection of at least one modality from a plurality of modalities for establishing contactless communication sessions between the second computing device and the mobile user device;
- wherein the user-selected modality further comprises a biometric identification, wherein the session initiation device further comprises at least one biometric reader device, and wherein the trigger data comprises biometric data;
- a biometric server configured to receive biometric data from the at least one biometric reader device, wherein the biometric server maps the biometric data to a biometric ID for a given user, and wherein the biometric server transmits the biometric ID to the second computing device;
- a database associated with a data storage device, wherein the biometric ID is mapped to the mobile device ID within the database;
- wherein the user-selected modality further comprises an Internet of Things (IoT) device recognition, wherein the trigger data comprises a device ID associated with a user-registered IoT device, and further comprising: a database associated with a data storage device, wherein the device ID is mapped to the mobile device ID within the database;
- wherein the user-selected modality is an e-commerce modality or a point-of-sale (POS) device-related modality, and wherein the trigger data comprises a primary account number (PAN), and further comprising: a database associated with a data storage device, wherein the PAN is mapped to the mobile device ID within the database;
- wherein the user-selected modality is a license plate recognition, and wherein the trigger data further comprises a license plate number associated with a vehicle, and further comprising a database associated with a data storage device, wherein the license plate number is mapped to the mobile device ID within the database;
- wherein the user-selected modality is a location-based modality, and wherein the trigger data comprises recognition of a device within a geofence area, and further comprising a database associated with a data storage device, wherein a user-provided ID is mapped to the mobile device ID within the database;
- receiving a biometric ID a biometric server, wherein the biometric server is configured to receive biometric data from the at least one biometric reader device, wherein the biometric server maps the biometric data to the biometric ID for a given user, and wherein the biometric server transmits the biometric ID to the second computing device;
- wherein the user-selected modality further comprises an Internet of Things (IoT) device recognition, wherein the trigger data comprises a device ID associated with a user-registered IoT device, and further comprising retrieving, from a database associated with a data storage device, the mobile device ID mapped to the device ID obtained from the trigger data;
- wherein the user-selected modality is an e-commerce modality or a point-of-sale (POS) device-related modality, and wherein the trigger data comprises a primary account number (PAN), and further comprising:
- retrieving, from a database associated with a data storage device, the mobile device ID associated with the PAN;
- wherein the user-selected modality is a license plate recognition, and wherein the trigger data further comprises a license plate number associated with a vehicle, and further comprising:
- retrieving, from a database associated with a data storage device, the mobile device ID associated with the license plate number.
- first data processing apparatus comprising first communication circuitry configured to transmit data to a second data processing apparatus or receive data from the second data processing apparatus using electromagnetic induction when the first data processing apparatus is brought into proximity to the second data processing apparatus; second communication circuitry configured to transmit or receive data via a radio signal;
- a processor circuitry configured to control the first communication circuitry to transmit first data to the second data processing apparatus when the first data processing apparatus is brought into proximity to the second data processing apparatus; to determine whether it is possible for the second communication circuitry to transmit second data such that data based on the transmitted second data is receivable by the second data processing apparatus or to receive second data based on data transmitted by the second data processing apparatus, the second data being associated with the first data;
- when it is determined that it is possible for the second communication circuitry to transmit second data such that data based on the transmitted second data is receivable by the second data processing apparatus or to receive second data based on data transmitted by the second data processing apparatus, the processor is configured to
- the processor configured to control the second communication circuitry to transmit second data such that data based on the transmitted second data is receivable by second data processing apparatus or to receive the second data based on data transmitted by the second data processing apparatus;
- wherein, when it is determined that it is possible for the second communication circuitry to transmit second data such that data based on the transmitted second data is receivable by the second data processing apparatus or to receive second data based on data transmitted by the second data processing apparatus;
- the processor circuitry is configured to control the first or second communication circuitry to transmit first type data to the second data processing apparatus, the first type data indicating one or more types of second data that are permitted by a user of the first data processing apparatus to be transmitted or received by the second communication circuitry;
- the processor configured to control the first or second communication circuitry to receive second type data from the second data processing apparatus, the second type data indicating one or more types of second data on which data transmitted to or received by the second data processing apparatus is based that are permitted by a user of the second data processing apparatus;

the processor configured to control the second communication circuitry to transmit second data such that data based on the transmitted second data is receivable by the second data processing apparatus or to receive second data based on data transmitted by the second data processing apparatus only of one or more types permitted by both the user of the first data processing apparatus and the user of the second data processing apparatus;

wherein, when it is determined that it is not possible for the second communication circuitry to transmit second data such that data based on the transmitted second data is receivable by the second data processing apparatus or to receive second data based on data transmitted by the second data processing apparatus, the processor circuitry is configured to control the first communication circuitry to transmit second data such that data based on the transmitted second data is receivable by the second data processing apparatus or to receive second data based on data transmitted by the second data processing apparatus when the first data processing apparatus is brought into proximity to the second data processing apparatus a further one or more times;

wherein the second communication circuitry is configured to transmit second data such that data based on the transmitted second data is receivable by the second data processing apparatus or to receive second data based on data transmitted by the second data processing apparatus via a third data processing apparatus comprised within a network comprising the first data processing apparatus and the second data processing apparatus;

wherein the second communication circuitry is configured to transmit the second data to the second data processing apparatus or receive the second data from the second data processing apparatus;

wherein the first data is for initiating an electronic payment from a user of the first data processing apparatus to a user of the second data processing apparatus and the second data is associated with the electronic payment initiated by the first data;

wherein the second data is for updating the electronic payment initiated using the first data;

wherein the second data comprises verification data generated in response to a verification process completed by the user of the first data processing apparatus for verifying the electronic payment initiated using the first data;

wherein the electronic payment initiated using the first data is a payment card payment and the second data is for updating payment card data used for the payment card payment;

wherein the second data is a type of second data always permitted to be transmitted such that data based on the transmitted second data is receivable by the second data processing apparatus or to be received based on data transmitted by the second data processing apparatus;

wherein the electronic payment initiated using the first data is a payment card payment, and the first data comprises information for completing an authorisation request to be transmitted from the second data processing apparatus to a device of an acquirer for processing of the electronic payment;

wherein the determination of whether it is possible for the second communication circuitry to transmit second data such that data based on the transmitted second data is receivable by the second data processing apparatus or to receive second data based on data transmitted from the second data processing apparatus;

controlling the first communication circuitry to transmit to the second data processing apparatus, with the first data, indication data indicating that the second communication circuitry is configured to transmit data such that data based on the transmitted data is receivable by the second data processing apparatus or to receive data based on data transmitted by the second data processing apparatus;

determining whether one of the first and second communication circuitry receives, from the second data processing apparatus, response data indicating that it is possible for the second data processing apparatus to transmit data on the basis of which data is receivable by the second communication circuitry or to receive data based on data transmitted by the second communication circuitry;

when it is determined that the response data has been received by one of the first and second communication circuitry, determine that it is possible for the second communication circuitry to transmit second data such that data based on the transmitted second data is receivable by the second data processing apparatus or to receive second data based on data transmitted by the second data processing apparatus;

the first communication circuitry is configured to transmit data to the second data processing apparatus or receive data from the second data processing apparatus using Contactless EMV;

wherein the indication data is comprised within response data transmitted in response to a Select Proximity Payment Systems Environment (PPSE) command received by the first communication circuitry from the second data processing apparatus;

the indication data is comprised within response data transmitted in response to a Select Application Identifier (AID) command received by the first communication circuitry from the second data processing apparatus;

A data processing apparatus wherein the first data processing apparatus is a communication device, and the second data processing apparatus is a point-of-sale (POS) device;

a data processing apparatus according to any preceding clause, wherein the second communication circuitry is configured to transmit data such that data based on the transmitted data is receivable by the second data processing apparatus or to receive data based on data transmitted by the second data processing apparatus via a local network or a mobile telecommunications network;

wherein the local network is a Wi-Fi network or Bluetooth network;

wherein the first communication circuitry is configured to transmit data to or receive data from the second data processing apparatus using Near Field Communication (NFC);

wherein the first communication circuitry is configured to transmit data to or receive data from the second data processing apparatus using Contactless EMV;

wherein the second data is for providing an electronic message from the second data processing apparatus to the first data processing apparatus;

wherein the electronic message comprises a hyperlink;

wherein the second data is for providing an electronic payment receipt from the second data processing apparatus to the first data processing apparatus;
wherein the second data is for providing coupon data between the first data processing apparatus and the second data processing apparatus;
the second data is for providing loyalty data between the first data processing apparatus and the second data processing apparatus;
first data processing apparatus device comprising: first communication circuitry configured to receive data from a second data processing apparatus or transmit data to a second data processing apparatus using electromagnetic induction when the second data processing apparatus is brought into proximity with the first data processing apparatus; second communication circuitry configured to receive or transmit data via a radio signal; and processor circuitry configured to control the first communication circuitry to receive first data from the second data processing apparatus when the second data processing apparatus is brought into proximity to the first data processing apparatus; to determine whether it is possible for the second communication circuitry to receive second data based on data transmitted by the second data processing apparatus or transmit second data such that data based on the transmitted second data is receivable by the second data processing apparatus, the second data being associated with the first data; and when it is determined that it is possible for the second communication circuitry to receive second data based on data transmitted by the second data processing apparatus or to transmit second data such that data based on the transmitted second data is receivable by the second data processing apparatus, to control the second communication circuitry to receive second data based on data transmitted by the second data processing apparatus or to transmit second data such that data based on the transmitted second data is receivable by the second data processing apparatus;
a first data processing apparatus wherein, when it is determined that it is possible for the second communication circuitry to transmit second data such that data based on the transmitted second data is receivable by the second data processing apparatus or to receive second data based on data transmitted by the second data processing apparatus, the processor circuitry is configured: to control the first or second communication circuitry to receive first type data from the second data processing apparatus, the first type data indicating one or more types of second data on which data transmitted to or received by the second data processing apparatus is based that are permitted by a user of the second data processing apparatus; to control the first or second communication circuitry to transmit second type data to the second data processing apparatus, the second type data indicating one or more types of second data that are permitted by a user of the first data processing apparatus to be transmitted or received by the second communication circuitry; and to control the second communication circuitry to transmit second data such that data based on the transmitted second data is receivable by the second data processing apparatus or to receive second data based on data transmitted by the second data processing apparatus only of one or more types permitted by both the user of the second data processing apparatus and the user of the first data processing apparatus;
a first data processing apparatus wherein, when it is determined that it is not possible for the second communication circuitry to transmit second data such that data based on the transmitted second data is receivable by the second data processing apparatus or to receive second data based on data transmitted by the second data processing apparatus, the processor circuitry is configured to control the first communication circuitry to transmit the second data such that data based on the transmitted second data is receivable by the second data processing apparatus or to receive second data based on data transmitted by the second data processing apparatus when the second data processing apparatus is brought into proximity to the first data processing apparatus a further one or more times;
wherein the second communication circuitry is configured to transmit second data such data based on the transmitted second data is receivable by the second data processing apparatus or to receive second data based on data transmitted by the second data processing apparatus via a third data processing apparatus comprised within a network comprising the second data processing apparatus and the first data processing apparatus;
wherein the second communication circuitry is configured to transmit the second data to the second data processing apparatus or receive the second data from the second data processing apparatus;
wherein the first data is for initiating an electronic payment from a user of the second data processing apparatus to a user of the first data processing apparatus and the second data is associated with the electronic payment initiated by the first data;
wherein the second data is for updating the electronic payment initiated using the first data;
wherein the second data comprises verification data generated in response to a verification process completed by the user of the second data processing apparatus for verifying the electronic payment initiated using the first data;
wherein the electronic payment initiated using the first data is a payment card payment and the second data is for updating payment card data used for the payment card payment;
the second data is a type of second data always permitted to be transmitted such that data based on the transmitted second data is receivable by the second data processing apparatus or to be received based on data transmitted by the second data processing apparatus;
wherein the electronic payment initiated using the first data is a payment card payment, and the first data comprises information for completing an authorisation request to be transmitted from the first data processing apparatus to a device of an acquirer for processing of the electronic payment;
wherein the determination of whether it is possible for the second communication circuitry to transmit second data such that data based on the transmitted second data is receivable by the second data processing apparatus or to receive second data based on data transmitted by the second data processing apparatus;
determining whether the first communication circuitry receives from the second data processing apparatus, with the first data, indication data indicating that the second data processing apparatus is configured to transmit data such that data based on the transmitted data is receivable by the second communication circuitry or to receive data based on data transmitted by the second communication circuitry;

when it is determined that the indication data has been received by the first communication circuitry, determine that it is possible for the second communication circuitry to transmit second data such that data based on the transmitted second data is receivable by the second data processing apparatus or to receive second data based on data transmitted by the second data processing apparatus;

the first communication circuitry is configured to transmit data to the second data processing apparatus or receive data from the second data processing apparatus using Contactless EMV;

wherein the indication data is comprised within response data transmitted in response to a Select Proximity Payment Systems Environment (PPSE) command transmitted by the first communication circuitry to the second data processing apparatus;

wherein the indication data is comprised within response data transmitted in response to a Select Application Identifier (AID) command transmitted by the first communication circuitry to the second data processing apparatus;

wherein the first data processing apparatus is a point-of-sale (POS) device and the second data processing apparatus is a communication device;

wherein the second communication circuitry is configured to transmit data such that data based on the transmitted data is receivable by the second data processing apparatus or to receive data based on data transmitted by the second data processing apparatus via a local network or a mobile telecommunications network;

wherein the local network is a Wi-Fi or Bluetooth network;

wherein the first communication circuitry is configured to transmit data to or receive data from the second data processing apparatus using Near Field Communication (NFC);

wherein the first communication circuitry is configured to transmit data to or receive data from the second data processing apparatus using Contactless EMV;

wherein the second data is for providing an electronic message from the first data processing apparatus to the second data processing apparatus;

wherein the electronic message comprises a hyperlink;

wherein the second data is for providing an electronic payment receipt from the first data processing apparatus to the second data processing apparatus;

wherein the second data is for providing coupon data between the first data processing apparatus and the second data processing apparatus;

wherein the second data is for providing loyalty data between the first data processing apparatus and the second data processing apparatus;

a method of controlling a first data processing apparatus comprising first communication circuitry and second communication circuitry, the first communication circuitry being configured to transmit data to a second data processing apparatus or receive data from the second data processing using electromagnetic induction when the first data processing apparatus is brought into proximity to the second data processing apparatus and the second communication circuitry being configured to transmit or receive data via a radio signal, wherein the method comprises: controlling the first communication circuitry to transmit first data to the second data processing apparatus first when the first data processing apparatus is brought into proximity to the second data processing apparatus; determining whether it is possible for the second communication circuitry to transmit second data such that data based on the transmitted second data is receivable by the second data processing apparatus or to receive second data based on data transmitted by the second data processing apparatus, the second data being associated with the first data; and when it is determined that it is possible for the second communication circuitry to transmit second data such that data based on the transmitted second data is receivable by the second data processing apparatus or to receive second data based on data transmitted by the second data processing apparatus, controlling the second communication circuitry to transmit second data such that data based on the transmitted second data is receivable by the second data processing apparatus or to receive second data based on data transmitted by the second data processing apparatus;

a method of controlling a first data processing apparatus comprising first communication circuitry and second communication circuitry, the first communication circuitry being configured to receive data from a second data processing apparatus or transmit data to a second data processing apparatus using electromagnetic induction when the second data processing apparatus is brought into proximity with the first data processing apparatus and the second communication circuitry being configured to receive or transmit data via a radio signal, wherein the method comprises: controlling the first communication circuitry to receive first data from the second data processing apparatus when the second data processing apparatus is brought into proximity to the first data processing apparatus; determining whether it is possible for the second communication circuitry to receive second data based on data transmitted by the second data processing apparatus or transmit second data such that data based on the transmitted second data is receivable by the second data processing apparatus, the second data being associated with the first data; and when it is determined that it is possible for the second communication circuitry to receive second data based on data transmitted by the second data processing apparatus or to transmit second data such that data based on the transmitted second data is receivable by the second data processing apparatus, controlling the second communication circuitry to receive second data based on data transmitted by the second data processing apparatus or to transmit second data such that data based on the transmitted second data is receivable by the second data processing apparatus.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware, or any combination of these. Described embodiments may optionally be implemented at least partly as computer software running on one or more data processors and/or digital signal processors. The elements and components of any embodiment may be physically, functionally, and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A system for contactless initiation of communication sessions between devices using multiple modalities, the system comprising:
    a session initiation device configured to generate trigger data in accordance with a user-selected modality in a set of modalities responsive to occurrence of a predetermined event corresponding to the selected modality;
    a first computing device comprising:
        first communication circuitry configured to transmit data to a mobile user device or receive data from the mobile user device using electromagnetic induction upon the first computing device being brought into proximity to the mobile user device;
        second communication circuitry configured to transmit or receive data via a radio signal;
        a processor; and
        a memory comprising computer program code that, when executed by the processor, is operable to:
            request a mobile device identifier (ID) from a second computing device responsive to receiving the trigger data from the session initiation device, the trigger data comprising a unique user-registered ID, the unique user-registered ID mapped to the requested mobile device ID;
            establish a communication session between the first computing device and the mobile user device using the mobile device ID; and
            control the first communication circuitry to transmit first data to the mobile user device via the established communication session upon the first computing device being brought into proximity to the mobile user device; and
            control the second communication circuitry to:
                (i) transmit second data via the communication session such that data based on the transmitted second data is receivable by the mobile user device, or
                (ii) receive third data based on data transmitted by the mobile user device.

2. The system of claim 1, further comprising: a data storage device storing user-provided registration data, the user-provided registration data comprising a mapping of the unique user-registered ID to the mobile device ID and a selection of a modality from a plurality of modalities for establishing contactless communication sessions between the second computing device and the mobile user device.

3. The system of claim 1, wherein the user-selected modality further comprises a biometric identification, wherein the session initiation device further comprises a biometric reader device, and wherein the trigger data comprises biometric data, and further comprising: a biometric server configured to receive biometric data from the a biometric reader device, wherein the biometric server maps the biometric data to a biometric ID for a given user, and wherein the biometric server transmits the biometric ID to the second computing device; and a database associated with a data storage device, wherein the biometric ID is mapped to the mobile device ID within the database.

4. The system of claim 1, wherein the user-selected modality further comprises an Internet of Things (IoT) device recognition, wherein the trigger data comprises a device ID associated with a user-registered IoT device, and further comprising: a database associated with a data storage device, wherein the device ID is mapped to the mobile device ID within the database.

5. The system of claim 1, wherein the user-selected modality is an e-commerce modality or a point-of-sale (POS) device-related modality, and wherein the trigger data comprises a primary account number (PAN), and further comprising: a database associated with a data storage device, wherein the PAN is mapped to the mobile device ID within the database.

6. The system of claim 1, wherein the user-selected modality is a license plate recognition, and wherein the trigger data further comprises a license plate number associated with a vehicle, and further comprising: a database associated with a data storage device, wherein the license plate number is mapped to the mobile device ID within the database.

7. The system of claim 1, wherein the user-selected modality is a location-based modality, and wherein the trigger data comprises recognition of a device within a geofence area, and further comprising: a database associated with a data storage device, wherein a user-provided ID is mapped to the mobile device ID within the database.

8. A computerized method for contactless initiation of communications sessions between devices using multiple modalities, the method comprising:
    receiving trigger data associated with a user-selected modality in a set of modalities from a session initiation device, the trigger data generated in response to occurrence of a predetermined event corresponding to the selected modality;
    requesting a mobile device identifier (ID) from a second computing device responsive to receiving the trigger data from the session initiation device, the trigger data comprising a unique user-registered ID, the unique user-registered ID mapped to the requested mobile device ID;
    establishing a communication session between a first computing device and a mobile user device using the mobile device;
    controlling a first communication circuitry to transmit first data to the mobile user device upon the first computing device being brought into proximity to the mobile user device via the established communication session;

controlling a second communication circuitry to transmit second data such that data based on the transmitted second data is receivable by the mobile user device; and controlling the second communications circuitry to receive third data based on data transmitted by the mobile user device via the established communication session, wherein the second communication circuitry is enabled to transmit second data such that data based on the transmitted second data is receivable by the mobile user device or to receive third data based on data transmitted by the mobile user device.

9. The method of claim 8, further comprising: storing, in a database associated with a data storage device, user-provided registration data, the user-provided registration data comprising a mapping of the unique user-registered ID to the mobile device ID and a selection of a modality from a plurality of modalities for establishing contactless communication sessions between the second computing device and the mobile user device.

10. The method of claim 8, wherein the user-selected modality further comprises a biometric identification, wherein the session initiation device further comprises a biometric reader device, and wherein the trigger data comprises biometric data, and further comprising: receiving a biometric ID from a biometric server, wherein the biometric server is configured to receive biometric data from the a biometric reader device, wherein the biometric server maps the biometric data to the biometric ID for a given user, and wherein the biometric server transmits the biometric ID to the second computing device.

11. The method of claim 8, wherein the user-selected modality further comprises an Internet of Things (IoT) device recognition, wherein the trigger data comprises a device ID associated with a user-registered IoT device, and further comprising: retrieving, from a database associated with a data storage device, the mobile device ID mapped to the device ID obtained from the trigger data.

12. The method of claim 8, wherein the user-selected modality is an e-commerce modality or a point-of-sale (POS) device-related modality, and wherein the trigger data comprises a primary account number (PAN), and further comprising: retrieving, from a database associated with a data storage device, the mobile device ID mapped to the PAN.

13. The method of claim 8, wherein the user-selected modality is a license plate recognition, and wherein the trigger data further comprises a license plate number associated with a vehicle, and further comprising: retrieving, from a database associated with a data storage device, the mobile device ID associated with the license plate number.

14. The method of claim 8, wherein the user-selected modality is a location-based modality, and wherein the trigger data comprises recognition of a device within a geofence area, and further comprising: retrieving, from a database associated with a data storage device, the mobile device ID associated with location-based trigger data.

15. One or more non-transitory computer readable storage media having computer-executable instructions for contactless initiation of communications sessions between devices using multiple modalities, that, upon execution by a processor, cause the processor to at least:

receive trigger data associated with a user-selected modality in a set of modalities from a session initiation device, the trigger data generated in response to occurrence of a predetermined event corresponding to the selected modality;

request a mobile device identifier (ID) from a second computing device responsive to receiving the trigger data from the session initiation device, the trigger data comprising a unique user-registered ID, the unique user-registered ID mapped to the requested mobile device ID;

establish a communication session between a first computing device and a mobile user device using the mobile device ID; control a first communication circuitry to transmit first data to the mobile user device upon the first computing device being brought into proximity to the mobile user device via the established communication session;

control a second communication circuitry to transmit second data such that data based on the transmitted second data is receivable by the mobile user device; and control the second communication circuitry to receive third data based on data transmitted by the mobile user device via the established communication session, wherein the second communication circuitry is enabled to transmit second data such that data based on the transmitted second data is receivable by the mobile user device or to receive third data based on data transmitted by the mobile user device.

16. The one or more computer storage media of claim 15, wherein the computer-executable instructions, upon execution by a processor, further cause the processor to at least: store, in a database associated with a data storage device, user-provided registration data, the user-provided registration data comprising a mapping of the unique user-registered ID to the mobile device ID and a selection of a modality from a plurality of modalities for establishing contactless communication sessions between the second computing device and the mobile user device.

17. The one or more computer storage media of claim 15, wherein the computer-executable instructions, upon execution by a processor, further cause the processor to at least: receive a biometric ID a biometric server, wherein the biometric server is configured to receive biometric data from a biometric reader device, wherein the biometric server maps the biometric data to the biometric ID for a given user, and wherein the biometric server transmits the biometric ID to the second computing device.

18. The one or more computer storage media of claim 15, wherein the computer-executable instructions, upon execution by a processor, further cause the processor to at least: receive a biometric ID from a biometric server, wherein the biometric server is configured to receive biometric data from a biometric reader device, wherein the biometric server maps the biometric data to the biometric ID for a given user, and wherein the biometric server transmits the biometric ID to the second computing device.

19. The one or more computer storage media of claim 15, wherein the computer-executable instructions, upon execution by a processor, further cause the processor to at least: retrieve, from a database associated with a data storage device, the mobile device ID associated with the device ID obtained from the trigger data, the device ID corresponding to an IoT device in communication with the session initiation device.

20. The one or more computer storage media of claim 15, wherein the computer-executable instructions, upon execution by a processor, further cause the processor to at least: retrieve, from a database associated with a data storage device, the mobile device ID associated with a PAN obtained from the trigger data, wherein the user-selected modality is an e-commerce modality or a point-of-sale (POS) device-related modality.

* * * * *